US007797540B2

(12) United States Patent
Conley et al.

(10) Patent No.: US 7,797,540 B2
(45) Date of Patent: Sep. 14, 2010

(54) PREDICTIVE SUPPORT SYSTEM FOR SOFTWARE

(75) Inventors: Paul Conley, Peaks Island, ME (US); Ian M. Goldstein, San Francisco, CA (US); Benjamin Price, Telopea (AU); Todd Chipman, San Jose, CA (US); Robert Brass, Natick, MA (US); Terence Joseph Clearkin, San Jose, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 1125 days.

(21) Appl. No.: 11/295,255

(22) Filed: Dec. 6, 2005

(65) Prior Publication Data

US 2007/0088956 A1 Apr. 19, 2007

Related U.S. Application Data

(60) Provisional application No. 60/723,150, filed on Oct. 3, 2005.

(51) Int. Cl.
*H04L 9/32* (2006.01)
*G06F 7/04* (2006.01)

(52) U.S. Cl. ........................................ 713/176; 726/26

(58) Field of Classification Search .................. 713/176
See application file for complete search history.

(56) References Cited

U.S. PATENT DOCUMENTS

| | | | | |
|---|---|---|---|---|
| 7,184,935 | B1 * | 2/2007 | Cohen et al. | 702/186 |
| 2002/0049687 | A1 * | 4/2002 | Helsper et al. | 706/45 |
| 2003/0061247 | A1 * | 3/2003 | Renaud | 707/205 |

* cited by examiner

*Primary Examiner*—Brandon S Hoffman
(74) *Attorney, Agent, or Firm*—Fliesler Meyer LLP

(57) ABSTRACT

Signatures indicating potential problems can be used by a predictive support component. The predictive support component can check to see if a signature matches data for a data source associated with the software.

35 Claims, 3 Drawing Sheets

PREDICTIVE SUPPORT SYSTEM FOR SOFTWARE

CLAIM OF PRIORITY

This application claims priority to U.S. Provisional Application No. 60/723,150 entitled "Predictive Support System for Software" by Goldstein et al., filed Oct. 3, 2005.

BACKGROUND OF THE INVENTION

The present invention relates to systems for analyzing software.

Complex software systems can be susceptible to failures. For example, certain configurations of complex software with multiple components can result in failures and/or reduced performance. Often, the burden is placed on a software administrator to learn about potential problems and keep the software performance acceptable.

DETAILED DESCRIPTION

The use of signatures can radically change how software support is delivered to customers. Support can be delivered by converting software engineers' knowledge into signatures which are delivered to the customer to prevent them from hitting problems. This is in contrast to waiting for customers to hit problems, contact the support organization, and receive the benefits of engineers' knowledge through phone or email.

Figure 1:
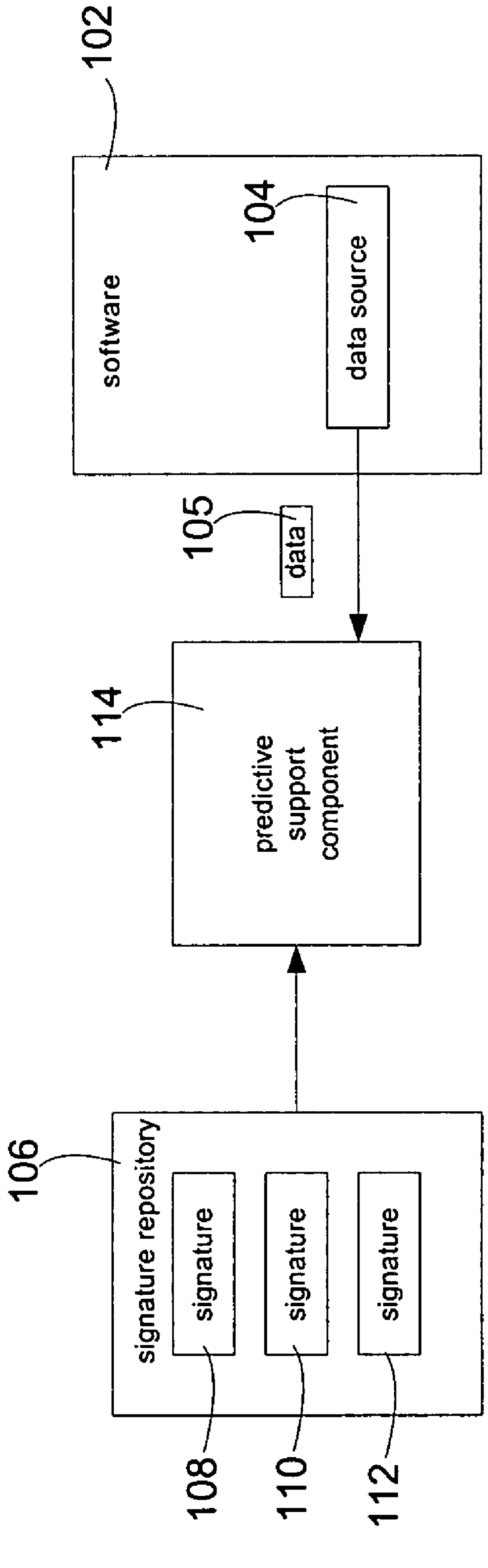
FIG. 1 is a diagram illustrating the use of signatures to determine potential problems with software.

FIG. 1 illustrates software 102 having an associated data source 104. A signature repository 106 can be adapted to store signatures 108, 110 and 112. The signatures can indicate potential problems with the software. A predictive support component 114 can compare signatures 108, 110, and 112 from the signature repository 106 to the data 105 from the data source 104 to determine if any of the potential problems are associated with the software. In one embodiment, a signature match can indicate one of the potential problems.

The predictive support component can be any element, such as software, arranged to do the comparison operation on the signature and the data. The predictive support component can include additional optional functionality, such as that discussed below.

The signatures can be any information that allows for the determination of potential problems by a comparison with data from a data source associated with the software. In one embodiment, described below, this comparison is done by using rules from the signature to operate on the data from data sources associated with the software. The comparison can be done in other ways as well.

The signature repository can be any element, such as memory or portion of a memory, adapted to store signatures. The data source can be any source of data for the software.

The potential problems are problems that could occur with the software in the future. The potential problems are not a current failure such as current virus infections. Signatures can also be used to detect existing problems.

The data 105 can be obtained from data sources(s) 104 associated with the software. This data 105 can include configuration data, runtime data, logging data, and source code data and other types of data. Configuration data can include configuration data obtained from MBeans and the like. Runtime data can include indication(s) of the resource(s) used by the software. Source code data sources can check the source code of an application or other software for specific code segments, annotations, or the like.

The signatures can have rules to determine when the data matches a signature. For example, the rules can be functions of the data. The signatures can also indicate the data from the data source(s) that the predictive support component should obtain for evaluating the rules.

The signature can indicate a remedy. The remedy can include instructions to solve the potential problem and/or description information to describe a potential problem to users. The remedy can also be an auto-repair. The auto-repair can change the settings of the software or do other actions to avoid the potential problem. Additionally, a support case to send to a software support site can be constructed as indicated by the remedy.

Figure 2:
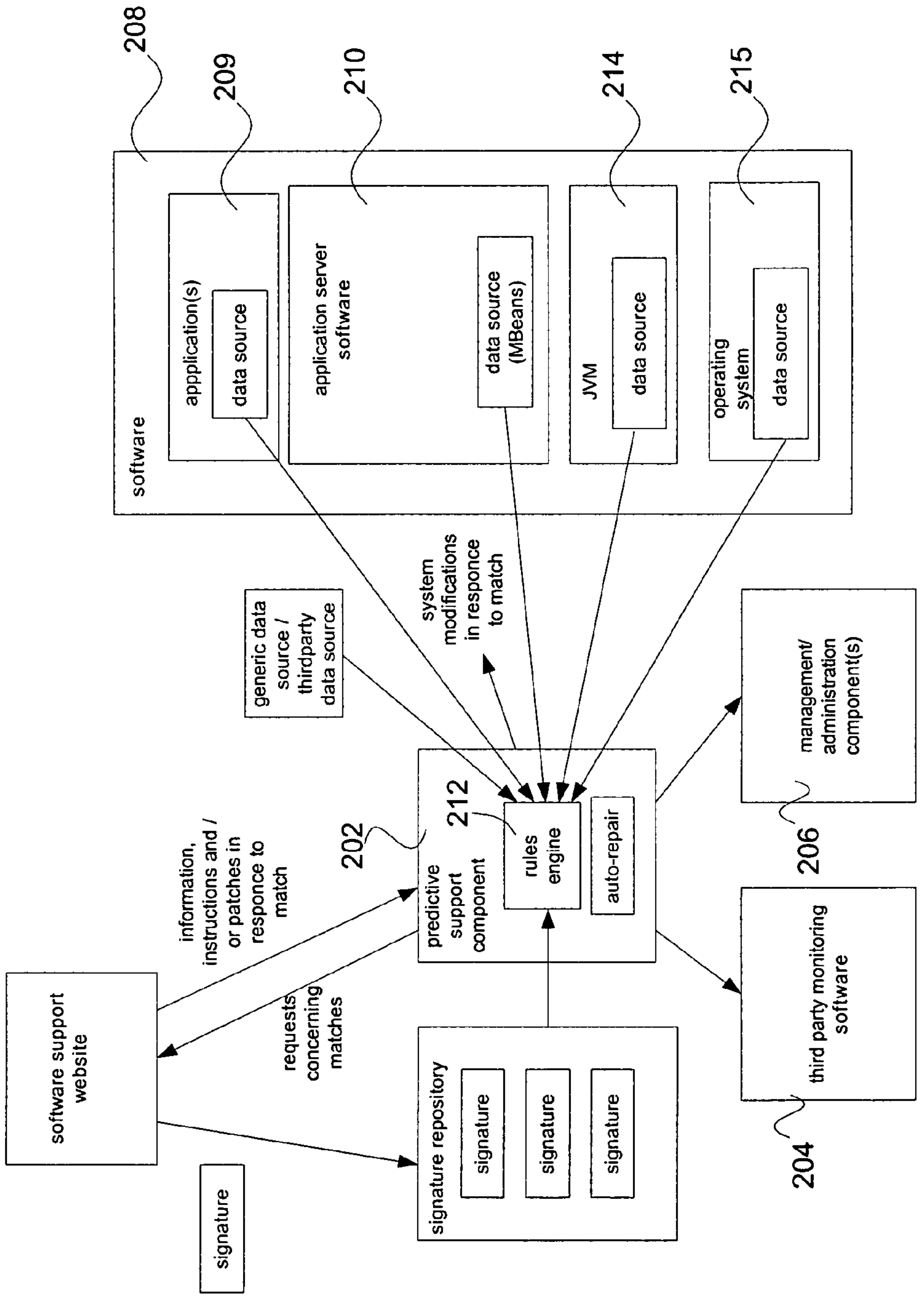
FIG. 2 is a diagram illustrating an embodiment of a predictive support system using signatures.

FIG. 2 shows details of another embodiment. In this embodiment, the software 208 is, or includes, application server software 210. The application server software 210 can be a J2EE-compatible application server, such as the Weblogic™ Server available from BEA Systems, Inc., of San Jose Calif. The application server software 210 can include data sources, such as MBeans. Other data sources associated with software 210 can be used. The example of FIG. 2 shows data sources associated with a virtual machine, such as the Java Virtual Machine (JVM) 214, the operating system 215, and application(s) 209 that run on the application server software 210.

The predictive support component 202 can provide match data to third party monitoring software 204, such as IBM's Tivoli or HP Openview. Match data can also be sent to management and/or administration components 206. The management and/or administration components 206 can be part of the application server software 210, or an independent user interface. The match data can be an indication of the potential problem.

New signatures can be obtained from a website. Alternately, the signatures can be obtained from a storage medium, such as a Compact Disk (CD), or from another source. The signatures can be grouped into logical bundles.

In one embodiment, the rules engine 212 of the predictive support component 202 uses rules, such as expressions or function, from the signatures to examine the configuration data from the application server software 210 and from the operating system 214.

The predictive support component 202 can be part of the application server software 210. In one embodiment, the predictive support component 202 operates on a domain of the application server software. The domain can be implemented on a part of, all of, or multiple server hardware machines. In one embodiment, the predictive support component 202 can determine the domains independently, such as by reading MBeans. The predictive support component 202 can be, for example, part of an administration server for the application server software 210.

Figure 3:
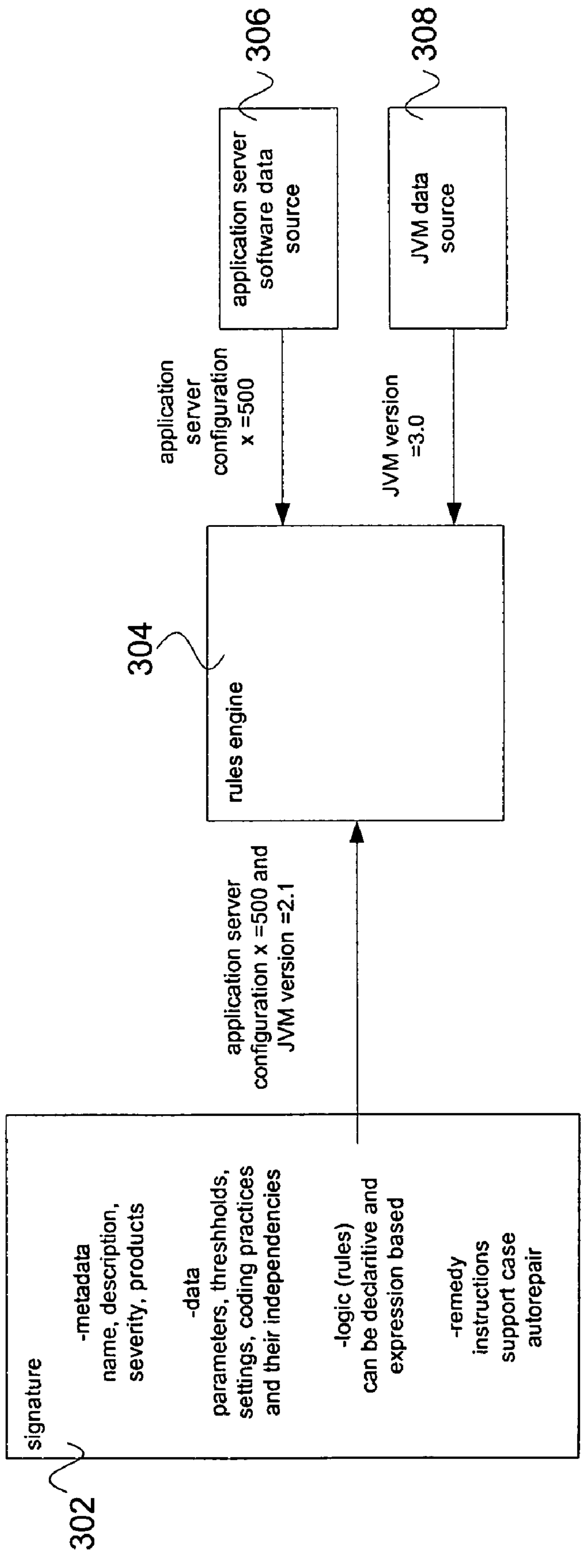
FIG. 3 is a diagram of an exemplary signature arrangement.

FIG. 3 shows details of a signature 302 of one embodiment. The signature can be implemented as a file such as an XML file. The signature can have multiple parts The signature 302 can include metadata such as signature name, description, severity and products. The metadata can be used to determine which signatures can be used for a comparison. The metadata can also be used in a user display. For example, the potential problems can be ranked by severity The signature 302 can include indications of the data which is to be obtained for the comparison. The predictive support component can use the data indications to obtain the data for rules comparison.

The signature 302 can include logic (rules) which can be declarative and expression based. The signature 302 can also include a remedy such as instructions and support case info. In one embodiment, the system can instruct the predictive support component to auto-repair such as by setting configuration values. The auto-repair can be done with or without administrator authorization.

A simplified example of a rules is the expression:

application server
configuration x=500 and
JVM version=2.1

The rules engine 304 can check this expression using the configuration data 306 and 308. If it evaluates to true, the rules engine can cause an operation indicated by the remedy. In the example of FIG. 3, the JVM version is not "2.1" and thus the signature does not match the data.

The rule expression can include any type of function including all types of Boolean Logic. For example, the expression can use a range such as:

application server
configuration x<1000 and
JVM version>2.0 in which case, the signature would match the data of FIG. 3.

Examples of signatures for application server software can include signatures such as:

(1) JSP Error Page Recursion If you have a tag like <% @page errorPage="jsp_error"%>within a JSP error page, you may cause infinite recursion and generate a StackOverFlow exception which may crash the JVM. Pattern: Irrecoverable StackOverFlow (2) WebLogic JSP Form Validation Recursion If you are using the <wl:form> tag and set the form's action attribute to the same page containing the <wl:form> tag, you may create an infinite loop and generate a StackOverFlow exception which may crash the JVM. Pattern: Irrecoverable StackOverFlow (3) Connection Pool Execute Threads If you are using a JDBC connection on each request, make sure that the number of connections available is equal to the maximum number of execute threads. Prescription: Increase maximum execute threads or decrease size of connection pool. Pattern: Generic Server Hang Pattern (4) Idle Execute Threads Check the number of idle execute threads over time. Pattern: Generic Server Hang Pattern (5) Invalid Multicast Address Check the multicast IP address or resolve the DNS name to its IP address. Multicast addresses must be between 224.0.0.0 and 239.255.255.255. Pattern: Multicast Pattern (6) Duplicate Multicast Address Check for duplicate multicast IP addresses assigned to multiple machines. Pattern: Multicast Pattern Signatures can be constructed at a software support site. Software support will often be able to determine conditions that can lead to these problems. The conditions can be encoded in a signature. For example, if a certain configuration can cause a failure when the certain runtime resource is low, a signature including rules indicating such condition can be produced. The signatures can be created using an authorizing tool, such as an XML authorizing tool.

In one embodiment, the predictive support component can check multiple signatures. The signature checking can be done when a signature is added, when the configuration changes or at any other time. The signature checking operations can be done in the background.

The use of the signature moves away from the "break fix" model. In the traditional "break fix" model

- Customer finds problem
- Calls support
- Support fixes problem
- Repeatable, multiplied by number of customers who encounter the same problem For example a memory leak problem can take months to diagnose and fix, with 100+ communications involved.

The use of signatures can be used to identify all known and some unknown problems and to give the user options. These options can include solutions, links to knowledge base, clarification of support case creation, information acquisition and transfer and auto-repair to automatically fix the problem Software support can define signatures on an ongoing basis based on case work, support patterns, bug reports (CRs), common customer "gotchas", security vulnerabilities, etc. The framework can retrieves new signatures. The predictive support component can scan computers to detect signatures. The predictive support component can advise the user on how to respond to each signature it detects. This can be done using step-by-step instructions, links to a software support site, opening a support case, and/or auto-repair In one embodiment, the predictive support component can provide a customer UI, collect signature data; execute signature logic (comparison), retrieve signatures; manage customer identity, entitlements, etc.; do scheduling and notifications, integrate with support software and customer's 3rd party monitoring systems The predictive support component can have security features such as:

- Predictive support component can be designed to only communicate with certified servers
- Users can be required to have login credentials
- Users can be managed through activity/roles
- Data can be protected with 128-bit encryption The predictive support component can have privacy features such as:

- Policy Manager can live at the customer site (enable/disable)
- Predictive support agent can only send data allowed by customer's Policy Manager settings The predictive support component can support a full audit trail. In one embodiment, all remote activities can be audited.

The preference for managing the signature repository can be selected based on security policies and degree of connectivity.

- Customer can install signatures from CD
- Customer can download signatures manually from a software support website
- A software support website can update the customer's signature repository automatically The preference for getting more help from Support can be based on security policies and degree of connectivity.

- Customer can save signature detection results and creates case manually
- Customer can create case directly from signature detection results
- Automatic case creation can be done upon signature detection.
- Data Sources Exemplary Data Sources

- JMX ConfigMBeans & RuntimeMBeans
- OS Configuration Settings & Runtime Statistics JVM Configuration Settings & Runtime Statistics
Database Configuration Settings & Runtime Statistics
WebLogic Diagnostic Framework (9.0+)

File Contents

XML Documents (e.g. config.xml, server logs, deployment descriptors)
Fixed-width Files (e.g. access.log)
Tab-delimited Files, CSV Files, Properties Files Other Data Sources SNMP traps, custom MBeans, bytecode instrumentation, 3rd party proprietary data sources The Appendix is a functional specification for one predictive support system. It is merely exemplary and is not meant to limit the present invention.

One embodiment may be implemented using a conventional general purpose or a specialized digital computer or microprocessor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits or by interconnecting an appropriate network of conventional component circuits, as can be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations can be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

APPENDIX

PREDICTIVE SUPPORT COMPONENT

Introduction

Overview

System administrators working with applications deployed on WebLogic Platform can manage more than just the applications themselves. They can also manage the Platform components (WebLogic Server, WebLogic Portal, WebLogic Integration), the Java virtual machine in which the Platform runs and the operating system underneath it all.
This diagram (Diagram 1: Managing Applications) illustrates where Predictive support can assist our customers. Version 1.0 can primarily help manage the WebLogic Platform components and the JVM, with limited coverage down to the O/S and up to the customer's applications, but additional coverage can be used in later embodiments.

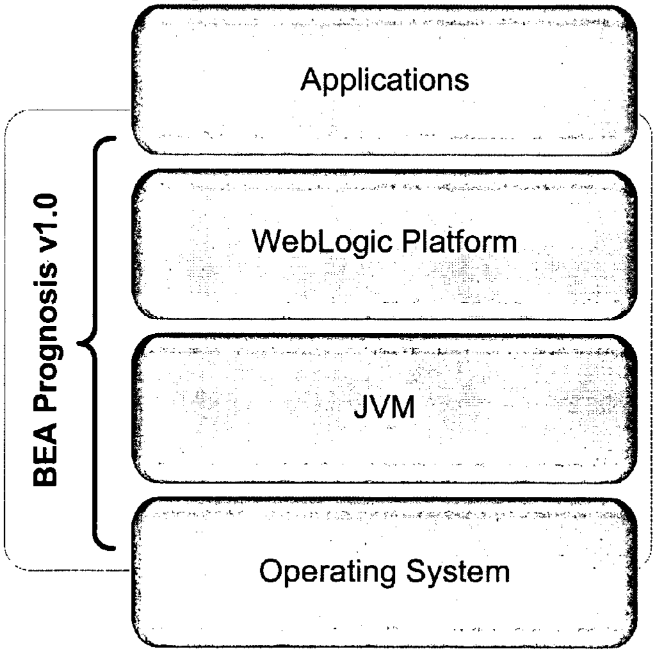

*Diagram 1: Managing Applications*

Platform/OS

Platform

- In one embodiment, the predictive support tool can be supported on all "tier one" platforms and operating systems that we currently support for our installer and our products.

Look and Feel

The tool can inherit the LAF standard of all our fat-client tools as implemented in what used to be known as the Workshop Look-and-Feel (WLAF). If exceptions or outages come up due to interface requirements unique to this tool, they can be addressed case-by-case.

Metadata

When viewable by a human, metadata names and values can appear in user-friendly styles. If necessary, "short names" and "display names" can be used to facilitate this (as well as I18N).

I18N

Basic architecture can support tokenization of all text strings in the interface as I18N (identification) resources.
Tool can support international character sets.

Accessibility

Color blindness

Human interactions with the GUI should not depend on color distinctions that would confuse a colorblind person.

Hearing Impairment

Not applicable.

Menu

We attempt to not duplicate controls between the main interface, and the available menu commands.
All menu commands and GUI buttons or other options and controls can have keyboard mnemonics.

Congruence with Internal Tool

- Can reuse code to the extent possible
- Terminology can be the same
- Interfaces can be the same or similar where functions are alike.

Persistence

Implicitly persisted attributes

These are the attributes that can be implicitly persisted between sessions:
- Last signature repository update timestamp
- Default signature bundle
- Domain inventory
- Default target domain
- Last evaluation timestamp for each bundle

- Whether the list of signatures in a bundle has been modified since the last time the bundle was evaluated
- Inventory of installed signatures/versions (used for determining what's "new" when refreshing the list of available signatures)
- Timestamp when last usage data was sent to software support If other requirements for implicit persistence between sessions emerge, they would be expected to come from deep technical requirements, not from user or interface requirements.

Explicitly persisted attributes

The items for explicit persistence can be:

- Domain info (see Domain Registry)
  - Admin Server URL
  - Admin username/password
- whether to login to this domain automatically (see Figure 20: Login Dialog: Domain Login)
- Signature Bundle info (see Signature Bundle)
- Signature Repository location (see Diagram 52: Configuration Dialog: Preferences: (Download Options tab))
- Proxy info (see Diagram 52: Configuration Dialog: Preferences: (Download Options tab))
  - server/port
  - name/password
- Results location (see Diagram 53: Configuration Dialog: Preferences (Results Options tab))
- eSupport username/password (see Diagram 43: Login Dialog: eSupport Login)
- Whether to login the remembered user to eSupport automatically (see Diagram 43: Login Dialog: eSupport Login)

Contextual Task-Based Rationale

This specification is structured around the complete set of end-user tasks the tool is meant to facilitate. The purpose of this approach is to uncover substantially states, interactions, and error conditions that could surface in the tool.

Architecture Overview

The application architecture can be designed to accommodate multiple customer scenarios, described here as:

- Single Developer
- Multiple Developer
- Production
- Production (No Internet Connection)

Note: In one embodiment, a domain's admin server must be running for the domain to be activated or evaluated. Other versions of the tool may have an off-line mode, i.e. admin server not running.

Single Developer

The diagram below (Diagram 2: Architecture: Single Developer) describes the single developer scenario, where everything can be operating directly on the developer's PC.

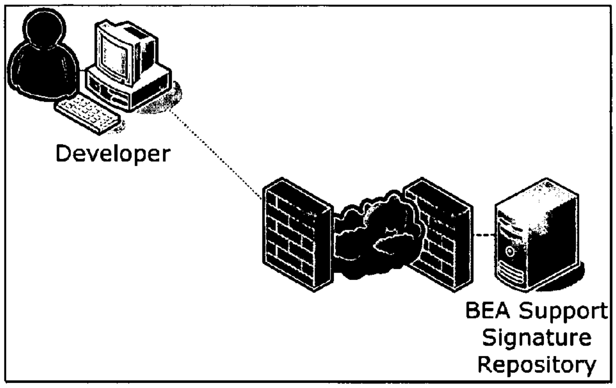

*Diagram 2: Architecture: Single Developer*

The developer's PC can include:

- a WebLogic Platform domain with one Admin Server and zero or more managed servers
- the Predictive support application
- a local Predictive support signature repository
- local Predictive support prediction results When the developer runs Predictive support, he/she can activate the local domain and evaluate the local signatures in that domain. Prediction results can be stored locally. When the developer wants to update the signature repository, he/she can connect to Software support over HTTPS to download new signatures. The developer can configure proxy settings as necessary.

Multiple Developer

The diagram below (Figure 3: Architecture: Multiple Developer) describes a multiple developer scenario, where one or more developers work on the same WebLogic Platform domain.

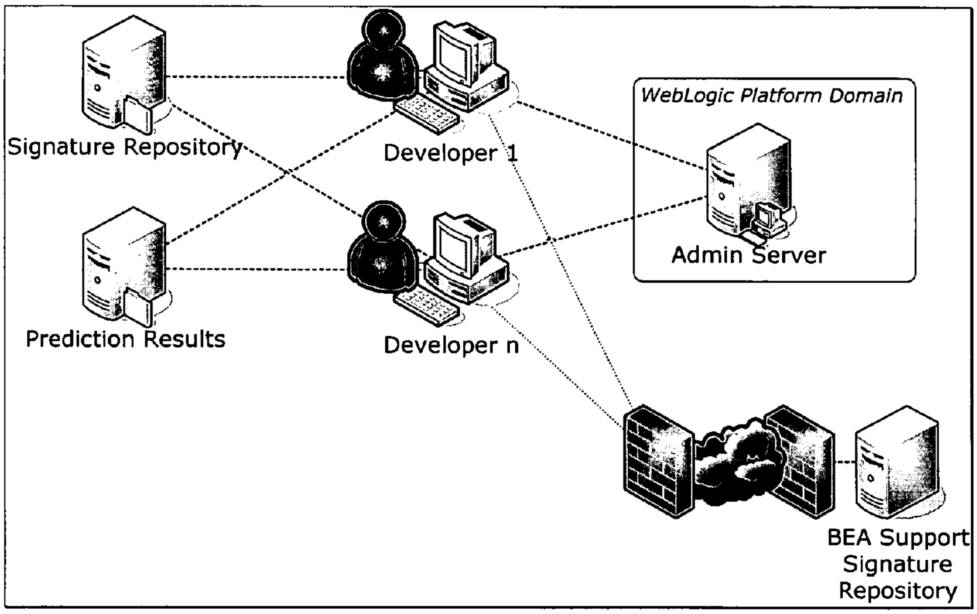

*Diagram 3: Architecture: Multiple Developer*

In this scenario, the developers may or may not share a common Predictive support signature repository and a common prediction results directory. The diagram above shows a single signature repository shared by all the developers and a single results directory shared by all the developers; alternatively, each developer may maintain their own local signature repository and/or results directory.

Each developer's PC can have the Predictive support application installed on it. Each of these Predictive support instances can be configured to point to a common signature repository and to a common prediction results directory. Each developer activate the WebLogic Platform domain in their own instance of Predictive support. A domain may be activated as long as the developer has the necessary admin credentials and has access to the admin server such as over t3, t3s, http, https or iiop. Each developer can then evaluate signatures in that domain. Any of the developers can update the common signature repository, connecting to Software support over HTTPS to download new signatures. Each developer must configure their own proxy settings as needed.

Production

The diagram below (Diagram 4: Architecture: Production) describes a production scenario, where one or more administrators work on multiple WebLogic Platform domains.

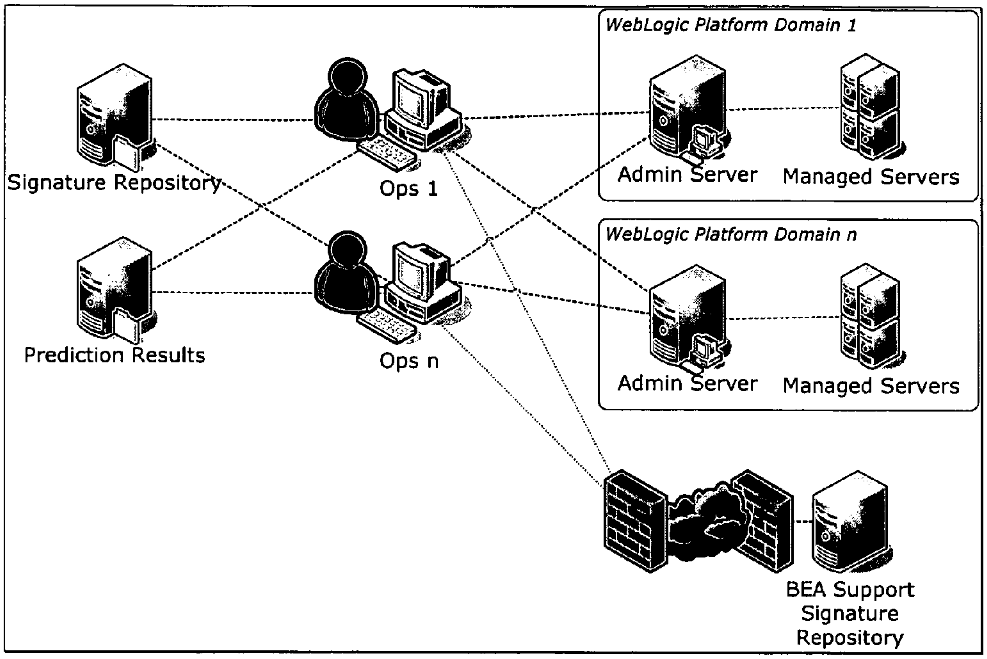

*Diagram 4: Architecture: Production*

In this scenario, each ops person's PC has its own Predictive support application installed on it; each of these Predictive support instances may be configured to point to a common signature repository and/or a common directory for prediction results. (Each ops person may alternatively decide to store their prediction results locally.) Each ops person activates, in their own instance of Predictive support, each of the WebLogic Platform domains they administer. A domain may be activated as long as the ops person has the necessary admin credentials and has access to the domain's admin server, such as over t3, t3s, http or https. Each ops person can then evaluate signatures in any of the activated domains. Any of these ops personnel can update the common signature repository, connecting to Software support over HTTPS to download new signatures. Each ops person configures their own proxy settings as needed.

Production (No Internet)

The diagram below (Diagram 5: Architecture: Production (no direct internet connection)) illustrates the scenario where there is no internet connectivity from the production environment.

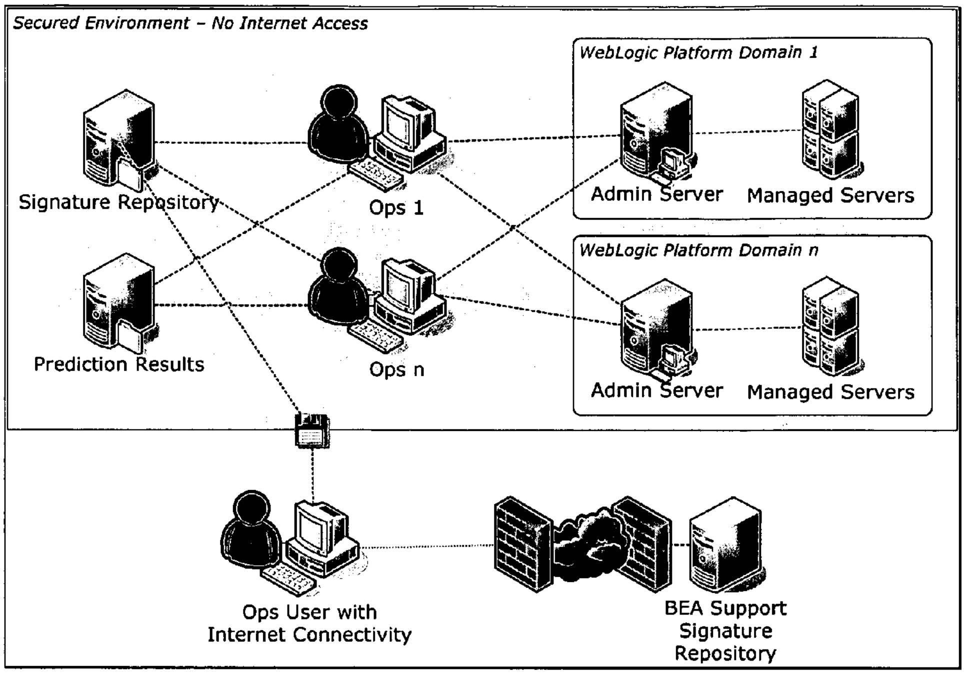

*Diagram 5: Architecture: Production (no direct internet connection)*

In this environment, a user may download signatures from Software support from another location then manually copy them over to the signature repository.

Installation & Registration

Installation

The Predictive support installer can be available to Software support customers on eSupport (see Product Download). In one embodiment, Customers need a valid eSupport username and password to download Predictive support from eSupport. The installer may also be available on CD.

Interactions

Exemplary Interactions include:

- Customer logs in to eSupport.
- Customer selects "Download Predictive support" from eSupport.
- Customer runs installer executable.
- Customer selects installation directory.
- Customer selects Express or Custom installation. The express installation uses the defaults for the remaining options.
    - Customer selects signature download directory (defaults to [installation directory]/signatures).
    - Customer selects results directory (defaults to [installation directory]/results.)
    - Customer sets proxy settings for signature download (defaults to none).

- If a zip file of signatures was also downloaded, install the signatures to the designated directory.

Registration

A customer can be designated as "registered for predictive services" when they perform any of these tasks:

- Download the Predictive support installer from the eSupport page (see Product Download).
- Download signatures from the eSupport page (see Signature Download).
- Download signatures from the Predictive support Update Signature Repository tab (see Figure 45: Tab: Update Signature Repository).

Uninstallation

The Predictive support installation can include an Uninstall executable.

Interactions

- Customer run Uninstall executable.
- For each active domain, go through the domain deactivation process (see Diagram 25: Confirmation Dialog: Deactivate Domain), prompting the user for domain login credentials as needed.
- Uninstall the application and all its artifacts (signatures, etc.) but do not delete the contents of the customer's designated results directory (see Diagram 53: Configuration Dialog: Preferences (Results Options tab)).

User Interface

Exemplary interface options include: a desktop graphical user interface, a command line interface and Ant tasks.

User Model & Assumptions

- The User can be the operator of the Predictive support application (the GUI, the command line interface or the built-in Ant tasks).
- The Exemplary users can be a:
  - Customer developer, maintaining his/her own development environment
  - Customer developer, team lead or system administrator, maintaining development and test environments on behalf of a development group.
  - Customer IT engineer, doing centralized maintenance of development, test, or production systems.
  - Customer operations administrator, doing centralized administration of test or production systems.
  - DRE, or similar, working at a customer site to resolve an issue.
  - DRE working inside to duplicate a customer environment.
- The User has a valid eSupport username and password.
- The User is familiar with the Platform product suite and with configuration of WebLogic Platform domains and servers.
- The User may or may not be familiar up-front with Software support procedures (case creation, SLA, etc.).
- The User may or may not be familiar up-front with Software support's eSupport site.
- An '80-20' rule has been applied in many cases, optimizing usability and functionality for the majority use case, and accepting some limitations for the minority use case, who, it is assumed, are the more advanced users and better able to deal with such limitations in v1 of the tool.

Tasks

The principal tasks of Predictive support can be available through the GUI, the command line or Ant.

- Activate/Deactivate Domain
- Evaluate Signatures in a Domain
- Update Signature Repository

Activate/Deactivate Domain

Each user's Predictive support installation can evaluate any number of WebLogic Platform domains, as long as the user has the appropriate admin permission and the machine where Predictive support is installed can communicate with the domain's admin server over, such as t3, t3s, http, https or iiop. When the user wants to evaluate a domain using Predictive support, the user can first "activate" that domain. To do so, the user can specify the location of the admin server and their admin credentials for that domain. The tool can install an adminagent (see AdminAgent) on the admin server, which in turn installs a managedagent (see ManagedAgent) on each of the managed servers in the domain. These agents can assemble a "domain inventory" (see Domain Inventory) and return that inventory to the Predictive support instance, which maintains a "domain registry" (see Domain Registry) of all the target domains it knows about. When no longer interested in a domain, the user may "deactivate" the domain.

Evaluate Signatures in a Domain

The user selects a set of signatures to evaluate in a particular domain. Predictive support collects the data required by those signatures, evalutes each signature's logical expression, and prepares the results pages.

Review Results/Create a Case

When signatures are evaluted, the user may review the results summary and the detailed results pages for each signature detected and snapshot taken. If the user wants more help from Support after reviewing the detailed results, the GUI offers a "Create a Case" option which prepares some descriptive text and the relevant data so that a DRE can start working on the case as soon as it is assigned.

Update Signature Repository

Software support can publish new signatures on an ongoing basis. Users with internet connectivity from their Predictive support installation may connect to software support directly from the GUI, command line or Ant task to get the latest signatures. This process can include sending software support a signature inventory (see Signature Inventory), signature usage data (see Signature Log) and domain inventories (Aggregate Domain Inventory) so that the customer receives the right signatures.

Assumptions

Desktop Environment

*Platform*

It is assumed that the tool can be supported on all "tier one" platforms and operating systems that we currently support for our installer and our products.

*Display*

Monitor Size

Users can be expected to use a monitor of resolution no less than 800 x 600

Color Depth

Users can be expected to use a monitor with color depth no less than 16-bit. However, the GUI can still be usable in 256-colors.

Internet Connectivity

Internet connectivity is assumed for the Update Signature Repository task.
All other tasks can assume that there is no internet connectivity.

Basic Page Architecture

This wireframe diagram (Diagram 6: Wireframe: Application Pane Overview) illustrates the basic page architecture for an exemplary GUI application. It can be a single document interface; the application window has a menu bar and a tabbed workspace. Each tab in the workspace can represent a major area of functionality.

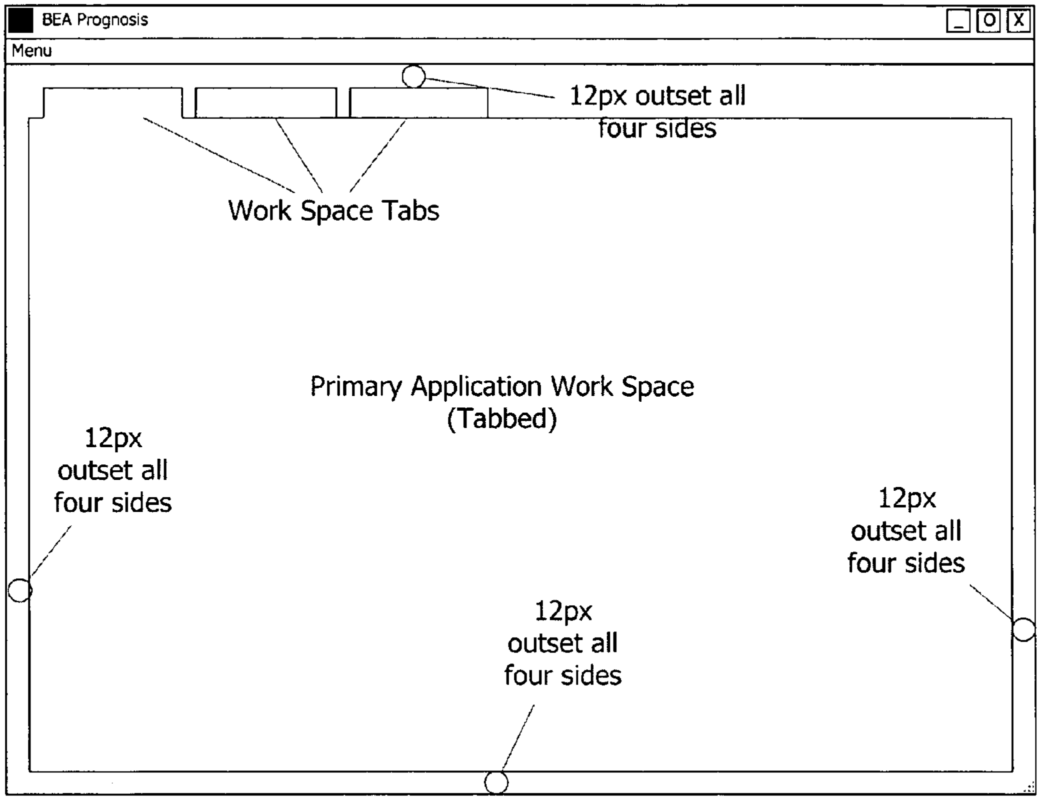
*Diagram 6: Wireframe: Application Pane Overview*
The next three diagrams (Diagram 7: Application Window: Prediction Tab, Diagram 8: Application Window: Results Tab and Diagram 9: Application Window: Update Signature Repository Tab) display an exemplary main application window with each of its three tabs activated.

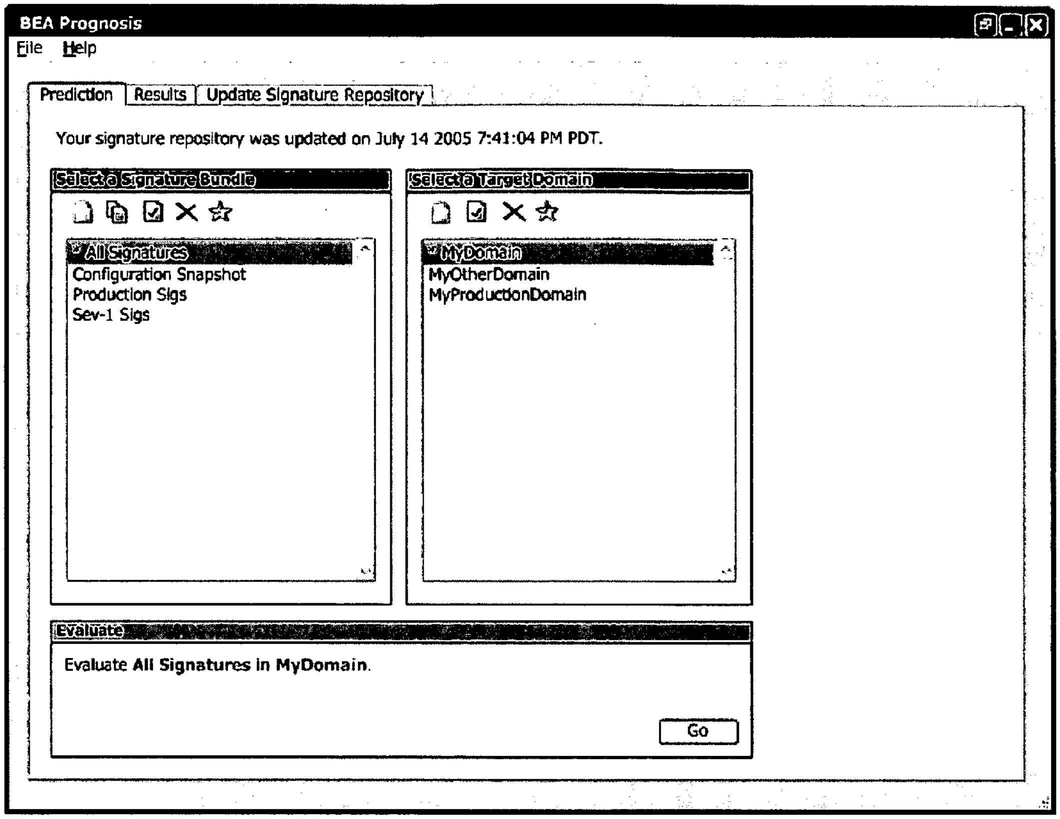
*Diagram 7: Application Window: Prediction Tab*

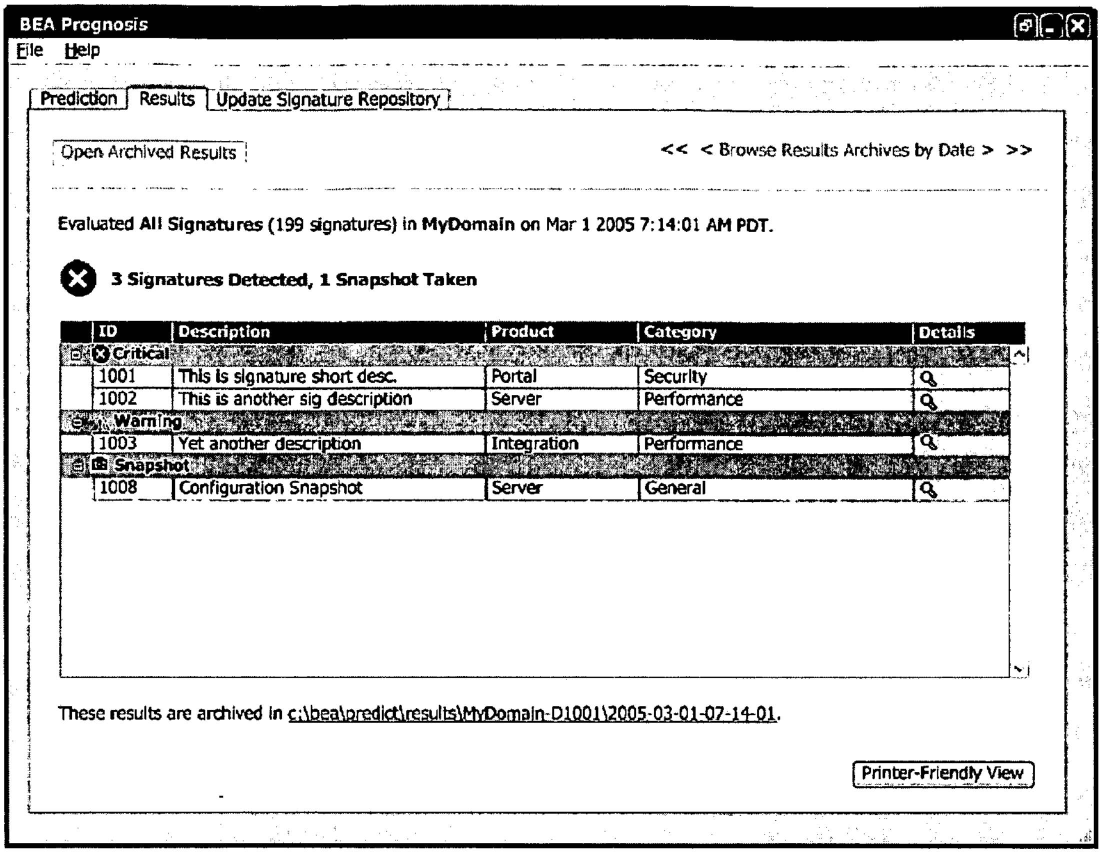
*Diagram 8: Application Window: Results Tab*

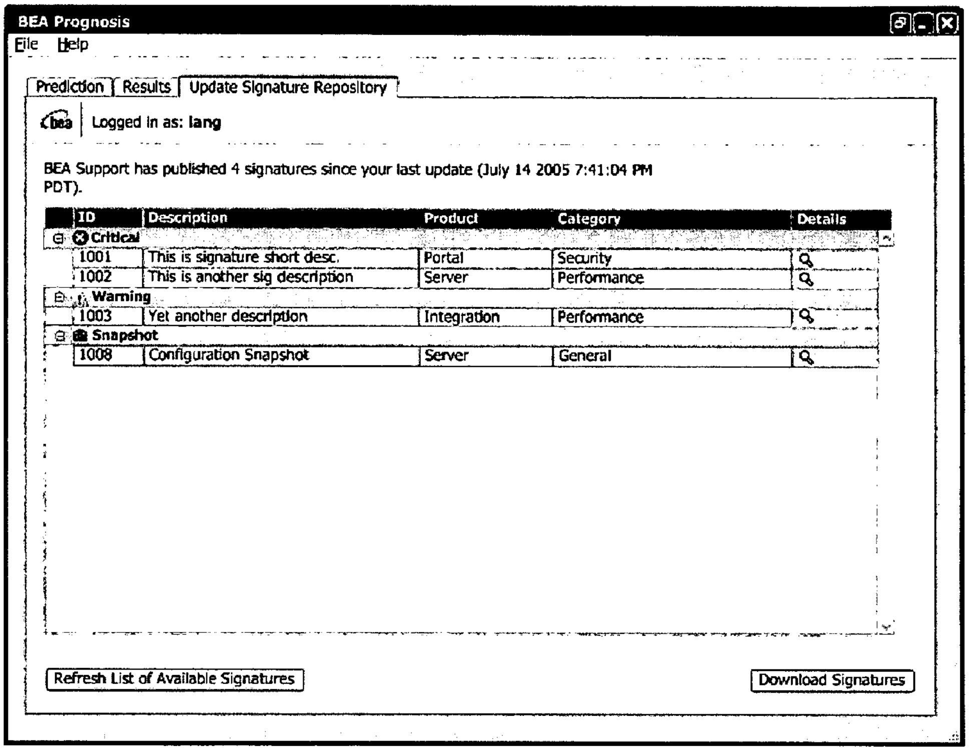

*Diagram 9: Application Window: Update Signature Repository Tab*

Window

In one embodiment, the window can launch to 800 x 600 by default (unless monitor is smaller). The application can work in screen sizes from 800 x 600 up to 1600 x 1200.

On Windows, the application window may be resized, maximized, and minimized (to the taskbar, if Windows preference set). The application window may be closed, which would have the same effect as selecting "File > Exit." from the menu.

Titlebar

The titlebar can inherit the user's desktop settings (color, style). It can include a tool icon, tool name, and standard icon controls for close/maximize/restore/minimize.

Look and Feel

The application can inherit the standard platform look and feel for colors, fonts, border styles, buttons, form controls, pop-up alerts, modal dialog boxes, tabular data displays, and tab, sub-pane, and sub-pane titlebar styles.

*Table 1: Font Specification*

| Attribute | Value |
|---|---|
| Default body-text font spec - including | Tahoma 11pt on 13pt line-spacing |

| Attribute | Value |
|---|---|
| table and list columns labels and contents | |
| Default color | Black |
| Default dialog heading | Tahoma Bold 13pt on 13pt line-spacing |
| Table column heading labels | Tahoma Bold 10pt on 12pt line-spacing, white text on color background |

N.B. This document can explicitly call out where this application differs from these standards.

Colors

If a color specified in the diagrom below (Diagram 10: Application Interface Color Specifications) conflicts with Windows desktop appearance settings or the LAF formerly known as WLW-PLAF, the colors here can take precedence, unless there is no readily available way to override the particular default.

| Light gray | R: 223<br>G: 225<br>B: 232<br><br>HEX: #DFE1E8 | Main tool window background<br>Default dialog body background |
|---|---|---|
| Red | R: 220<br>G: 70<br>B: 63<br><br>HEX: #DC463F | Tabular header rows<br>(Text labels in bold, white) |
| Tan | R: 230<br>G: 219<br>B: 166<br><br>HEX: #E6DBA6 | 'Type' divider bars ('Critical', 'Optional')<br>'Default Patch Profile' tab background |
| Slate blue | R: 159<br>G: 167<br>B: 202<br><br>HEX: #9FA7CA | Pane title bars - selected state |
| Gray | R: 191<br>G: 191<br>B: 191<br><br>HEX: #BFBFBF | Pane title bars - non-selected state<br>Application window 'menu' bar |
| Light blue | R: 171<br>G: 202<br>B: 248<br><br>HEX: #ABCAF8 | Hilite selection |
| Lightest gray | R: 230<br>G: 230<br>B: 230<br><br>HEX: #E6E6E6 | Background to the 'Apply' and 'Select' columns |
| Pale yellow | R: 253<br>G: 248<br>B: 225<br><br>HEX: #FDF8E1 | Background to Patch Set details |

*Diagram 10: Application Interface Color Specifications*

The next three diagrams (Diagram 11: Color Specifications on Prediction tab, Diagram 12: Color Specifications on Results tab, and Diagram 13: Color Specifications on Standard Dialog Box) specify the color for each of exemplary elements in the window or dialog.
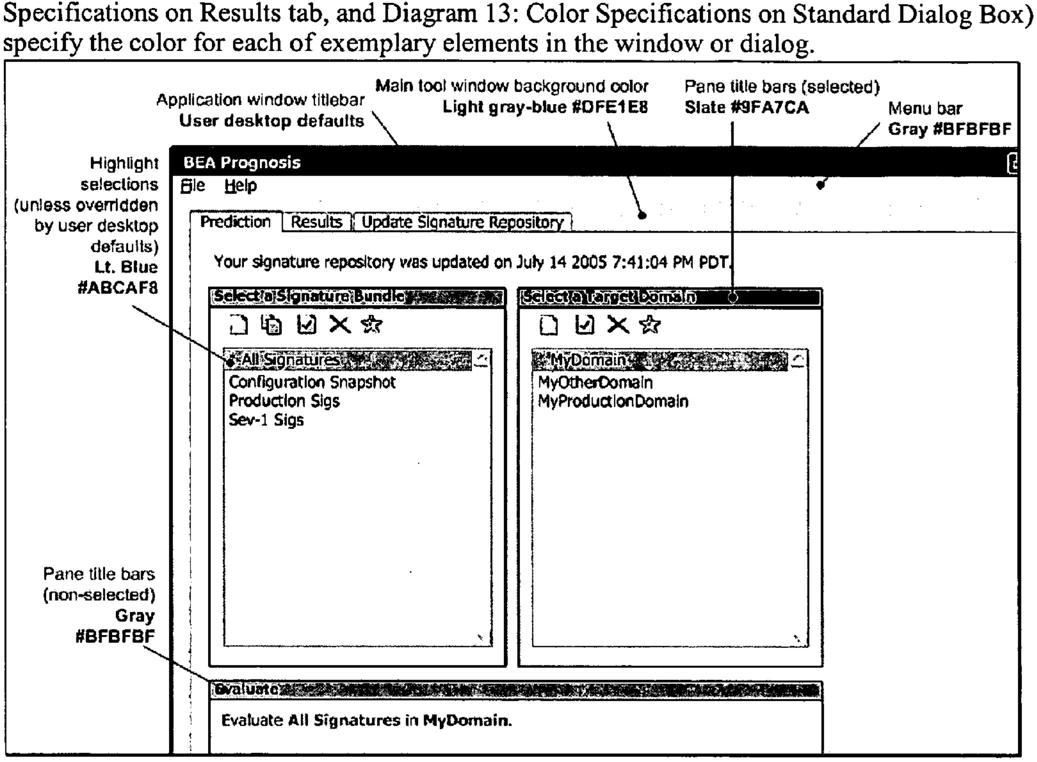
*Diagram 11: Color Specifications on Prediction tab*
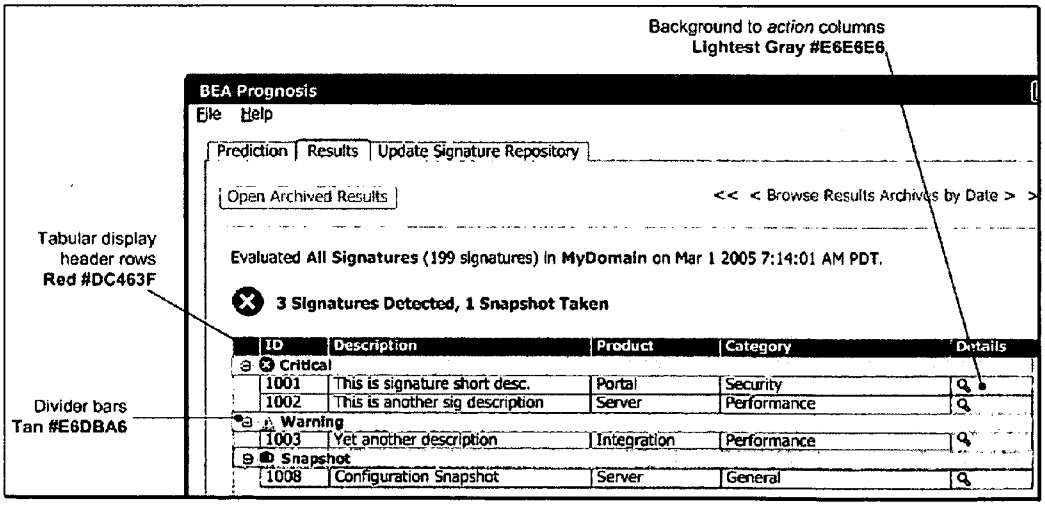
*Diagram 12: Color Specifications on Results tab*

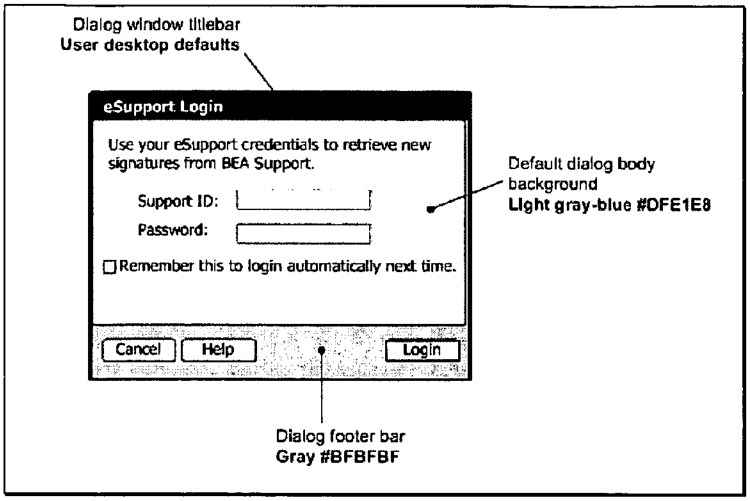

*Diagram 13: Color Specifications on Standard Dialog Box*

Alert Dialogs

All generic error, warning, and info alerts can use a common custom alert dialog.

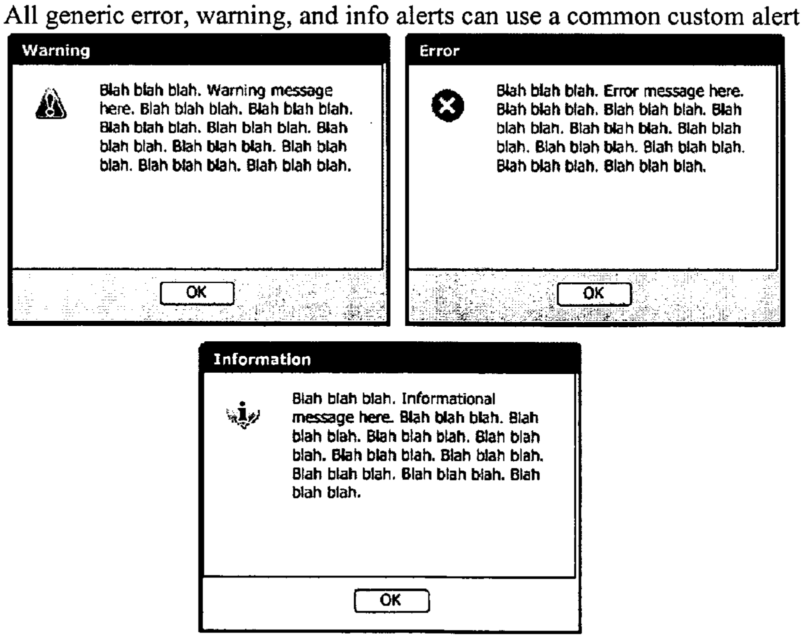

*Diagram 14: Generic Alert Dialogs*

The “x” error symbol can be used when alerting the user to a conditions which caused their task to fail.

The “!”warning symbol can be used when alerting the user to a condition they must acknowledge, but which did not cause their task to fail.

The "i" information symbol can be used for purely informative messages that have no substantial bearing on the success of the task.

Application Menu

The application can have a standard menu in the space shown in the wireframe diagram (see Diagram 1: Application Pane Overview). The diagram below (Diagram 15: Application Menu) displays the top-level menu bar and the expanded second-level view of each top-level option.

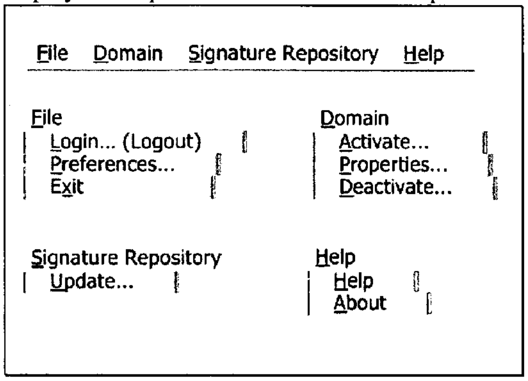

*Diagram 15: Application Menu*

This table (Table 2: Application Menu Detail) specifies the behavior of each menu item.

*Table 2: Application Menu Detail*

| Level One | Level Two | Result | Active | Inactive |
|---|---|---|---|---|
| File | | Spawns menu | Always | Never |
| | Login... | Opens Login dialog | When not logged in | Never. Command does not gray out: its visibility toggles with "Logout." |
| | Logout | Presents Logout confirmation | When logged in. | Never. Command does not gray out: its visibility toggles with "Login..." |
| | Preferences... | Opens Preferences dialog | Always | Never |
| | Exit | Application closes | Always | Never |
| Domain | | Spawns menu | Always | Never |
| | Activate... | Opens Activate Domain dialog | Always | Never |
| | Properties... | Opens Domain Properties dialog | When Prediction tab is the active tab and there is at least one domain in the list (which means a domain is | When Prediction tab is not the active tab OR there are no domains in the |

| Level One | Level Two | Result | Active | Inactive |
|---|---|---|---|---|
| | | | selected). | list. |
| | Deactivate... | Opens Deactivate Domain dialog | When Prediction tab is the active tab and there is at least one domain in the list (which means a domain is selected). | When Prediction tab is not the active tab OR there are no domains in the list. |
| Signature Repository | | Spawns menu | Always | Never |
| | Update... | Makes "Update Signature Repository" the active tab (which may in turn open the Login dialog and the Refresh dialog). | Always | Never |
| Help | | Spawns menu | Always | Never |
| | Help | Launches help viewer | Always | Never |
| | About | Opens About dialog | Always | Never |

*I18n Tokens*

| ID | English |
|---|---|
| M01_FILE | File |
| M02_DOMAIN | Domain |
| M03_SIGNATURE_REPOSITORY | Signature Repository |
| M04_HELP | Help |
| M01.01_LOGIN | Login |
| M01.02_LOGOUT | Logout |
| M01.03_PREFERENCES | Preferences |
| M01.04_EXIT | Exit |
| M02.01_ACTIVATE | Activate |
| M02.02_PROPERTIES | Properties |
| M02.03_DEACTIVATE | Deactivate |
| M03.01_UPDATE | Update |
| M04.01_HELP | Help |
| M04.02_ABOUT | About |

Outsets

Standard outsets between windows and their sub-elements, and between panes/sub-panes and their sub elements, can be 12px.
Standard margin between sibling pane elements can be 12px, unless otherwise indicated.

Resizing the Application Window

When the overall window is enlarged or reduced, the main application workspace can maintain the same relative proportions unless the main application workspace reaches its minimum size. From that point, the entire application window can get scrollbars on the side and bottom, as needed, and the visible frame of the application can be simply cropped from view on the right and bottom.

Interaction Model

Overall Application

The application can have a single workspace. Three top-level tabs can always appear in the primary application workspace. The user can switch between these tabs (unless there is a modal dialog open, preventing access to the main window). The three tabs can be "Prediction", "Results" and "Update Signature Repository."

*I18N Tokens*

| ID | English |
|---|---|
| TITLE | Predictive support |
| T1.TITLE | Prediction |
| T2.TITLE | Results |
| T3.TITLE | Update Signature Repository |
| B.PRINTERFRIENDLY | Printer-Friendly View |

Dialogs

Within the tool, several kinds of dialogs can be invoked. All can be modal, i.e. control and focus cannot return to the main window until the dialog is dismissed.

- Login/Logout dialogs
- Alert dialogs (errors, warnings, etc.).
    - These require the user to either click OK (e.g. "The connection has been lost", "The command could not be completed.") or make a choice (e.g. "Are you sure you want to quit?").
- Progress dialogs
    - e.g. Download in Progress, Evaluation in Progress, Domain Activation in Progress
- Browse dialogs
    - e.g. Select Download Directory
- Configuration dialogs
    - e.g. Activate Domain, Preferences

*I18N Tokens*

| ID | English |
|---|---|
| F.REQUIRED | Required |
| B.OK | OK |
| B.CANCEL | Cancel |
| B.HELP | Help |
| B.LOGIN | Login |
| B.BROWSE | Browse... |
| B.APPLY | Apply |

Interface Specification

Prediction

This flowchart (Diagram 16: Flow: Prediction) illustrates the main interactions available from the application's Prediction tab. Note that the flowchart includes a reference to the Results interactions, illustrated in Diagram 29: Flow: Results.

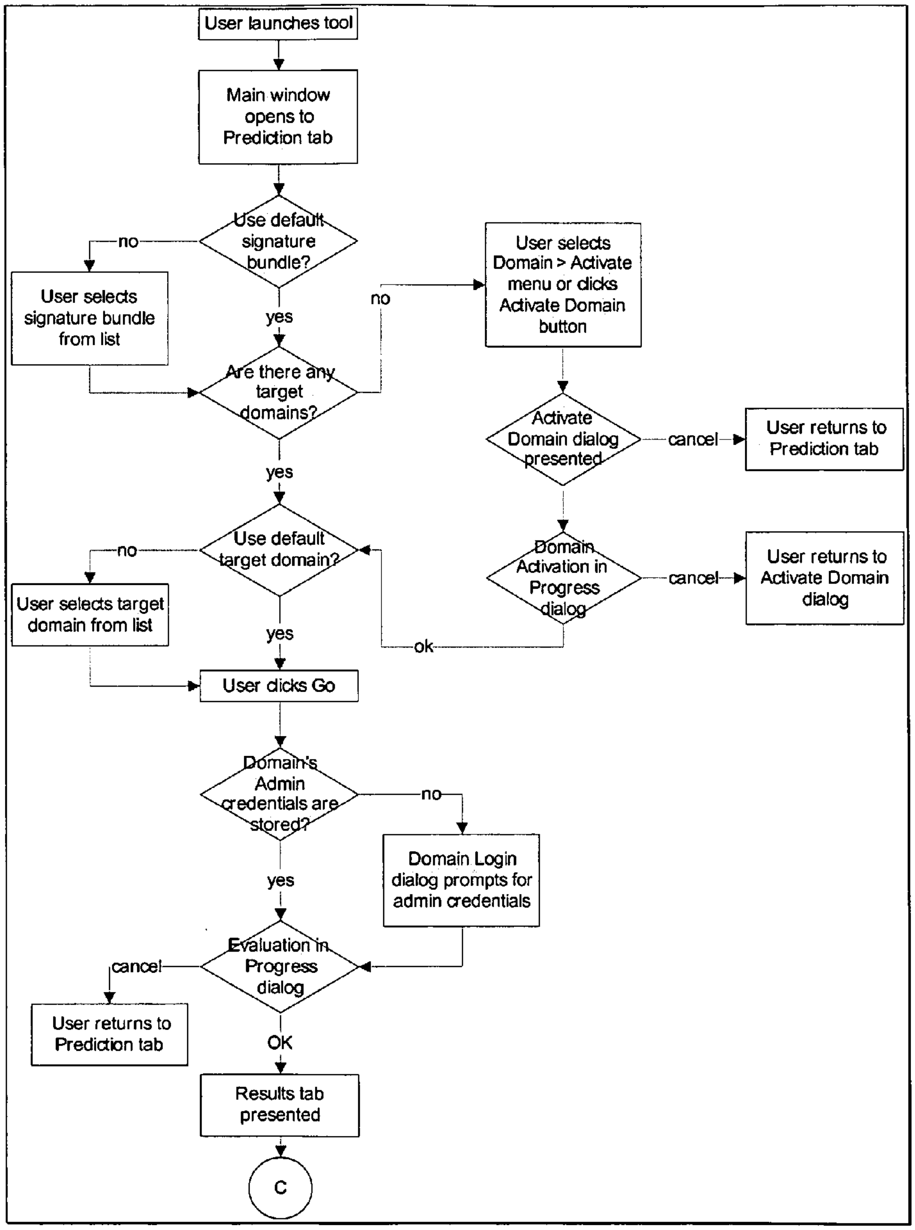
*Diagram 16: Flow: Prediction*
*(T1) Prediction (Tab)*
The next two diagrams illustrate the Prediction tab, with (Diagram 17: Tab: Prediction (with domains activated)) and without (Diagram 2: Architecture: Single Developer) active domains in the Target Domain tab.

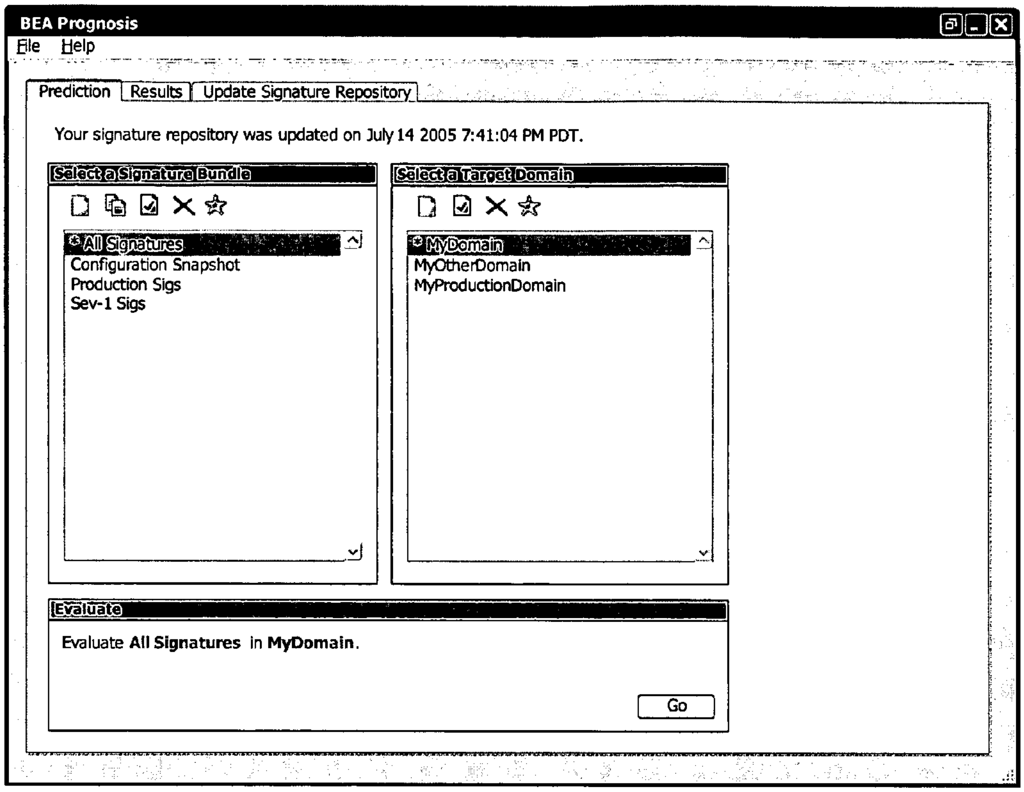
*Diagram 17: Tab: Prediction (with domains activated)*

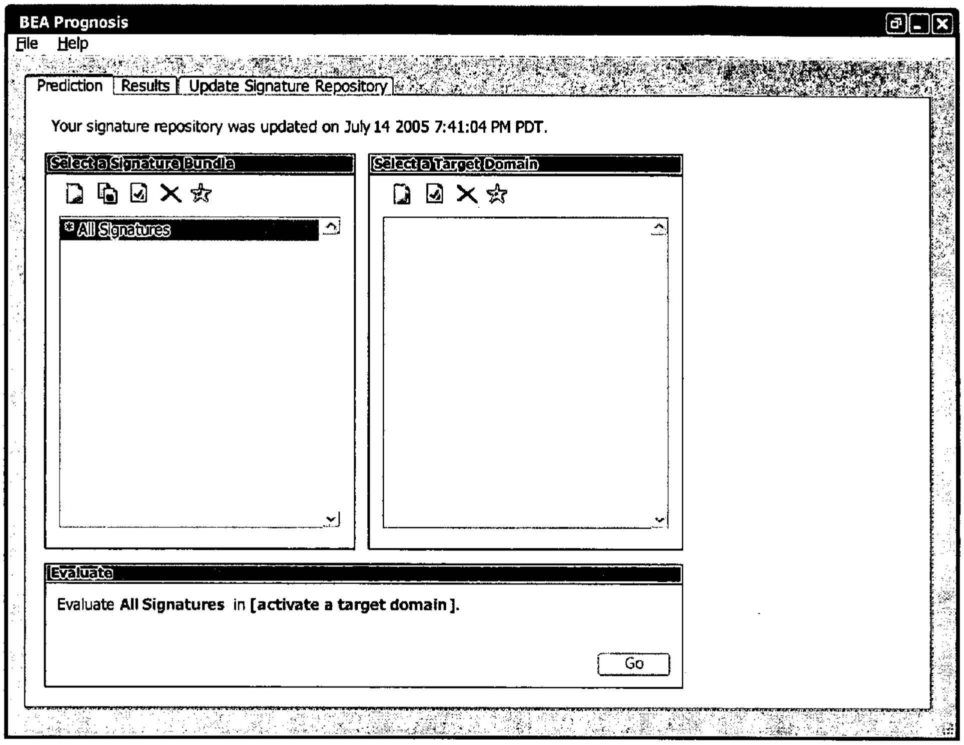

*Diagram 18: Tab: Prediction (with no domains)*

Content

- An informational message can appear at the top of the tabbed pane contents with the last date/time the signature repository was updated. If the repository has never been updated, it can display the message "Your signature repository is empty. Please update your signature repository now."
- The "Select a Signature Bundle" pane can appear on the left side of the tabbed pane. This pane can displays a set of toolbar icons and a scrollable and selectable list of signature bundles.
  - There can be five icons in the toolbar, representing "New", "Clone", "Properties", "Delete" and "Set as Default". The icons for "New", "Clone" and "Delete" can be disabled in this version. These icons can show tooltips on hover.
  - The default bundle can appear as the first bundle in the list. The default bundle can be listed with an asterisk before its name. If there are more bundles to list than can fit in the display, a vertical scrollbar appears. The "All Signatures" bundle can be a special case and can be the out-of-the-box (OOTB) default bundle.
- The "Select a Target Domain" pane appears on the right side of the tabbed pane. This pane can display a set of toolbar icons and a scrollable and selectable list of domains.
  - There can be four icons in the toolbar, representing "New", "Properties", "Delete" and "Set as Default". If the domain list can be empty (for example, the first time a user launches the tool), the "Properties", "Delete" and "Set as Default" icons can be disabled. These icons can show tooltips on hover.
  - If the user has activated one domain, it can be, by default, the default domain. The default domain can appear as the first domain in the list. If there are more domains to list than can fit in the display, a vertical scrollbar can appear.
- The "Evaluate" pane can appear on the bottom of the tabbed pane. This pane can display an informational message and a "Go" button.
  - The informational message can be "Evaluate [signature bundle] in [target domain]." where [signature bundle] can be the name of the signature bundle selected and [target domain] can be the name of the target domain selected. These fields can be highlighted in the display. They can get updated when the user selects a different signature or domain from the lists in signature pane and domain pane. If there are no domains, the text "[activate a target domain]" displays instead.
  - The "Go" button can be disabled if there are no domains.

Interactions

- The user may set a different bundle as the default by selecting a signature bundle from the list and clicking the Set as Default toolbar icon in the Signature Bundle pane. The system can persist the new default, move the new default selection to the top of the list, and highlight it with an asterisk.
- The user may set a different domain as the default domain by selecting a domain from the list and clicking the Set as Default toolbar icon in the Target Domain pane. The system persist the new default, move the new default selection to the top of the list, and highlight it with an asterisk.
- The user may activate a domain by clicking the "New" toolbar icon in the Target Domain pane or by selecting Domain > Activate from the menu. This can open the Activate Domain dialog (see Diagram 19: Configuration Dialog: Activate Domain). After successful completion of the domain activation process (see Diagram 21: Progress Dialog: Domain Activation in Progress), the user can return to the Prediction tab with the newly-activated domain added to the list of domains in the Target Domain pane.
- The user may view/modify a domain's properties by selecting that domain from the list and either clicking the "Properties" toolbar icon in the Target Domain pane or selecting Domain > Properties from the menu. This can open the Domain Properties dialog (see Diagram 24: Configuration Dialog: Domain Properties). After successful completion of the domain update process, the user returns to the Prediction tab.
- The user may deactivate a domain by selecting that domain from the list and either clicking the "Delete" toolbar icon in the Target Domain pane or selecting Domain > Delete from the menu. This opens the Deactivate Domain confirmation dialog (see Diagram 25: Confirmation Dialog: Deactivate Domain). After successful completion of the domain deactivation process (see Diagram 26: Progress Dialog: Domain Deactivation in Progress), the user can return to the Prediction tab with the deactivated domain removed from the list of domains in the Target Domain tab.
- The user may view a signature bundle's properties by selecting that bundle from the list and clicking the "Properties" toolbar icon in the Signature Bundle pane. This can open the Signature Bundle Properties dialog (see Diagram 28: Configuration Dialog: Signature Bundle Properties) (read-only in v1).
- The user may evaluate the selected signature bundle in the selected domain by clicking Go. If the domain's admin credentials are not persisted, this can open the Domain Login dialog (Diagram 20: Login Dialog: Domain Login); otherwise, it opens the Evaluation in Progress dialog (see Diagram 22: Progress Dialog: Evaluation in Progress). After successful completion of the evaluation process, the Results tab can appear as the active tab (see Diagram 30: Tab: Results).

Window/Tab Attributes

| Tab Title | Prediction |
|---|---|
| Pane Titlebar | Each of the three panes on the Prediction tab can have its own titlebar. The titles can be "Select a Signature Bundle", "Select a Target Domain" and "Evaluate". Each pane's default style is from look-and-feel. Each pane can have an active (focused) state and an inactive (focus elsewhere) state. A user click on any of a pane's controls (toolbar icons, list of bundles or domains, Go button) can bring focus to the pane and highlights its titlebar. |
| Tab resizing | No |
| Pane resizing | No |
| Close | N/A |
| Minimize | N/A |
| Reposition | N/A |
| Persistence | The tool can remember the default signature bundle and target domain. |
| Icons |  New/Add/Activate<br> Clone/Copy<br> Properties<br> Delete/Deactivate<br> Set as Default |
| Menu Interaction | N/A |

I18n Tokens

Exemplary I18N tokens caninclude:

| ID | English |
|---|---|
| T1.MESSAGE | Your signature repository was updated on [dateformat]. |
| T1.P1.TITLE | Select a Signature Bundle |
| T1.P1.TT.NEW | New Signature Bundle |
| T1.P1.TT.CLONE | Clone Signature Bundle |
| T1.P1.TT.PROPERTIES | Signature Bundle Properties |
| T1.P1.TT.DELETE | Delete Signature Bundle |
| T1.P1.TT.DEFAULT | Set as Default Signature Bundle |
| T1.P2.TITLE | Select a Target Domain |
| T1.P2.TT.NEW | Activate Domain |

| | |
|---|---|
| T1.P2.TT.PROPERTIES | Domain Properties |
| T1.P2.TT.DELETE | Deactivate Domain |
| T1.P2.TT.DEFAULT | Set as Default Domain |
| T1.P3.TITLE | Evaluate |
| T1.P3.MESSAGE | Evaluate [selected signature bundle name] in [selected domain name\|"activate a target domain"]. |
| T1.B.GO | Go |

*(D1) Activate Domain (Configuration Dialog)*

This configuration dialog (Diagram 19: Configuration Dialog: Activate Domain) opens when the user clicks the "New" toolbar icon in the Target Domain pane of the Prediction tab or by selecting Domain > Activate from the menu. In one embodiment, a domain's admin server must be running for successful domain activation.

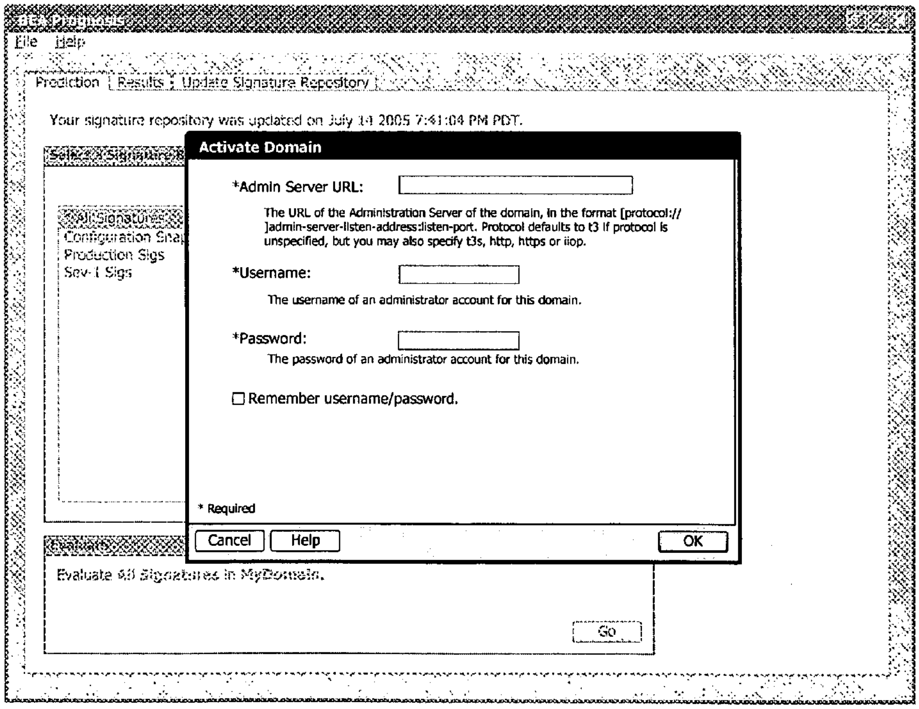

*Diagram 19: Configuration Dialog: Activate Domain*

Content

- Form fields:
  - Admin Server URL (text field with label and in-line explanation; required)
  - Username (text field with label and in-line explanation; required)
  - Password (password field with label and in-line explanation; required)
  - Remember username/password (checkbox with in-line explanation; unchecked by default). N.B. If you leave this unchecked, you can be prompted for the domain's admin credentials each time you evaluate this domain and if you deactivate the domain. (You can have the opportunity to remember it each time it prompts you, or you can save the credentials at a later time by using the Domain Properties dialog (see Diagram 24: Configuration Dialog: Domain Properties).)

- Buttons:
    - A Cancel button can appear in the button panel at the bottom of the dialog. It can be enabled.
    - An OK button can appear in the button panel at the bottom of the dialog. It can be disabled until all the required fields (URL, username and password) have been set. Once it is enabled, it can become the default button (i.e. pressing <Enter> on the keyboard has the same effect as clicking the button).

Interactions

- The user may click Cancel to close this dialog and return to the main application window without activating a new domain.
- The user may click OK to continue the process of activating the domain. This dialog can close and the Activation in Progress dialog (see Diagram 21: Progress Dialog: Domain Activation in Progress)can open.

Dialog Attributes

| | |
|---|---|
| Titlebar | Activate Domain |
| Resize | The dialog cannot be resized or minimized. The depth of the dialog is fixed to accommodate the content. |
| Close | The dialog is closed by clicking OK or Cancel. |
| Minimize | No |
| Reposition | Yes |
| Modal | Yes |
| Icons | None |
| Menu Interaction | Domain > Activate |

I18n Tokens

Exemplary I18N tokens may include:

| ID | English |
|---|---|
| D1.TITLE | Activate Domain |
| D1. INSTR | Enter domain activation configuration information. |
| D1.F1.LABEL | Admin Server URL |
| D1.F1.HELP | The URL of the Administration Server of the domain, in the format [protocol://]admin-server-listen-address:listen-port. Protocol defaults to t3 if protocol unspecified, but you may also specify t3s, http, https or iiop. |
| D1.F2.LABEL | Username |
| D1.F2.HELP | The username of an administrator account for this domain. |
| D1.F3.LABEL | Password |
| D1.F3.HELP | The password of an administrator account for this domain. |
| D1.F4.LABEL | Remember username/password. |
| *B.CANCEL* | *Cancel* |
| *B.HELP* | *Help* |

| ID | English |
|---|---|
| *B.OK* | *OK* |

*(D2) Domain Login (Login Dialog)*

This dialog (Diagram 20: Login Dialog: Domain Login) can open when you evaluate or deactivate a domain which does not have its admin credentials persisted.

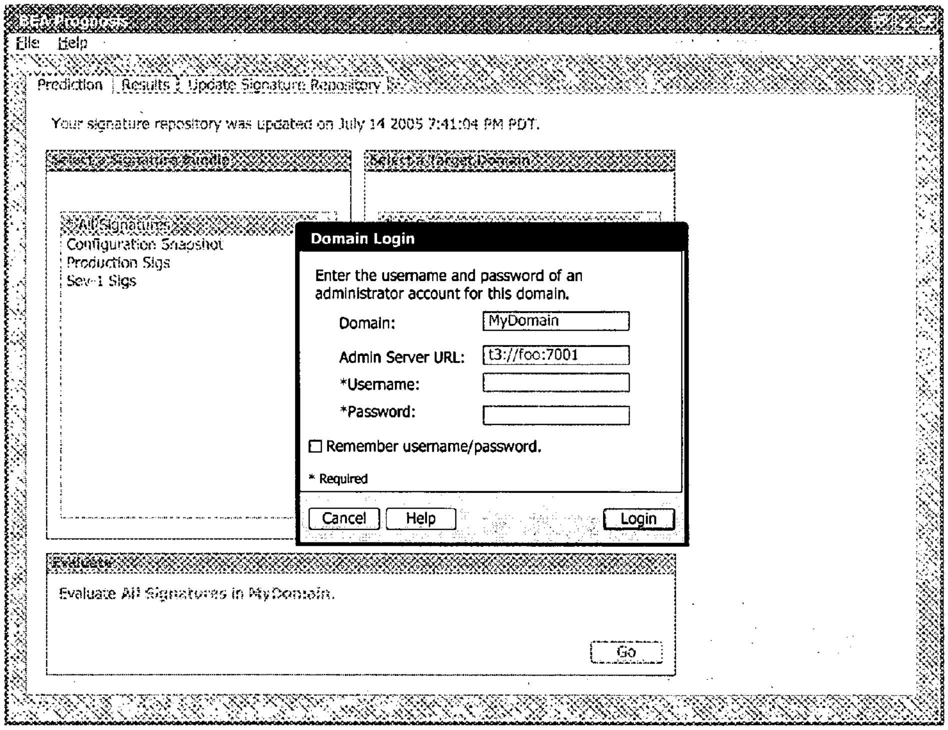

*Diagram 20: Login Dialog: Domain Login*

N.B. There need not be any domain logout dialog or process. If the user has not chosen to persist the admin credentials, they can be prompted for them each time they evaluate the domain, even in the same application session.

Content

- In-line help text: "Enter the username and password of an administrator account for this domain."
- Form Fields
    - Domain Name (read-only text field with label)
    - Admin Server URL (read-only text field with label)
    - Username (text field with label; required)
    - Password (password field with label; required)
    - Remember username/password (checkbox with in-line explanation; unchecked by default)

- Buttons
    - A Cancel button can appear in the button panel at the bottom of the dialog. It can be enabled.
    - A Login button can appear in the button panel at the bottom of the dialog. It can be disabled until all the required fields (username and password) have been set. Once it is enabled, it becomes the default button (i.e. pressing <Enter> on the keyboard has the same effect as clicking the button).

Interactions

- The user may click Cancel to close this dialog. If the dialog was launched as part of the evaluation task, the user can return to the Prediction tab of the main application window. If the dialog was launched as part of the domain deactivation task, the user can return to the Domain Deactivation confirmation dialog.
- The user may click Login to continue with the task (evaluation or deactivation). If the Remember checkbox was checked, the username and password can be stored in the application's domain registry. If authentication is successful and the dialog was launched as part of the evaluation task, this dialog can close and the Evaluation in Progress dialog (see Diagram 22: Progress Dialog: Evaluation in Progress) can open. If authentication is successful and the dialog was launched as part of the deactivation task, this dialog can close and the Domain Deactivation in Progress dialog (see Diagram 26: Progress Dialog: Domain Deactivation in Progress) can open.

Dialog Attributes

| | |
|---|---|
| Titlebar | Domain Login |
| Resize | The dialog cannot be resized or minimized. The depth of the dialog is fixed to accommodate the content. |
| Close | The dialog can be closed by clicking Login or Cancel. |
| Minimize | No |
| Reposition | Yes |
| Modal | Yes |
| Icons | None |
| Menu Interaction | N/A |

Errors & Logging

| Action | Activity Type | Data |
|---|---|---|
| Log | Domain Login: Success | • timestamp<br>• domain ID |
| Log & Open Error Dialog | Domain Login Error: Authenticaion Failed | • timestamp<br>• domain ID |
| Log & Open Error Dialog | Domain Login Error: Admin Server Not Responding | • timestamp<br>• domain ID |

I18n Tokens

| ID | English |
|---|---|
| D2.TITLE | Domain Login |

| | |
|---|---|
| D2.INSTR | Enter the username and password of an administrator account for this domain. |
| D2.F1.LABEL | Domain |
| D2.F2.LABEL | Admin Server URL |
| D2.F3.LABEL | Password |
| D2.F4.LABEL | Remember username/password. |
| *B.CANCEL* | *Cancel* |
| *B.HELP* | *Help* |
| *B.OK* | *OK* |

*(D3) Domain Activation in Progress (Progress Dialog)*

This progress dialog (Diagram 21: Progress Dialog: Domain Activation in Progress) opens in response to the user clicking OK from the Activate Domain configuration dialog (see Diagram 19: Configuration Dialog: Activate Domain).

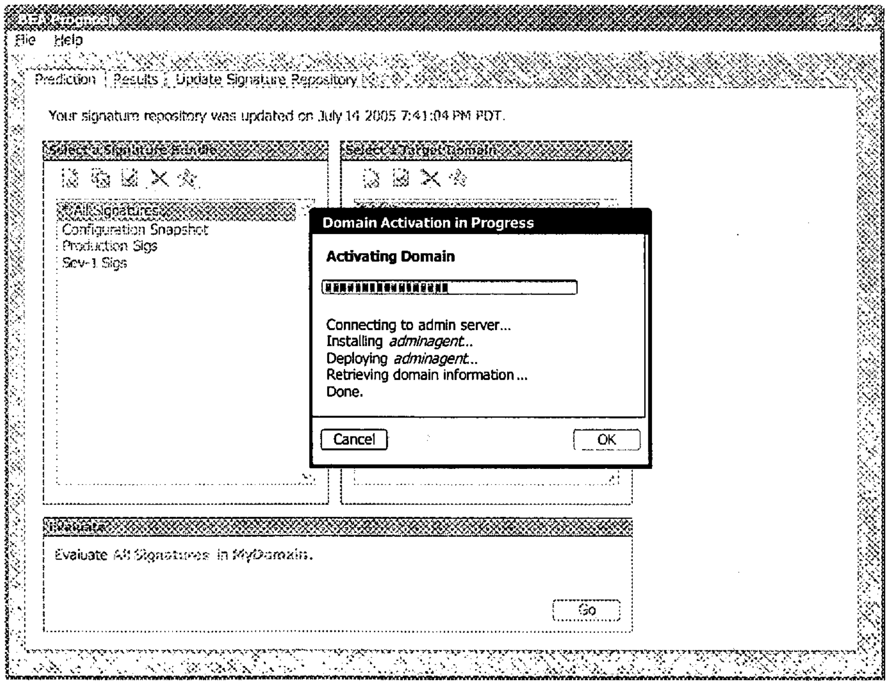

*Diagram 21: Progress Dialog: Domain Activation in Progress*

Content

- The dialog subtitle can display the message "Activating Domain."
- The animated progress bar can oscillate until the evaluation is complete. (It does not update in proportion to the percentage of the task completed.)
- Five progress messages can appear below the progress bar, each message can appear as the activation process completes each of its component processes.

- A Cancel button can appear in the button panel at the bottom of the dialog. It can be enabled by default; it can be disabled when the activation process is complete.
- An OK button can appear in the button panel at the bottom of the dialog. It can be disabled by default; it can be enabled when the activation process is complete.

Interactions

- Domain Activation in Progress
  - "Connecting to admin server…" can appear when the dialog opens. During this step, the tool can attempt to establish a connection with the admin server of the domain.
  - If the current version of the adminagent is already installed, simply add this Predictive support client to the adminagent's client list and skip to the "Retrieving domain information" step.
  - "Installing adminagent…" appears on the next line. During this step, the adminagent can be installed on the domain's admin server.
  - "Deploying adminagent…" appears on the next line. During this step, the adminagent can be deployed to the domain's admin server.
  - "Retrieving domain information…" appears on the next line. During this step, the adminagent retrieves the domain inventory (see Domain Inventory).
  - "Done" appears on the next line. This can be the signal that the process has completed successfully. The Cancel button can be disabled and the OK button can be enabled.
- In one embodiment, the user may interrupt the domain activation process at any time by clicking the Cancel button. Cancellation implies full rollback, i.e. the adminagent can be undeployed and uninstalled. The user returns to the Activate Domain configuration dialog with the form field data still in place.
- Once the domain activation process is complete, the user may click the OK button. This can persist the new domain to the application's domain registry, closes the dialog, and returns the user to the main application window's active tab. The newly-activated domain can now appear in the Target Domain pane of the Prediction tab.

Dialog Attributes

| | |
|---|---|
| Titlebar | Domain Activation in Progress |
| Resize | The dialog cannot be resized or minimized. The depth of the dialog can be fixed to accommodate the content. |
| Close | The dialog can be closed by clicking OK or Cancel. |
| Minimize | No |
| Reposition | Yes |
| Modal | Yes |
| Icons |  Animated (oscillating) progress bar |
| Menu Interaction | |

Errors & Logging

| Action | Activity Type | Data |
|---|---|---|
| Log | Domain Activation: Success | • timestamp |

| | | |
|---|---|---|
| | | • domain ID |
| Log & Open Error Dialog | Domain Activation Error: Error installing adminagent (must rollback, i.e. uninstall adminagent) | • timestamp<br>• installation error details |
| Log & Open Error Dialog | Domain Activation Error: Error deploying adminagent (must rollback, i.e. leave adminagent undeployed and uninstalled) | • timestamp<br>• deployment error details |
| Log & Open Error Dialog | Domain Activation Error: Error retrieving Domain Information (must rollback, i.e. leave adminagent undeployed and uninstalled) | • timestamp<br>• error details |
| Log & Open Error Dialog | Domain Deactivation Error: Error updating AdminAgent's client list | • timestamp<br>• error details |

I18n Tokens

| ID | English |
|---|---|
| D3.TITLE | Domain Activation in Progress |
| D3.SUBTITLE | Activating Domain |
| D3.PR1.LABEL | Connecting to admin server... |
| D3.PR2.LABEL | Installing adminagent... |
| D3.PR3.LABEL | Deploying adminagent... |
| D3.PR4.LABEL | Retrieving domain information... |
| D3.PR5.LABEL | Done |
| *B.CANCEL* | *Cancel* |
| *B.OK* | *OK* |

*(D4) Evaluation in Progress (Progress Dialog)*

This progress dialog (Diagram 22: Progress Dialog: Evaluation in Progress) opens in response to the user clicking Go from the Prediction tab (see Diagram 17: Tab: Prediction (with domains activated)). If the target domain selected does not have its admin credentials persisted, the Domain Login dialog (see Diagram 20: Login Dialog: Domain Login) can open first.

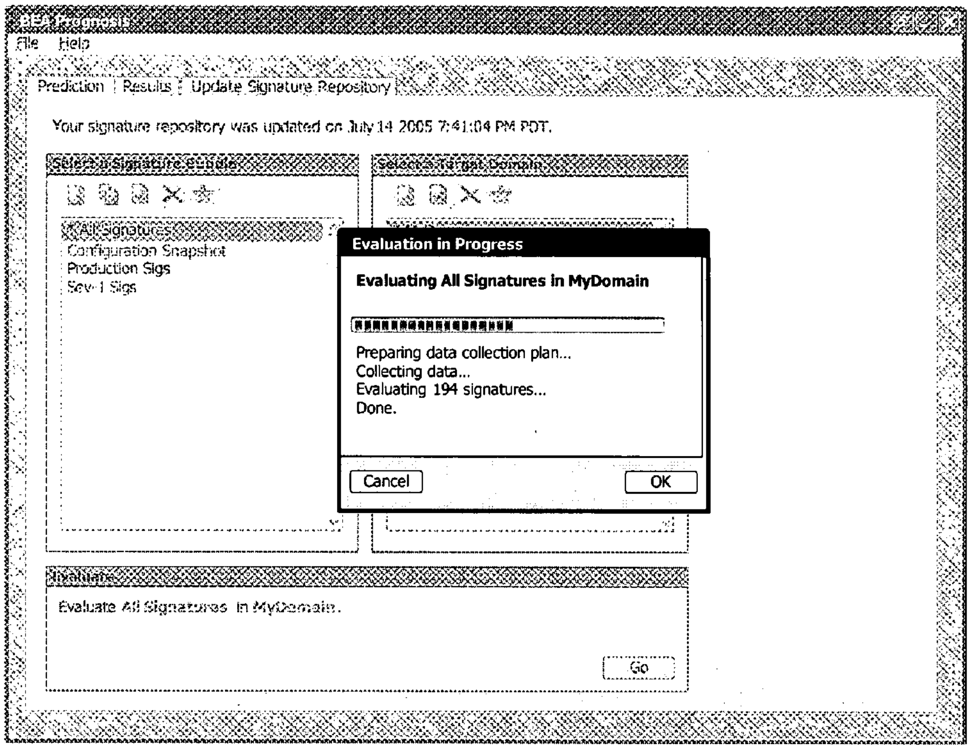

*Diagram 22: Progress Dialog: Evaluation in Progress*

Content

- The dialog subtitle can display the message "Evaluating [signature bundle name] in [target domain name]."
- The animated progress bar can oscillate until the evaluation is complete. (It does not update in proportion to the percentage of the task completed.)
- Four progress messages can appear below the progress bar, each message can appear as the evaluation process completes each of its component processes.
- A Cancel button can appear in the button panel at the bottom of the dialog. It can be enabled by default; it can be disabled when the evaluation process is complete.
- A Go button can appear in the button panel at the bottom of the dialog. It can be disabled by default; it can be enabled when the evaluation process is complete.

Interactions

- Evaluation in Progress
  - "Preparing data collection plan..." can appear when the dialog opens. If an existing data collection plan for the selected bundle is still valid, the next message displays right away. If the signature bundle has never been evaluated or if its list of signatures has changed since the last time it was evaluated, a data collection plan can be created and persisted.

- "Collecting data…" can appear on the next line. During this step, data can be retrieved from the target domain. The domain inventory can be also refreshed at this time.
  - "Evaluating [n] signatures…" (where n is the number of signatures in the bundle being evaluated) can appear on the next line.
  - "Done" can appear on the next line. This can be the signal that the process has completed successfully. The Cancel button can be disabled and the OK button can be enabled.
- The user may interrupt the evaluation process at any time by clicking the Cancel button. This deletes any results artifacts which may have already been persisted, and close the dialog. The user can return to the Prediction tab.
- Once the evaluation process is complete, the user may click the OK button. This can close the dialog and returns the user to the main application window with the Results tab active (see Diagram 30: Tab: Results) and the current evaluation results displayed.

Dialog Attributes

| | |
|---|---|
| Titlebar | Evaluation in Progress |
| Resize | In one embodiment, the dialog cannot be resized or minimized. The depth of the dialog can be fixed to accommodate the content. |
| Close | The dialog can be closed by clicking OK or Cancel. |
| Minimize | No |
| Reposition | Yes |
| Modal | Yes |
| Icons | <br>Animated (oscillating) progress bar |
| Menu Interaction | None |

- error writing out results (must rollback if partial results were written)

Errors & Logging

| Action | Activity Type | Data |
|---|---|---|
| Log | Evaluation: Success | • timestamp<br>• bundle ID<br>• domain ID |
| Log & Open Error Dialog | Evaluation Error: Error reading a signature | • timestamp<br>• bundle ID<br>• domain ID<br>• signature ID<br>• error details |
| Log & Open Error Dialog | Evaluation Error: Error connecting to a data source (e.g. the domain's admin server) | • timestamp<br>• bundle ID<br>• domain ID<br>• connection error details |
| Log & Open Error Dialog | Evaluation Error: Error collecting data | • timestamp<br>• bundle ID |

| | | |
|---|---|---|
| | | • domain ID<br>• error details |
| Log & Open Error Dialog | Evaluation Error: Signature Expression Syntax Error | • timestamp<br>• bundle ID<br>• domain ID<br>• signature ID<br>• error details |
| Log & Open Error Dialog | Evaluation Error: Error writing out results (e.g. no write permission to results directory, out of disk space, etc.) | • timestamp<br>• bundle ID<br>• domain ID<br>• I/O error details |
| Signature Log | Record each signature evaluated in signature.log. | • timestamp<br>• bundle ID<br>• domain ID<br>• signature ID<br>• signature version<br>• detected? |

I18n Tokens

| ID | English |
|---|---|
| D4.TITLE | Evaluation in Progress |
| D4.SUBTITLE | Evaluating [selected signature bundle name] in [selected domain name] |
| D4.PR1.LABEL | Preparing data collection plan… |
| D4.PR2.LABEL | Collecting data… |
| D4.PR3.LABEL | Evaluating [count] signatures… |
| D4.PR4.LABEL | Done |
| *B.CANCEL* | *Cancel* |
| *B.OK* | *OK* |

The following flowchart (Diagram 23: Flow: Domain Properties/Deactivate) illustrates the domain properties and domain deactivation processes.

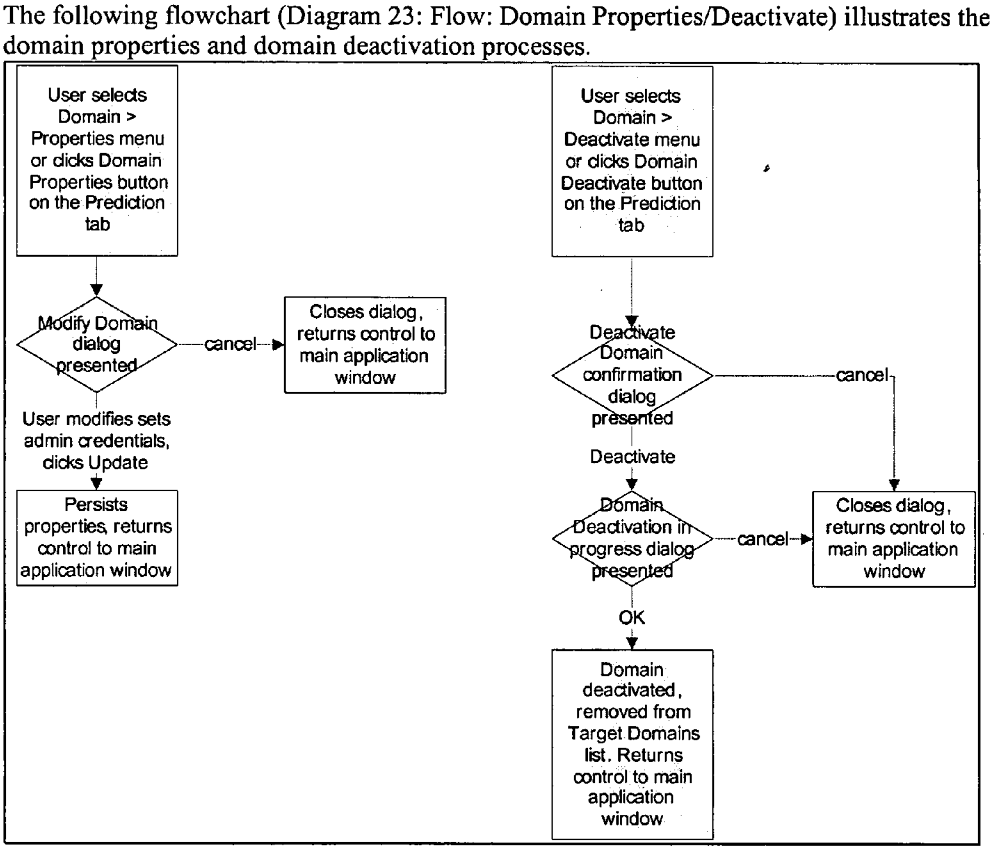

*Diagram 23: Flow: Domain Properties/Deactivate*

*(D5) Domain Properties (Configuration Dialog)*

This configuration dialog (Diagram 24: Configuration Dialog: Domain Properties) can open when the user clicks the "Properties" toolbar icon in the Target Domain pane of the Prediction tab (Diagram 17: Tab: Prediction (with domains activated)) or by selecting Domain > Properties from the menu. The dialog can display the properties for the domain which was selected in the Target Domain pane of the Prediction tab.

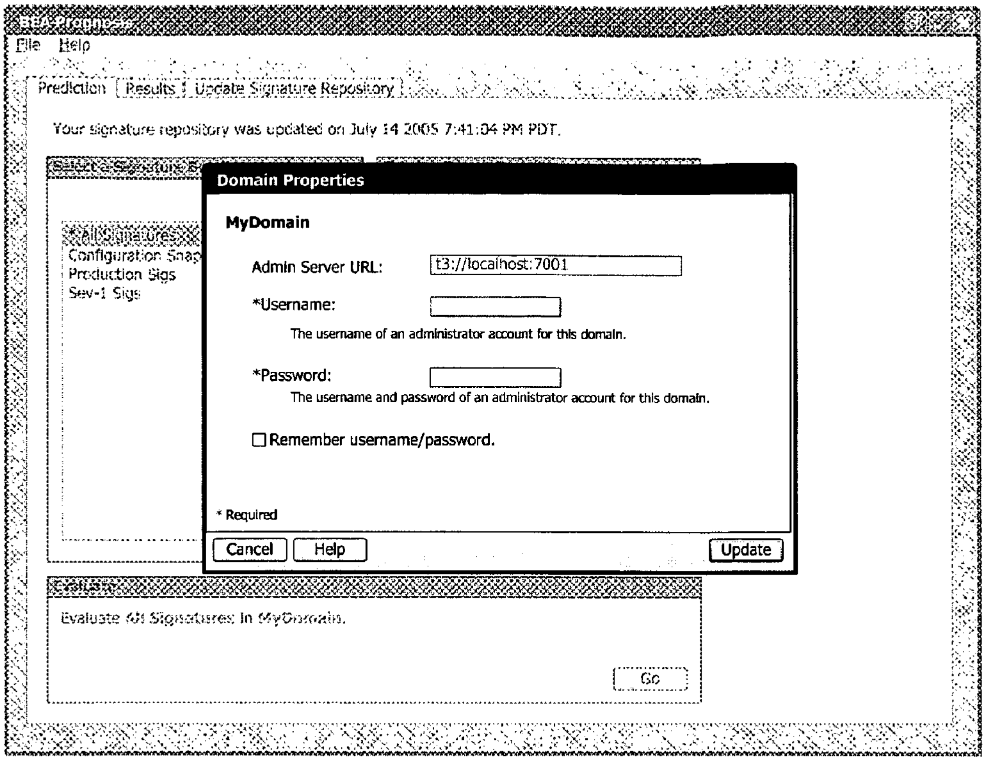

*Diagram 24: Configuration Dialog: Domain Properties*

Content

- The dialog subtitle displays the domain name.
- Form fields:
    - Admin Server URL (read-only text field with label)
    - Username (text field with label and in-line explanation; required)
    - Password (password field with label and in-line explanation; required)
    - Remember username/password (checkbox with in-line explanation; unchecked by default). N.B. If you leave this unchecked, you can be prompted for the domain's admin credentials each time you evaluate this domain and if you deactivate the domain.
- Buttons:
    - A Cancel button can appear in the button panel at the bottom of the dialog. It can be enabled.
    - An Update button appears in the button panel at the bottom of the dialog. It can be disabled until all the required fields (URL, username and password) have been set. Once it is enabled, it can become the default button (i.e. pressing <Enter> on the keyboard has the same effect as clicking the button).

Interactions

- The user may click Cancel to close this dialog and return to the main application window without modifying the domain properties.
- The user may click Update to persist the changes to the domain properties. This dialog can close and the user can return to the main application window.

Dialog Attributes

| | |
|---|---|
| Titlebar | Domain Properties |
| Resize | The dialog cannot be resized or minimized. The depth of the dialog can be fixed to accommodate the content. |
| Close | The dialog can be closed by clicking Update or Cancel. |
| Minimize | No |
| Reposition | Yes |
| Modal | Yes |
| Icons | None |
| Menu Interaction | Domain > Properties |

Errors & Logging

| Action | Activity Type | Data |
|---|---|---|
| Log & Open Error Dialog | Error Saving Domain Properties | • timestamp<br>• domain ID |

I18n Tokens

| ID | English |
|---|---|
| D5.TITLE | Domain Properties |
| D5.SUBTITLE | [selected domain name] |
| D5.F1.LABEL | Admin Server URL |
| D5.F2.LABEL | Username |
| D5.F2.HELP | The username of an administrator account for this domain. |
| D5.F3.LABEL | Password |
| D5.F3.HELP | The password of an administrator account for this domain. |
| D5.F4.LABEL | Remember username/password. |
| *F.REQUIRED* | *Required* |
| *B.CANCEL* | *Cancel* |
| *B.OK* | *OK* |

*(D6) Deactivate Domain (Confirmation Dialog)*

The user may deactivate a domain by selecting that domain from the list of Target Domains in the Prediction tab, then either clicking the "Delete" toolbar icon in the Target Domain pane or selecting Domain > Delete from the menu. This confirmation dialog (Diagram 25: Confirmation Dialog: Deactivate Domain) opens in response to either of these activities.

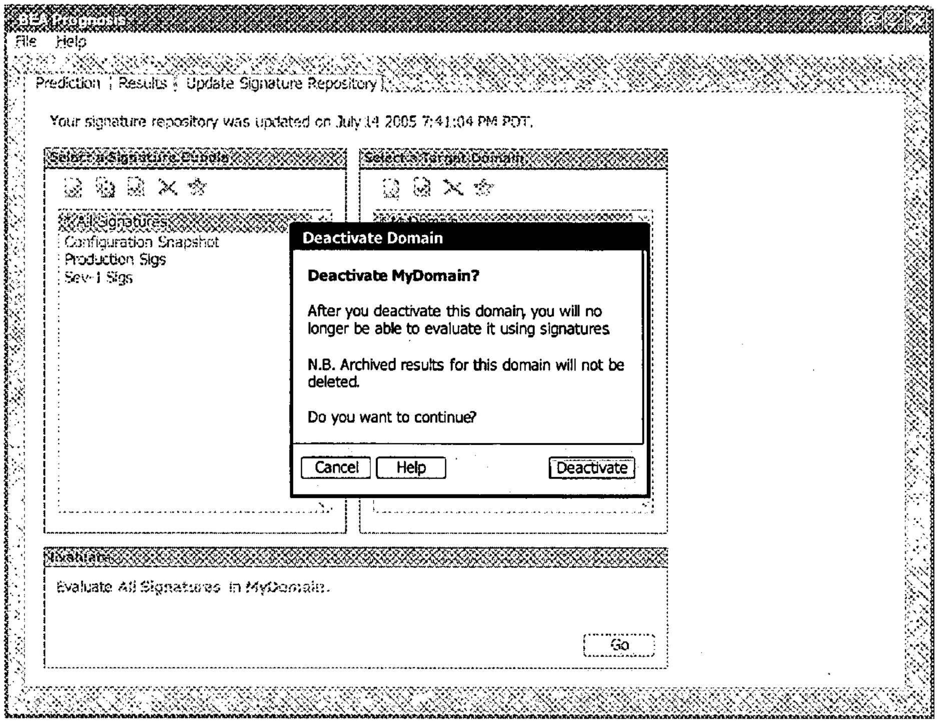

*Diagram 25: Confirmation Dialog: Deactivate Domain*

Content

- The dialog subtitle can display the message "Deactivate [target domain name]?"
- Some in-line help text can display to explain the deactivation process, ending with "Do you want to continue?"
- A Cancel button can appear in the button panel at the bottom of the dialog. It can be enabled by default.
- A Deactivate button can appear in the button panel at the bottom of the dialog. It can be enabled by default and it can be the default button for this dialog.

Interactions

- The user may cancel the domain deactivation by clicking the Cancel button. Cancellation can return the user to the main application window's active tab without deactivating the domain.
- The user may click the Deactivate button to deactivate the domain. If the domain's admin credentials can be persisted, this closes this confirmation dialog and open the Domain Deactivation in Progress dialog (see Diagram 26: Progress Dialog: Domain Deactivation in Progress). If the domain's admin credentials are not persisted, this can close this confirmation dialog and opens the Domain Login dialog (see Diagram 20: Login Dialog: Domain Login) before proceeding to the Domain Deactivation in Progress dialog.

Dialog Attributes

| | |
|---|---|
| Titlebar | Deactivate Domain |
| Resize | The dialog cannot be resized or minimized. The depth of the dialog can be fixed to accommodate the content. |
| Close | The dialog can be closed by clicking Deactivate or Cancel. |
| Minimize | No |
| Reposition | Yes |
| Modal | Yes |
| Icons | None |
| Menu Interaction | Domain > Deactivate |

I18n Tokens

| ID | English |
|---|---|
| D6.TITLE | Deactivate Domain |
| D6.SUBTITLE | Deactivate [selected domain name]? |
| D6.MESSAGE | After you deactivate this domain, you can no longer be able to evaluate it using signatures. \n N.B. Archived results for this domain can not be deleted. \n Do you want to continue? |
| D6.B.DEACTIVATE | Deactivate |
| *B.CANCEL* | *Cancel* |
| *B.HELP* | *Help* |

*(D7) Domain Deactivation in Progress (Progress Dialog)*

This progress dialog (Diagram 26: Progress Dialog: Domain Deactivation in Progress) opens in response to the user clicking Deactivate from the Deactivate Domain confirmation dialog (see Diagram 25: Confirmation Dialog: Deactivate Domain). If the domain selected does not have its admin credentials persisted, the Domain Login dialog (see Diagram 20: Login Dialog: Domain Login) can open first.

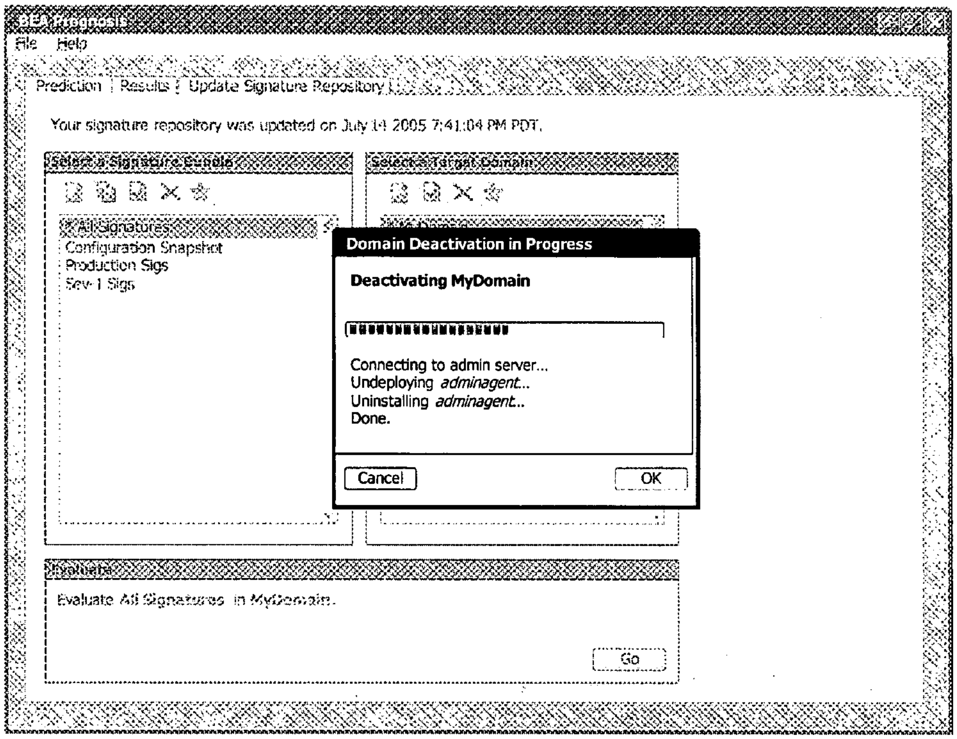

*Diagram 26: Progress Dialog: Domain Deactivation in Progress*

Content

- The dialog subtitle can display the message "Deactivating [target domain name]."
- The animated progress bar can oscillate until the evaluation can be complete. (It does not update in proportion to the percentage of the task completed.)
- Four progress messages appear below the progress bar, each message can appear as the deactivation process completes each of its component processes.
- A Cancel button can appear in the button panel at the bottom of the dialog. It can be enabled by default; it can be disabled when the deactivation process is complete.
- An OK button can appear in the button panel at the bottom of the dialog. It can be disabled by default; it can be enabled when the deactivation process is complete.

Interactions

- Domain Deactivation in Progress
    - "Connecting to admin server…" appears when the dialog opens. During this step, the tool can attempt to establish a connection with the admin server of the domain.
    - If multiple Predictive support clients have activated this domain, this client can be removed from the adminagent's list of its clients but the adminagent can remain installed and deployed. The message "undeploy" and "uninstall" progress messages can be skipped and it displays the "done" message. If it is the only client on the list, it can proceed with undeploying and uninstalling the adminagent.

- o "Undeploying adminagent..." appears on the next line. During this step, the adminagent can be undeployed from the domain's admin server. N.B. This step, in turn, can undeploy and uninstall any managedagents that were installed.
- o "Uninstalling adminagent..." can appear on the next line. During this step, the adminagent can be uninstalled from the domain's admin server.
- o "Done" appears on the next line. This can be the signal that the process has completed successfully. The Cancel button can be disabled and the OK button can be enabled.

- The user may interrupt the domain deactivation process at any time by clicking the Cancel button. Cancellation can imply full rollback, i.e. the adminagent can be left in an installed and deployed state and this client can be still on the adminagent's list. The user can return to the main application window's active tab.
- Once the domain deactivation process is complete, the user may click the OK button. This can mark the domain's record in the application's domain registry as deactivated, closes the dialog, and return the user to the main application window's active tab. In one embodiment, the deactivated domain can no longer appear in the Target Domain pane of the Prediction tab.

Dialog Attributes

| | |
|---|---|
| Titlebar | Domain Deactivation in Progress |
| Resize | The dialog cannot be resized or minimized. The depth of the dialog is fixed to accommodate the content. |
| Close | The dialog can be closed by clicking OK or Cancel. |
| Minimize | No |
| Reposition | Yes |
| Modal | Yes |
| Icons |  Animated (oscillating) progress bar |
| Menu Interaction | |

Errors & Logging

| Action | Activity Type | Data |
|---|---|---|
| Log | Domain Deactivation: Success | • timestamp<br>• domain ID |
| Log & Open Error Dialog | Domain Deactivation Error: Error undeploying adminagent (must rollback, i.e. leave adminagent deployed) | • timestamp<br>• undeployment error details |
| Log & Open Error Dialog | Domain Deactivation Error: Error uninstalling adminagent (must rollback, i.e. leave adminagent installed and deployed) | • timestamp<br>• uninstallation error details |
| Log & Open Error Dialog | Domain Deactivation Error: Error updating domain registry (must rollback, i.e. leave adminagent installed and deployed) | • timestamp<br>• error details |
| Log & Open Error Dialog | Domain Deactivation Error: Error updating AdminAgent's client list | • timestamp |

| Action | Activity Type | Data |
|---|---|---|
| | | • error details |

I18n Tokens

| ID | English |
|---|---|
| D7.TITLE | Domain Deactivation in Progress |
| D7.SUBTITLE | Deactivating [selected domain name] |
| D7.PR1.LABEL | Connecting to admin server… |
| D7.PR2.LABEL | Undeploying adminagent… |
| D7.PR3.LABEL | Uninstalling adminagent… |
| D7.PR4.LABEL | Done |
| *B.CANCEL* | *Cancel* |
| *B.OK* | *OK* |

*(D8) Signature Bundle Properties (Configuration Dialog)*

This flowchart (Diagram 27: Flow: Signature Bundle Properties) illustrates the process for viewing more information about a bundle of signatures.

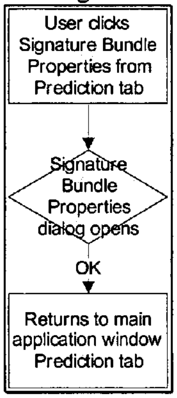

*Diagram 27: Flow: Signature Bundle Properties*

The user may view a signature bundle's properties by selecting the bundle from the list of bundles (in the Prediction tab's Signature Bundles pane) then clicking the "Properties" toolbar icon in the Signature Bundle pane. This can open the Signature Bundle Properties dialog (Diagram 28: Configuration Dialog: Signature Bundle Properties).

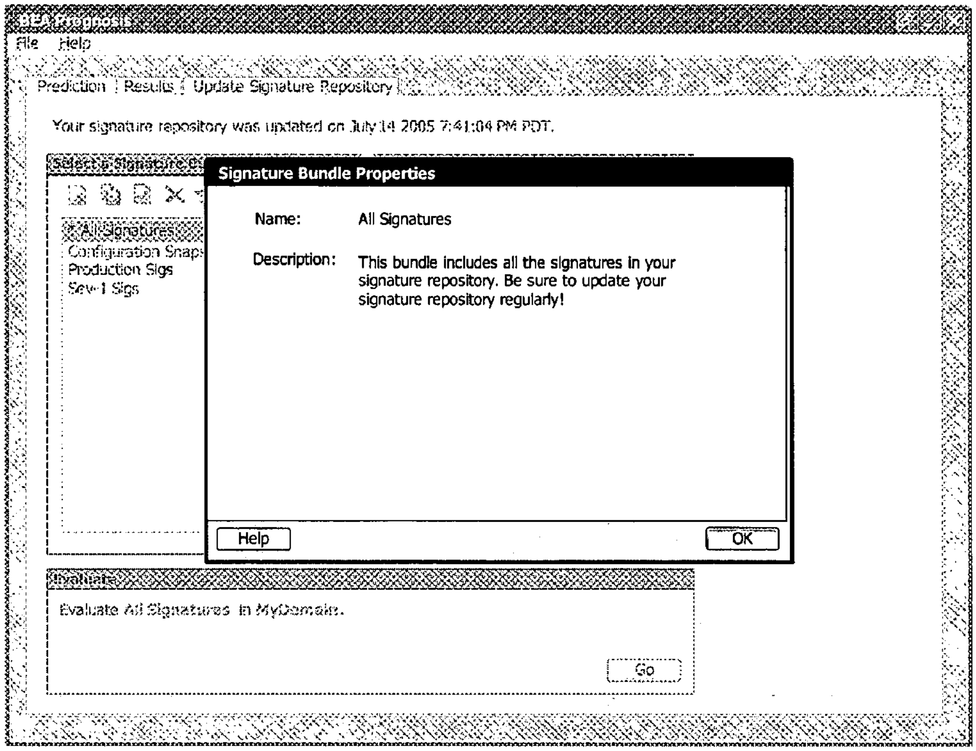

*Diagram 28: Configuration Dialog: Signature Bundle Properties*

Content

- Form Fields:
  - Name (read-only text field and label)
  - Description (read-only text area and label; display and enable vertical and/or horizontal scrollbars as needed)
- Buttons:
  - A Cancel button can appear in the button panel at the bottom of the dialog. It can be enabled.
  - An OK button appears in the button panel at the bottom of the dialog. It can be enabled and can be the default button (i.e. pressing <Enter> on the keyboard has the same effect as clicking the button).

Interactions

- The user may click Cancel to close this dialog and return to the Prediction tab in the main application window.
- The user may click OK to close this dialog and return to the Prediction tab in the main application window. (In a future release, bundles can be user-editable so the distinction between Cancel and OK can make more sense.)

Dialog Attributes

| | |
|---|---|
| Titlebar | Signature Bundle Properties |
| Resize | The dialog cannot be resized or minimized. The depth of the dialog can be fixed to accommodate the content. |
| Close | The dialog can be closed by clicking OK or Cancel. |
| Minimize | No |
| Reposition | Yes |
| Modal | Yes |
| Icons | None |
| Menu Interaction | N/A |

I18n Tokens

| ID | English |
|---|---|
| D8.TITLE | Signature Bundle Properties |
| D8.F1.LABEL | Name |
| D8.F2.LABEL | Description |
| *B.HELP* | *Help* |
| *B.OK* | *OK* |

Results

This flowchart (Diagram 29: Flow: Results) illustrates the main interactions that can be available from the application's Results tab.

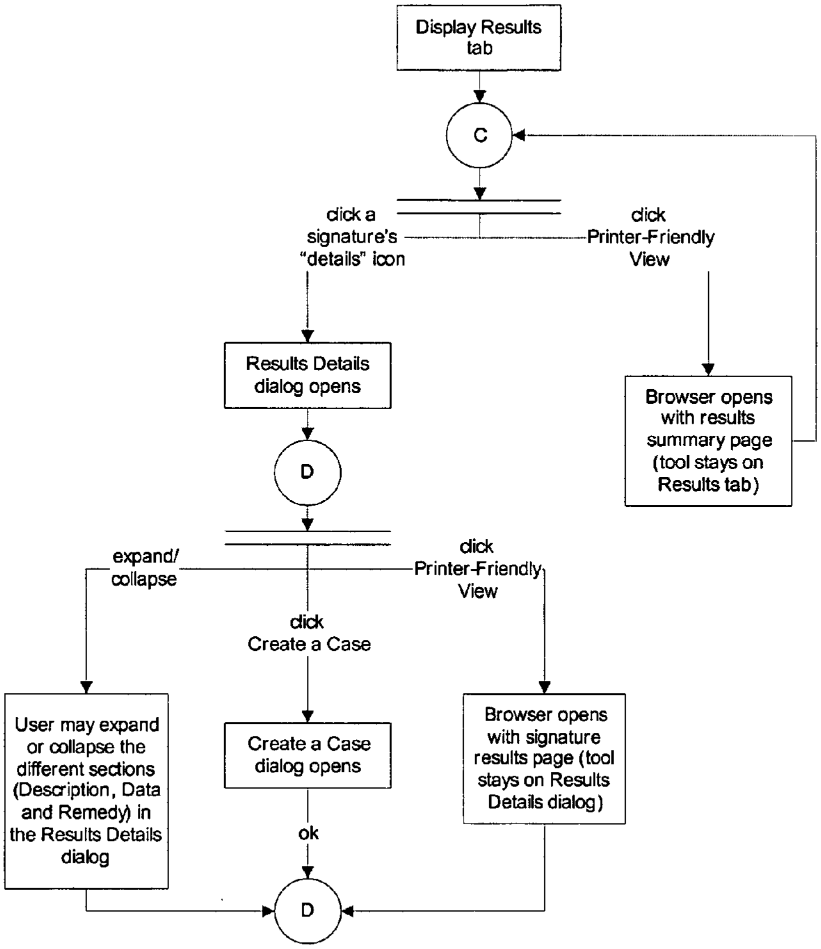

*Diagram 29: Flow: Results*

*(T2) Results (Tab)*

When the user evaluates signatures in a domain and clicks OK from the Evaluation in Progress dialog, the Results tab can open displaying a summary of the results of that evaluation. The user may also click on the Results tab at any time to view the results from the most recent evaluation. The summary table can display signatures which were detected and snapshots taken.

The next two diagrams illustrate the Results tab with (Diagram 30: Tab: Results) and without (Diagram 31: Tab: Results (no results)) results.

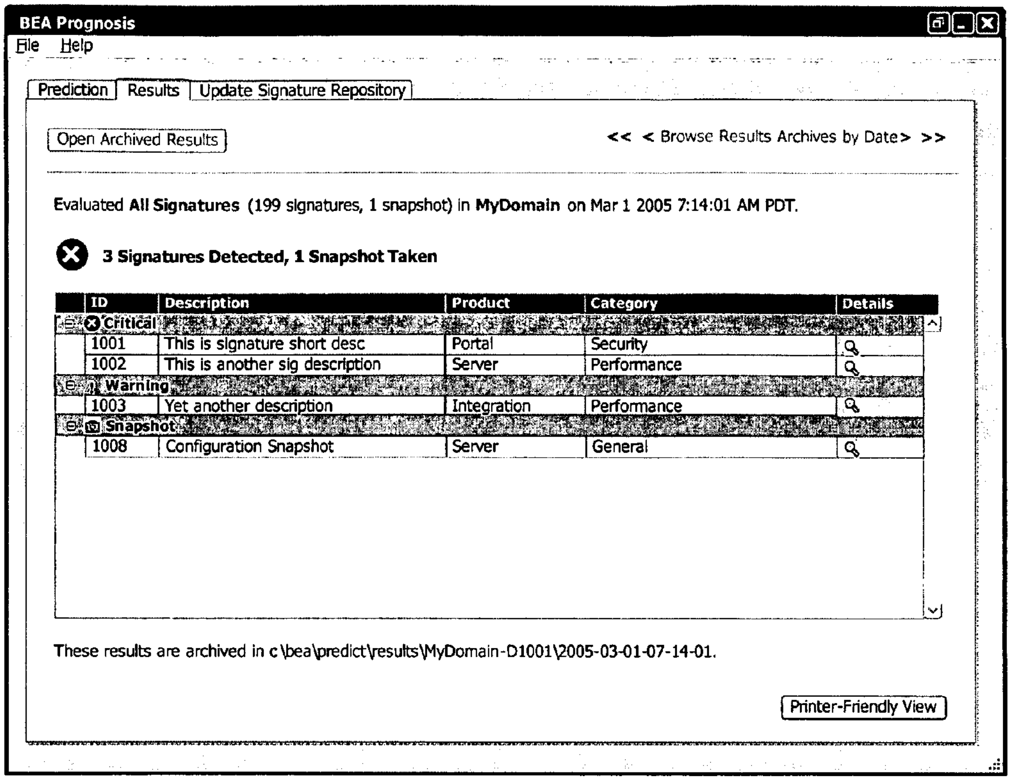

*Diagram 30: Tab: Results*

| BEA Prognosis | | | | |
|---|---|---|---|---|
| File Help | | | | |

[Prediction] [Results] [Update Signature Repository]

[Open Archived Results]     << < Browse Results Archives by Date> >>

Evaluated All Signatures (199 signatures, 1 snapshot) in MyDomain on Mar 1 2005 7:14:01 AM PDT.

❌ 3 Signatures Detected, 1 Snapshot Taken

| ID | Description | Product | Category | Details |
|---|---|---|---|---|
| **Critical** | | | | |
| 1001 | This is signature short desc | Portal | Security | 🔍 |
| 1002 | This is another sig description | Server | Performance | 🔍 |
| **Warning** | | | | |
| 1003 | Yet another description | Integration | Performance | 🔍 |
| **Snapshot** | | | | |
| 1008 | Configuration Snapshot | Server | General | 🔍 |

These results are archived in c:\bea\predict\results\MyDomain-D1001\2005-03-01-07-14-01.

[Printer-Friendly View]

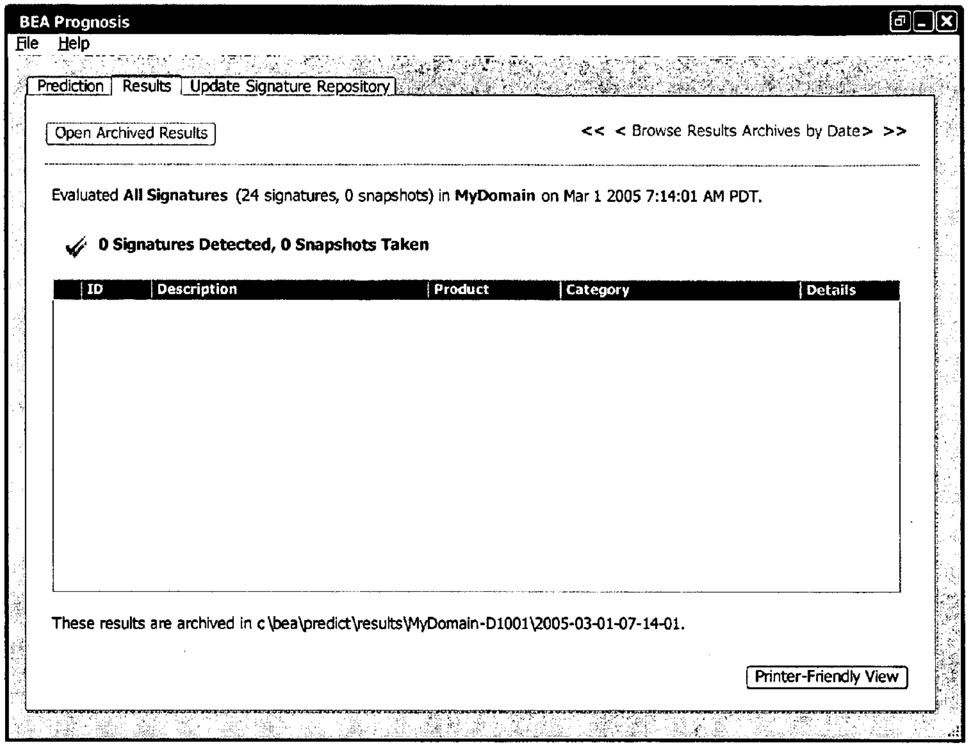

*Diagram 31: Tab: Results (no results)*

Content

- Open Archived Results button can be at the top of the tabbed panel. This button can be disabled in v1.
- Browse Archived Results by Date buttons at the top of the tabbed panel. These buttons can be disabled in v1.
- An informational message can indicate which signature bundle was evaluated, how many signatures were evaluated and how many snapshots taken, the domain name evaluated, and the date and time of the evaluation.
- The title of the results summary table includes an icon and a description.
    - The icon can represent the highest severity signature detected. For example, if a signature with Critical severity was detected, it would display the "x" icon. If no Critical signatures were detected but there were Warning signatures detected, it can display the "!" icon. If only informational signatures were detected, it can display the "i" icon. If no signatures were detected, it can display the green check mark icon.
    - The description includes the total number of signatures detected and the total number of snapshots taken.
- The results summary table can include a header row, group headings and data.
    - Columns headings for ID, Description, Product, Category and Details. Column headings can appear even if there are no results.

- Results can be grouped by severity (Critical, Warning, Informational and one Snapshot group). The group headings can be expandable and collapsible, with plus/minus icons to toggle between expanded and collapsed states; they can default to the expanded state. The group headings can include a small icon representing that severity and the severity name. In one embodiment, a group heading can only display when there are signatures/snapshot results for that group and no group headings can appear if there are no results.
- Data
    - ID of the signature/snapshot. (We don't really need to display this, but it's nice to have for the advanced to user to be able to correlate a signature they see here with the corresponding files in the repository.)
    - Short description
    - Product[i2]
    - Category[i3]
    - Details icon. This column can appear on a colored background to highlight that it is an action column.
- Display and enable a vertical scrollbar for the results table if there are more than n rows to display.

- An informational message appears on the bottom of the tabbed pane with the location of this result set in the results archives.
- Printer-Friently View button, enabled.

Interactions

- The user may click the Details icon on any results data row to open a Results Details dialog (see Diagram 34: Dialog: Detailed Results (Signature, Description pane expanded)).
- The user may click the expand/collapse +/- icon for any group heading to toggle expand/collapse the data display for that group.
- The user may click the Printer-Friendly View button to open an html version of the evaluation results summary (see Diagram 32: HTML: Results Summary Printer-Friendly View) in the default browser.

Window/Tab Attributes

| | |
|---|---|
| Tab Title | Results |
| Tab resizing | No |
| Close | N/A |
| Minimize | N/A |
| Reposition | N/A |
| Persistence | The tool displays the results from the most evaluation. |
| Icons | Critical Severity ("x") small and large icon<br>Warning Severity ("!")small and large icon<br>Informational Severity ("i") small and large icon<br>None Detected Severity (green check mark) |

| | |
|---|---|
| | Snapshot<br>Details |
| Menu Interaction | N/A |

Errors & Logging

| Action | Activity Type | Data |
|---|---|---|
| Log & Open Error Dialog | Error opening detailed results (e.g. file not found error) | • timestamp<br>• bundle ID<br>• domain ID<br>• signature ID<br>• results location |
| Log & Open Error Dialog | Error opening printer-friendly view (e.g. file not found error) | • timestamp<br>• bundle ID<br>• domain ID<br>• signature ID<br>• results location |

I18n Tokens

| ID | English |
|---|---|
| T2.MESSAGE | Evaluated [selected signature bundle name] ([count] signature(s), [count] snapshot(s)) in [selected domain name] on [dateformat]. |
| T2.SUBTITLE | [count] Signature(s) Detected, [count] Snapshot(s) Taken |
| T2.C1.LABEL | ID |
| T2.C2.LABEL | Description |
| T2.C3.LABEL | Product |
| T2.C4.LABEL | Category |
| T2.C5.LABEL | Details |
| T2.FOOTER | These results can be archived in [directory]. |
| T2.B.ARCHIVE | Open Archived Results |
| T2.B.BROWSE | Browse Results Archives by Date |
| *B.PRINTERFRIENDLY* | *Printer-Friendly View* |

*(H1) Results (Printer-Friendly View)*

The printer-friendly view of the results summary can be opened from the Printer-Friendly View button on the Results tab (see Diagram 30: Tab: Results), or a user can open the html file directly from the results archive directory.

The next two diagrams illustrate the printer-friendly view with (Diagram 32: HTML: Results Summary Printer-Friendly View) and without (Diagram 33: HTML: Results Summary Printer-Friendly View (no results)) results.

BEA Prognosis

Evaluated All Signatures (199 signatures, 1 snapshot) in MyDomain on Mar 1 2005 7:14:01 AM PDT.

3 Signatures Detected, 1 Snapshot Taken

*Critical*

| ID | Description | Product | Category | Details |
|---|---|---|---|---|
| 1001 | This is signature short desc | Portal | Security | Details |
| 1002 | This is another sig description | Server | Performance | Details |

*Warning*

| ID | Description | Product | Category | Details |
|---|---|---|---|---|
| 1003 | Yet another description | Integration | Performance | Details |

*Snapshot*

| ID | Description | Product | Category | Details |
|---|---|---|---|---|
| 1008 | Configuration Snapshot | Server | General | Details |

c:\bea\predict\results\MyDomain-D1001\2005-03-01-07-14-01\index.html

*Diagram 32: HTML: Results Summary Printer-Friendly View*

BEA Prognosis

Evaluated All Signatures (24 signatures, 0 snapshots) in MyDomain on Mar 1 2005 7:14:01 AM PDT.

0 Signatures Detected, 0 Snapshots Taken c:\bea\predict\results\MyDomain-D1001\2005-03-01-07-14-01\index.html

*Diagram 33: HTML: Results Summary Printer-Friendly View (no results)*

Content

- Page title: "Predictive support"
- An informational message can indicate which signature bundle was evaluated, how many signatures were evaluated and how many snapshots taken, the domain name evaluated, and the date and time of the evaluation.
- The results title can display the total number of signatures detected and the total number of snapshots taken.
- One results table displays for each severity detected and one for snapshots taken, if any. The title for each table can be the severity (Critical, Warning, Informational) or "Snapshot". In one embodiment, no table appears if there are no results.
- Data
    - ID of the signature/snapshot. (We don't really need to display this, but it's nice to have for the advanced to user to be able to correlate a signature they see here with the corresponding files in the repository.)
    - Short description

- Product
  - Category
  - Details link
- An informational message can appear in the page footer with the location of this page in the results archives.

Interactions

- The user may click a data row's Details link to open the printer-friendly details view for that item in a separate browser window.

HTML Attributes

| | |
|---|---|
| Title | Predictive support Results |
| Link Target | Links open in a new browser window. |

Errors & Logging

| Action | Activity Type | Data |
|---|---|---|
| Log & Open Error Dialog | Error opening printer-friendly view of detailed results (e.g. file not found error) | • timestamp<br>• bundle ID<br>• domain ID<br>• signature ID<br>• results location |

I18n Tokens

| ID | English |
|---|---|
| H1.MESSAGE | Evaluated [selected signature bundle name] ([count] signature(s), [count] snapshot(s)) in [selected domain name] on [dateformat]. |
| H1.SUBTITLE | [count] Signature(s) Detected, [count] Snapshot(s) Taken |
| H1.C1.LABEL | ID |
| H1.C2.LABEL | Description |
| H1.C3.LABEL | Product |
| H1.C4.LABEL | Category |
| H1.C5.LABEL | Details |
| H1.L.LABEL | Details |

*(D9) Detailed Results: Signature (Dialog)*

The Detailed Results dialog opens when the user clicks a Details icon on the Results tab, displaying the signature or snapshot details corresponding to the record whose icon was clicked. Diagram 34: Dialog: Detailed Results (Signature, Description pane expanded) shows the description pane of the detailed results dialog for a signature which was detected.

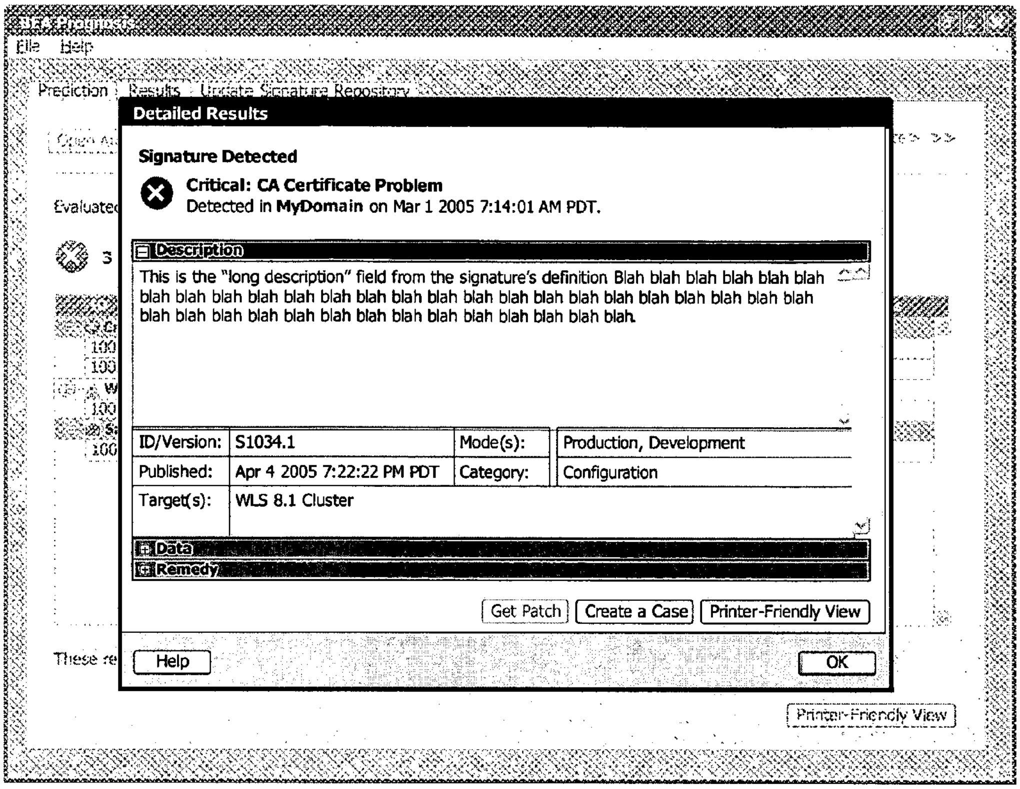
*Diagram 34: Dialog: Detailed Results (Signature, Description pane expanded)*

Diagram 35: Dialog: Detailed Results (Signature, Data pane expanded) shows the data pane of the detailed results dialog for a signature which was detected.
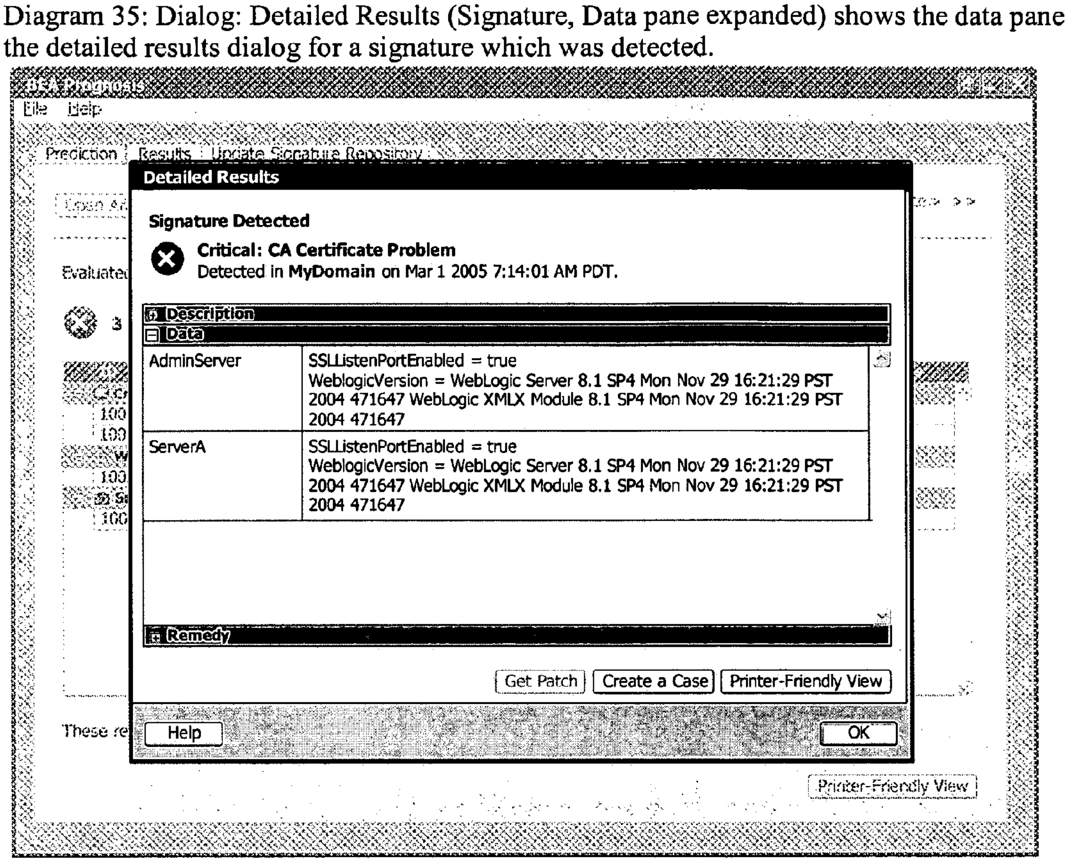
*Diagram 35: Dialog: Detailed Results (Signature, Data pane expanded)*

Diagram 36: Dialog: Detailed Results (Signature, Remedy pane expanded) shows the remedy pane of the detailed results dialog for a signature which was detected.
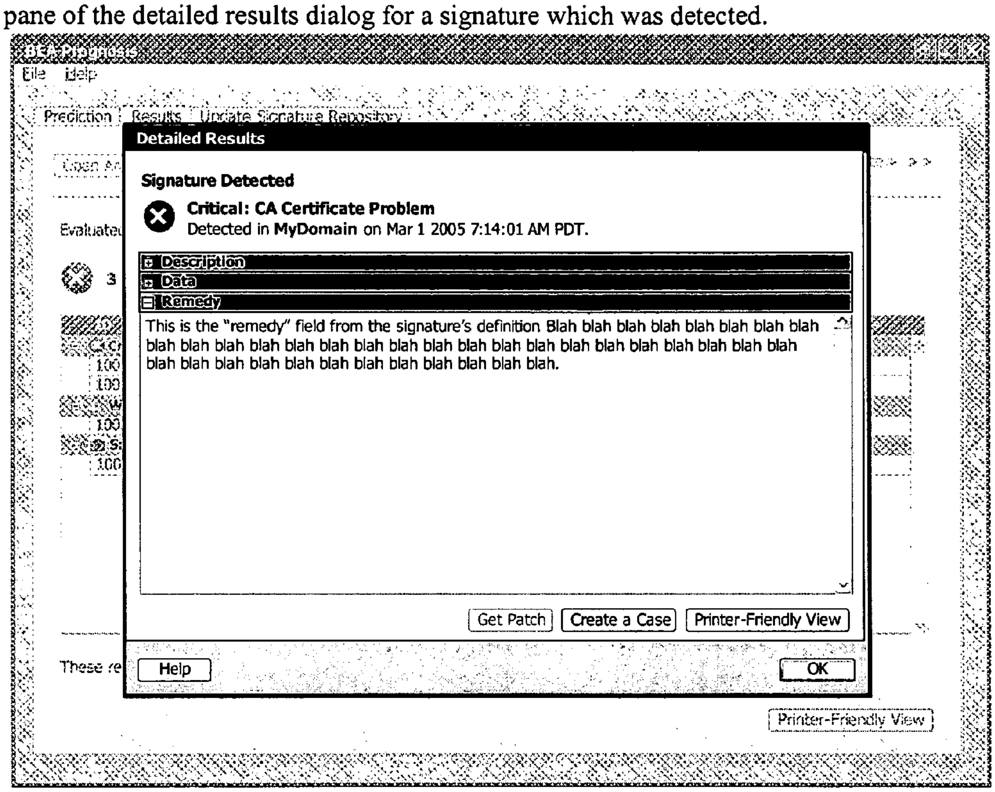
*Diagram 36: Dialog: Detailed Results (Signature, Remedy pane expanded)*

Diagram 37: Dialog: Detailed Results (Snapshot, Description pane expanded) shows the description pane of the detailed results dialog for a snapshot.
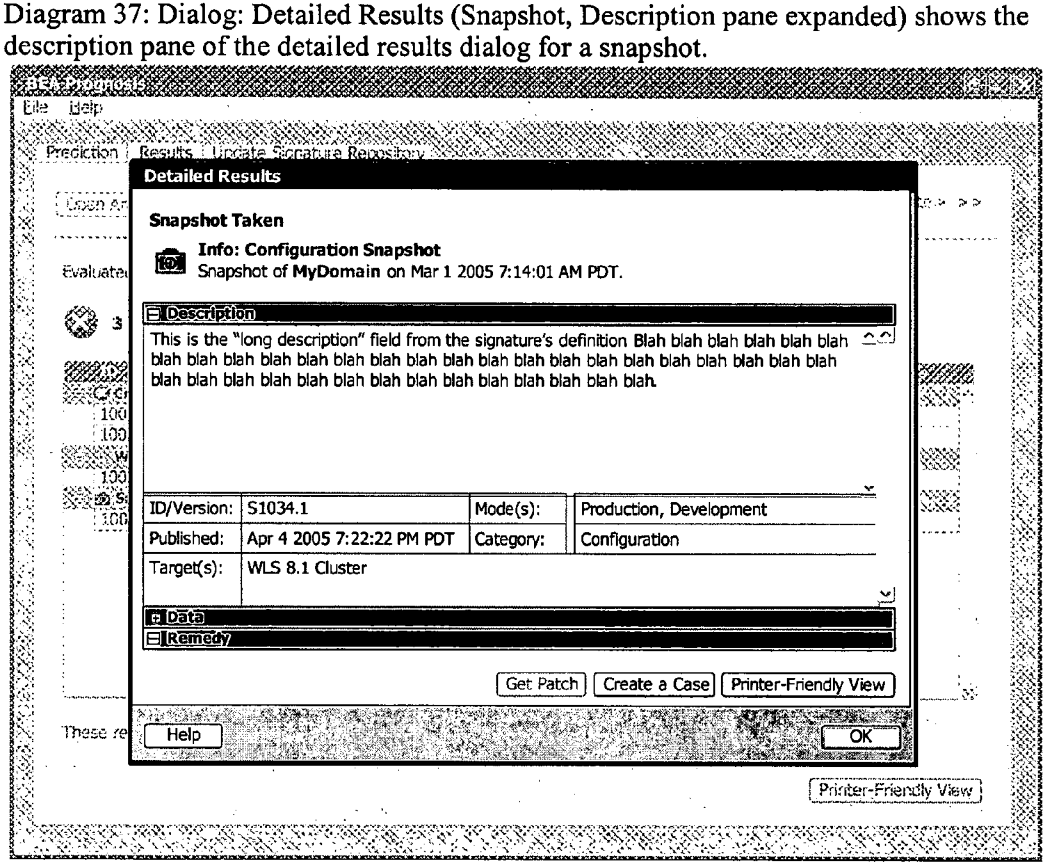
*Diagram 37: Dialog: Detailed Results (Snapshot, Description pane expanded)*

Diagram 38: Dialog: Detailed Results (Snapshot, Data pane expanded) shows the data pane of the detailed results dialog for a snapshot.

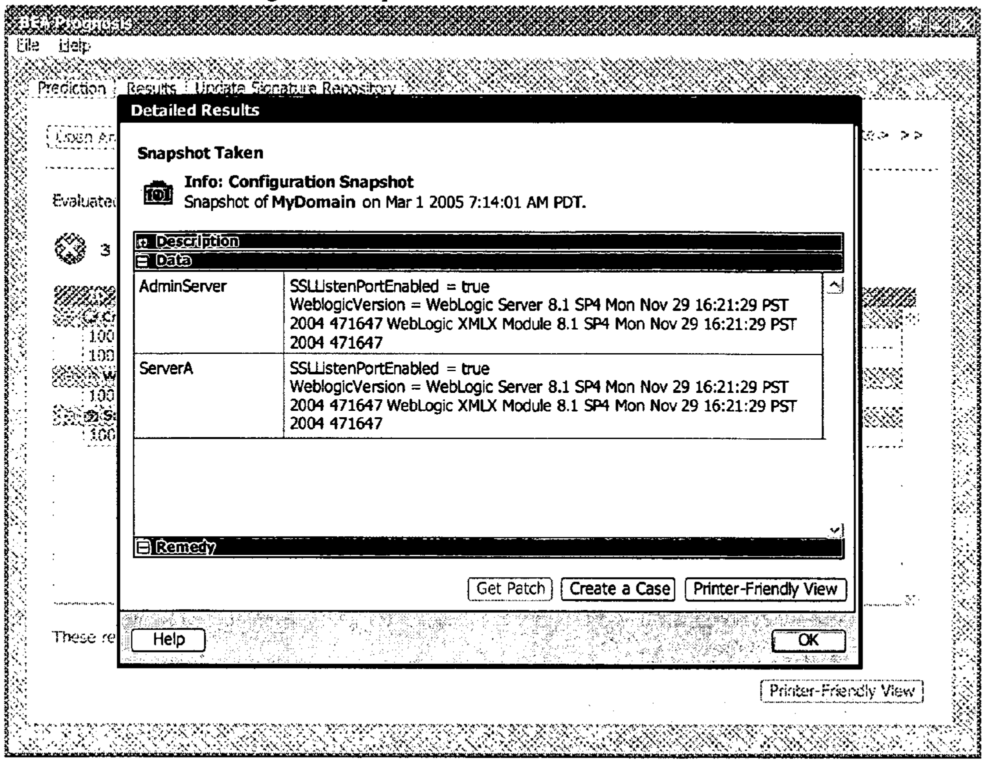

*Diagram 38: Dialog: Detailed Results (Snapshot, Data pane expanded)*

Content

- Subtitle: “Signature Detected” or “Snapshot Taken”
- Displays an icon representing the severity of the signature detected, or the snapshot icon if it’s a snapshot.
- Next to the icon, displays the severity and the name of the signature/snapshot.
- Below the name, displays the domain name and the date/time evaluated.
- Displays three expandable/collapsible panes: Description, Data and Remedy. In their default state, the Description pane can be expanded and the Data and Remedy panes can be collapsed. The pane title can be displayed next to the expand/collapse +/- icon. Horizontal and/or vertical scrollbars can appear in each pane if the content extends beyond the area.
- Description pane displays the long description, ID, version, mode, date published, category and targets.
- Data pane displays the data collected for this signature/snapshot.
- Remedy pane displays the remedy text for this signature. If it’s a snapshot, there is no remedy: the Remedy pane has no expanded view – it is always collapsed.
- Get Patch button can be always disabled in this version.
- Create a Case button, enabled
- Printer-Friendly View button, enabled

- OK button, enabled

Interactions

- The user may click a pane's expand/collapse icon to display the Description, Data and Remedy panes.
- The user may click the Create a Case button to open the Create a Case dialog (see Diagram 41: Dialog: Create a Case).
- The user may click the Printer-Friendly View button to open an html version of the evaluation results details (see Diagram 39: HTML: Detailed Results Printer-Friendly View (Signature) and Diagram 40: HTML: Detailed Results Printer-Friendly View (Snapshot)) in the default browser. This can display the description, data and remedy sections all in one page.
- The user may click the OK button to close this dialog and return to the Results tab (see Diagram 30: Tab: Results).

Dialog Attributes

| | |
|---|---|
| Titlebar | Detailed Results |
| Resize | The dialog cannot be resized or minimized. The depth of the dialog can be fixed to accommodate the content. |
| Close | The dialog can be closed by clicking OK or Cancel. |
| Minimize | No |
| Reposition | Yes |
| Modal | Yes |
| Icons | Critical Severity ("x") small and large icon<br>Warning Severity ("!")small and large icon<br>Informational Severity ("i") small and large icon<br>Snapshot |
| Menu Interaction | N/A |

Errors & Logging

| Action | Activity Type | Data |
|---|---|---|
| Log & Open Error Dialog | Error opening printer-friendly view (e.g. file not found error) | • timestamp<br>• bundle ID<br>• domain ID<br>• signature ID<br>• results location |

I18n Tokens

| ID | English |
|---|---|

| | |
|---|---|
| D9.TITLE | Detailed Results |
| D9.SUBTITLE | Signature Detected\|Snapshot Taken |
| D9.MESSAGE | Detected\|Taken in [selected domain name] on [dateformat]. |
| D9.P1.TITLE | Description |
| D9.P1.F1.LABEL | ID/Version |
| D9.P1.F2.LABEL | Mode(s) |
| D9.P1.F3.LABEL | Published |
| D9.P1.F4.LABEL | Category |
| D9.P1.F5.LABEL | Target(s) |
| D9.P2.TITLE | Data |
| D9.P3.TITLE | Remedy |
| D9.B.PATCH | Get Patch |
| D9.B.CASE | Create a Case |
| *B.PRINTERFRIENDLY* | *Printer-Friendly View* |
| *B.HELP* | *Help* |
| *B.OK* | *OK* |

*(H2) Results Details (Printer-Friendly View)*

The printer-friendly view of the detailed results can be opened by clicking the Printer-Friendly View button on the Detailed Results dialog (see Diagram 34: Dialog: Detailed Results (Signature, Description pane expanded)). This page can also be opened by clicking a Details link from the printer-friendly Results Summary (see Diagram 32: HTML: Results Summary Printer-Friendly View) view. The user can also open the html file directly from a results archive directory.

The next two diagrams illustrate the printer-friendly view of the detailed results for a signature (Diagram 39: HTML: Detailed Results Printer-Friendly View (Signature)) and a snapshot (Diagram 40: HTML: Detailed Results Printer-Friendly View (Snapshot)).

BEA Prognosis: Signature Detected

Critical: CA Certificate Problem

Detected in MyDomain on Mar 1 2005 7:14:01 AM PDT.

Description
This is the "long description" field from the signature's definition Blah blah blah blah blah blah blah blah blah blah blah blah blah blah blah blah blah blah blah blah blah blah blah blah blah blah blah blah blah blah blah blah blah blah blah blah blah blah blah blah.

| | | | |
|---|---|---|---|
| ID/Version: | S1034.1 | Mode(s): | Production, Development |
| Published: | Apr 4 2005 7:22:22 PM PDT | Category: | Configuration |
| Target(s): | WLS 8.1 Cluster | | |

Data

| | |
|---|---|
| AdminServer | SSLListenPortEnabled = true<br>WeblogicVersion = WebLogic Server 8.1 SP4 Mon Nov 29 16:21:29 PST 2004 471647 WebLogic XMLX Module 8.1 SP4 Mon Nov 29 16:21:29 PST 2004 471647 |
| ServerA | SSLListenPortEnabled = true<br>WeblogicVersion = WebLogic Server 8.1 SP4 Mon Nov 29 16:21:29 PST 2004 471647 WebLogic XMLX Module 8.1 SP4 Mon Nov 29 16:21:29 PST 2004 471647 |

Remedy
This is the "long remedy" field from the signature's definition Blah blah blah blah blah blah blah blah blah blah blah blah blah blah blah blah blah blah blah blah blah blah blah blah blah blah blah blah blah blah blah blah blah blah blah blah blah blah blah blah.

c:\bea\predict\results\MyDomain-D1001\2005-03-01-07-14-01\S1034\index.html

*Diagram 39: HTML: Detailed Results Printer-Friendly View (Signature)*

BEA Prognosis: Snapshot Taken

Info: Configuration Snapshot

Snapshot of MyDomain on Mar 1 2005 7:14:01 AM PDT.

Description

This is the "long description" field from the signature's definition Blah blah blah blah blah blah blah blah blah blah blah blah blah blah blah blah blah blah blah blah blah blah blah blah blah blah blah blah blah blah blah blah blah blah blah blah blah.

| | | | |
|---|---|---|---|
| ID/Version: | S1034.1 | Mode(s): | Production, Development |
| Published: | Apr 4 2005 7:22:22 PM PDT | Category: | Configuration |
| Target(s): | WLS 8.1 Cluster | | |

Data

| | |
|---|---|
| AdminServer | SSLListenPortEnabled = true<br>WeblogicVersion = WebLogic Server 8.1 SP4 Mon Nov 29 16:21:29 PST 2004 471647 WebLogic XMLX Module 8.1 SP4 Mon Nov 29 16:21:29 PST 2004 471647 |
| ServerA | SSLListenPortEnabled = true<br>WeblogicVersion = WebLogic Server 8.1 SP4 Mon Nov 29 16:21:29 PST 2004 471647 WebLogic XMLX Module 8.1 SP4 Mon Nov 29 16:21:29 PST 2004 471647 |

c:\bea\predict\results\MyDomain-D1001\2005-03-01-07-14-01\S1034\index.html

*Diagram 40: HTML: Detailed Results Printer-Friendly View (Snapshot)*

Content

- Title: "Predictive support: Signature Detected" or "Predictive support: Snapshot Taken"
- Displays the severity and the name of the signature/snapshot.
- Displays the domain name and the date/time evaluated.
- Description section displays the long description, ID, version, mode, date published, category and targets.
- Data section can display the data collected for this signature/snapshot.
- Remedy section can display the remedy text for this signature. In one embodiment, if it's a snapshot, there is no remedy section.
- An informational message can appear in the page footer with the location of this page in the results archives.

HTML Attributes

| | |
|---|---|
| Title | "Predictive support: Signature Detected" or "Predictive support: Snapshot Taken" |
| Link Target | N/A |

I18n Tokens

| ID | English |
|---|---|
| H2.SUBTITLE | Signature Detected\|Snapshot Taken |
| H2.MESSAGE | Detected\|Taken in [selected domain name] on [dateformat]. |
| H2.P1.TITLE | Description |
| H2.P1.F1.LABEL | ID/Version |
| H2.P1.F2.LABEL | Mode(s) |

| | |
|---|---|
| H2.P1.F3.LABEL | Published |
| H2.P1.F4.LABEL | Category |
| H2.P1.F5.LABEL | Target(s) |
| H2.P2.TITLE | Data |
| H2.P3.TITLE | Remedy |

*(D10) Create a Case (Dialog)*

The Create a Case dialog (Diagram 41: Dialog: Create a Case) opens when the user clicks the Create a Case button on the Detailed Results dialog. This dialog can display the information a customer may use to create a case from this signature or snapshot. In future releases, functionality can be added for submitting the case directly from this dialog.

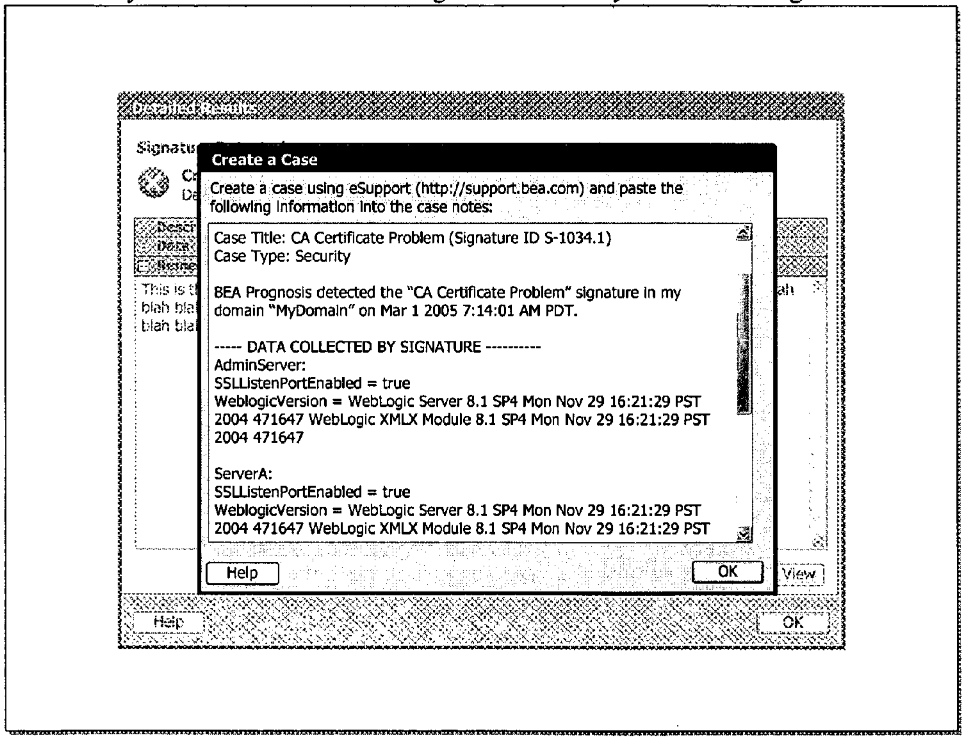

*Diagram 41: Dialog: Create a Case*

Content

- Text area with in-line explanation; includes case title (signature name and ID), case type, and case notes. Case notes include all the data collected for this signature.
- Done button in the button panel at the bottom of the dialog

Interactions

- The user may select the contents of the text area to cut and paste into eSupport or an email for case creation.

- The user may click the Done button to close this dialog and return to the Detailed Results dialog.

Dialog Attributes

| | |
|---|---|
| Titlebar | Create a Case |
| Resize | The dialog cannot be resized or minimized. The depth of the dialog can be fixed to accommodate the content. |
| Close | The dialog can be closed by clicking Done. |
| Minimize | No |
| Reposition | Yes |
| Modal | Yes |
| Icons | None |
| Menu Interaction | N/A |

Errors & Logging

| Action | Activity Type | Data |
|---|---|---|
| Log | Create a Case | • timestamp<br>• bundle ID<br>• domain ID<br>• signature ID |

I18n Tokens

| ID | English |
|---|---|
| D10.TITLE | Create a Case |
| D10.INSTR | Create a case using eSupport (http://support.bea.com) and paste the following information into the case notes: |
| *B.HELP* | *Help* |
| *B.OK* | *OK* |

Update Signature Repository

This flowchart (Diagram 42: Flow: Update Signature Repository) illustrates the main interactions available from the application's Update Signature Repository tab.

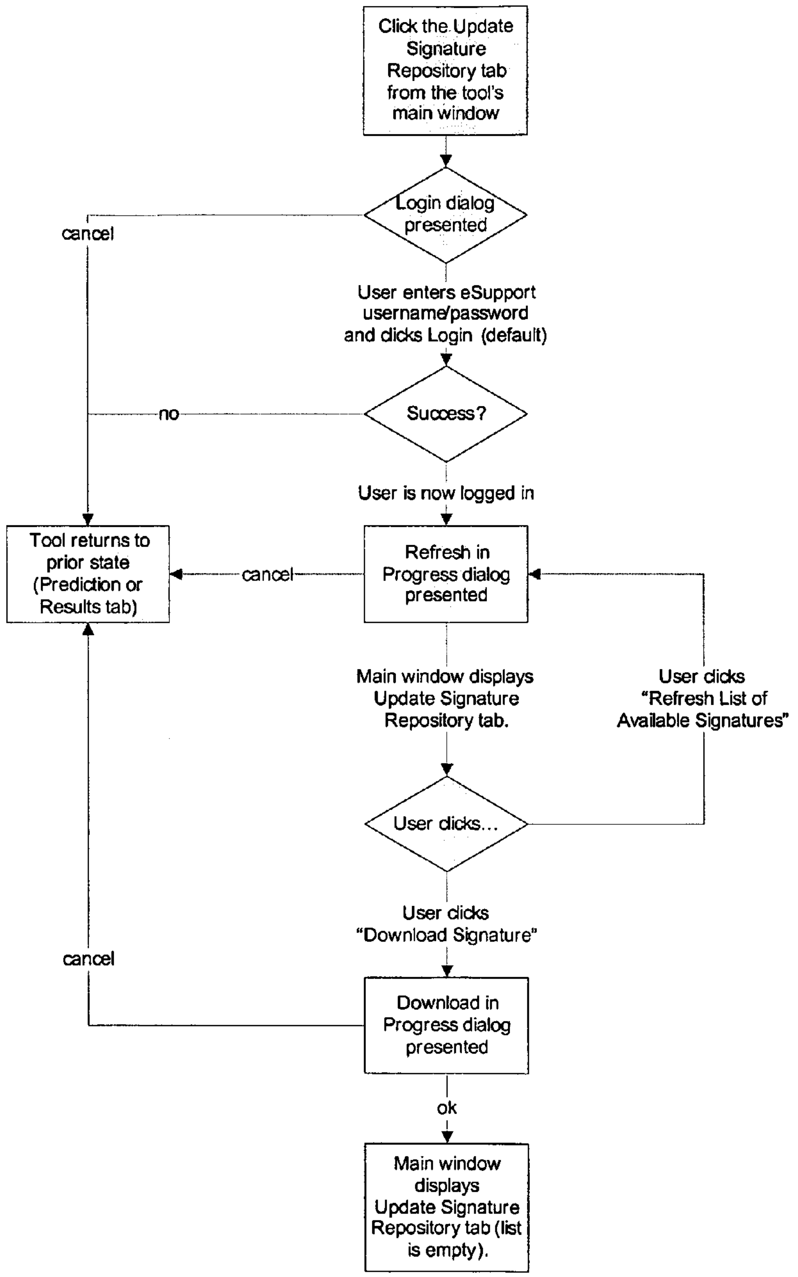
*Diagram 42: Flow: Update Signature Repository*
*(D11) eSupport Login (Login Dialog)*
This dialog (Diagram 43: Login Dialog: eSupport Login) can open when you select the Update Signature Repository tab (or File > Login from the menu) and you are not currently logged in. If you have chosen to remember your eSupport credentials, you can not be prompted with this dialog unless you select File > Logout from the menu.

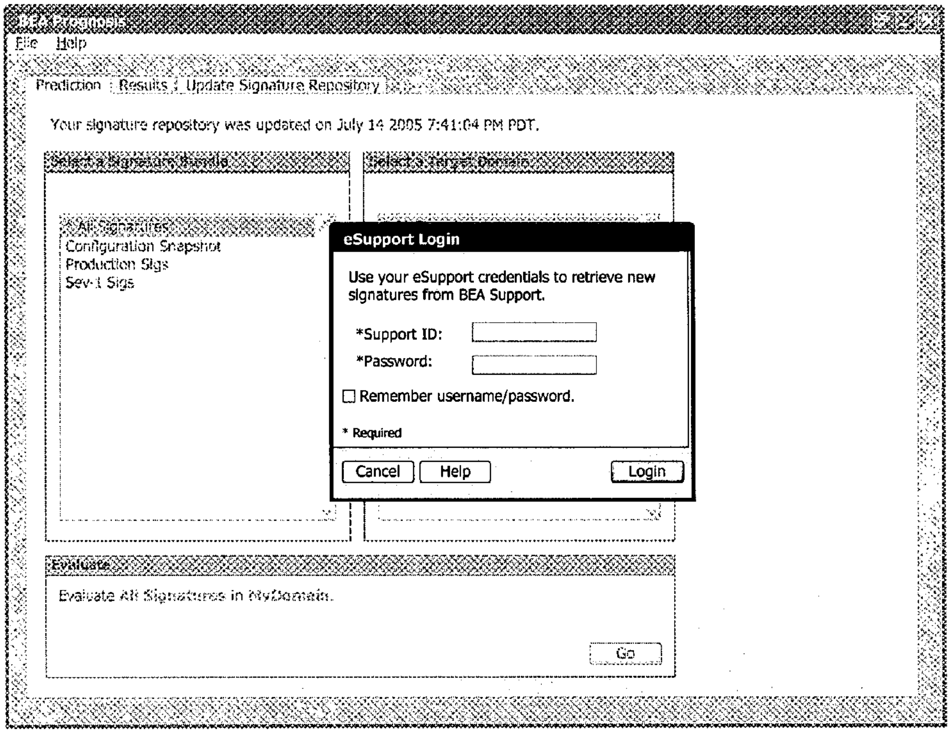

*Diagram 43: Login Dialog: eSupport Login*

Content

- In-line explanation
- Form fields:
  - Support ID (text field with label, required)
  - Password (password field with label, required)
  - Remember username/password (checkbox with in-line explanation; unchecked by default)
- Buttons
  - Cancel (enabled)
  - Login (disabled)

Interactions

- The Login button can be enabled once the required fields (username/password) are set.
- The user may click Cancel. This can close the login dialog and return the user to the last active tab in the main application window.
- The user may click Login to continue. If authentication is successful, the Refresh in Progress dialog (see Diagram 44: Progress Dialog: Refresh in Progress) opens.

Dialog Attributes

| | |
|---|---|
| Titlebar | eSupport Login |
| Resize | The dialog cannot be resized or minimized. The depth of the dialog can be fixed to accommodate the content. |
| Close | The dialog can be closed by clicking Login or Cancel. |
| Minimize | No |
| Reposition | Yes |
| Modal | Yes |
| Icons | None |
| Menu Interaction | File > Login |

Errors & Logging

| Action | Activity Type | Data |
|---|---|---|
| Log | Login Successful | • timestamp<br>• eSupport username |
| Log & Open Error Dialog | Invalid username/password | • timestamp |
| Log & Open Error Dialog | Error connecting to host (e.g. server error, no internet connectivity) | • timestamp<br>• detailed error message |

I18n Tokens

| ID | English |
|---|---|
| D11.TITLE | eSupport Login |
| D11.INSTR | Use your eSupport credentials to retrieve new signatures from Software Support. |
| D11.F1.LABEL | Support ID |
| D11.F2.LABEL | Password |
| D11.F3.LABEL | Remember username/password. |
| *F.REQUIRED* | *Required* |
| *B.CANCEL* | *Cancel* |
| *B.HELP* | *Help* |
| *B.LOGIN* | *Login* |

*(D12) Refresh in Progress (Progress Dialog)*

This dialog (Diagram 44: Progress Dialog: Refresh in Progress) opens after successful eSupport Login or by clicking the Refresh button on the Update Signature Repository tab. In one embodiment, you must be logged in to see this dialog. During this process, the tool can retrieve signature metadata for any signatures published or (modified) since your last update.

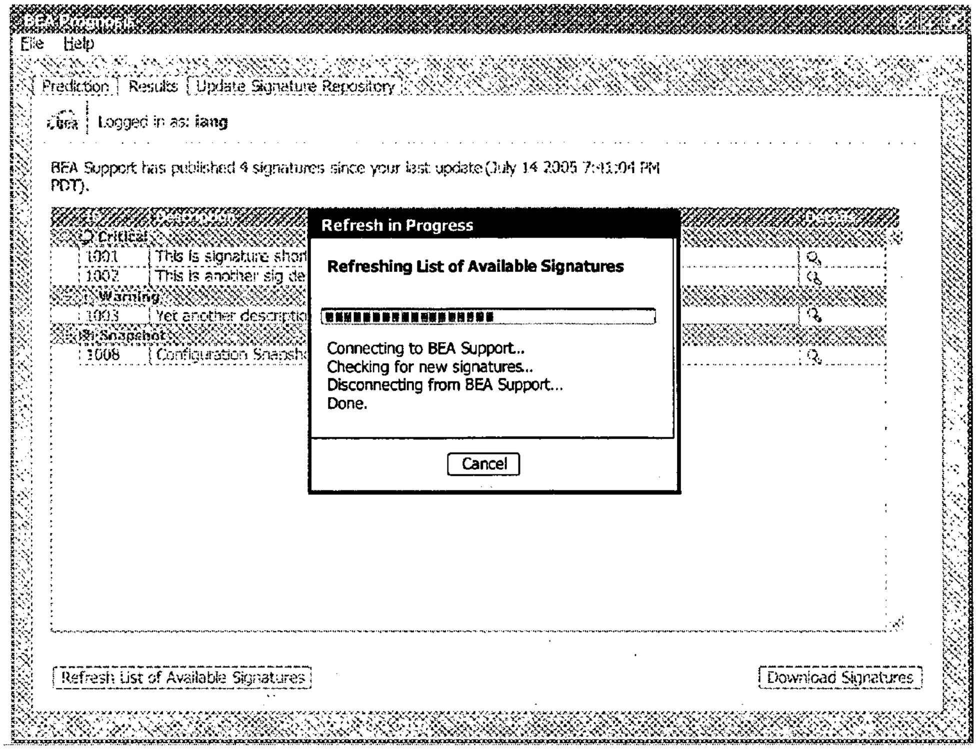

*Diagram 44: Progress Dialog: Refresh in Progress*

Content

- The dialog subtitle can display the message “Refreshing List of Available Signatures.”
- The animated progress bar can oscillate until the evaluation is complete. (It does not update in proportion to the percentage of the task completed.)
- Four progress messages can appear below the progress bar, each message can appear as the refresh process completes each of its component processes.
- A Cancel button can appear in the button panel at the bottom of the dialog. It can be enabled by default; it can be disabled when the refresh process is complete.

Interactions

- Refresh in Progress
    - “Connecting to software support ...” can appear when the dialog opens. During this step, the tool can attempt to establish a connection to the software support server to check for available signatures.
    - “Checking for new signatures...” can appear on the next line. During this step, the local inventory of installed signatures and versions can be submitted to software support , along with the most recent domain inventories from the domain registry and signature usage data from signature.log; the server can return a list of any signatures the user has not installed; signature.log can be truncated.
    - “Disconnecting from software support ...” can appear on the next line.

- "Done" can appear on the next line. This can be the signal that the process has completed successfully. The dialog closes automatically and the Update Signature Repository tab displays.
- The user may interrupt the refresh process at any time by clicking the Cancel button. Cancellation can imply full rollback. In one embodiment, if a list or partial list of signatures was already retrieved, do not use it when displaying the Update Signature Repository tab. The dialog can close and the Update Signature Repository tab display.

Dialog Attributes

| | |
|---|---|
| Titlebar | Refresh in Progress |
| Resize | The dialog cannot be resized or minimized. The depth of the dialog can be fixed to accommodate the content. |
| Close | The dialog can be closed by Cancel or it closes itself automatically upon successful completion of the Refresh process. |
| Minimize | No |
| Reposition | Yes |
| Modal | Yes |
| Icons | <br>Animated (oscillating) progress bar |
| Menu Interaction | N/A |

Errors & Logging

| Action | Activity Type | Data |
|---|---|---|
| Log | Refresh Complete | • timestamp |
| Log & Open Error Dialog | Error connecting to host | • timestamp<br>• detailed error message |
| Log & Open Error Dialog | Error submitting inventory of installed signatures, domain inventories and usage data | • timestamp<br>• detailed error message |
| Log & Open Error Dialog | Error preparing list of available signatures (server-side error) | • timestamp<br>• detailed error message |
| Log & Open Error Dialog | Error retrieving list of available signatures (server-side error) | • timestamp<br>• detailed error message |

I18n Tokens

| ID | English |
|---|---|
| D12.TITLE | Refresh in Progress |
| D12.SUBTITLE | Refreshing List of Available Signatures |
| D12.PR1.LABEL | Connecting to software support ... |
| D12.PR2.LABEL | Checking for new signatures... |
| D12.PR3.LABEL | Disconnecting fromsoftware support ... |
| D12.PR4.LABEL | Done |

| | |
|---|---|
| *B.CANCEL* | *Cancel* |

*(T3) Update Signature Repository (Tab)*

This tab can be selectedfrom the main application window or by selecting File > Update Signature Repository. In one embodiment, this tab can only open if you have logged in. It can launch the eSupport Login dialog (see Diagram 43: Login Dialog: eSupport Login) if you are not logged in and have not chosen to persist your eSupport credentials. Upon successful eSupport login, the Refresh process begins (see Diagram 44: Progress Dialog: Refresh in Progress). Successful completion of the Refresh process brings you to this tab.

The next two diagrams illustrate the contents of this tab when there are new signatures available (Diagram 45: Tab: Update Signature Repository) and when the signature repository is up-to-date (Diagram 46: Tab: Update Signature Repository (up-to-date)).

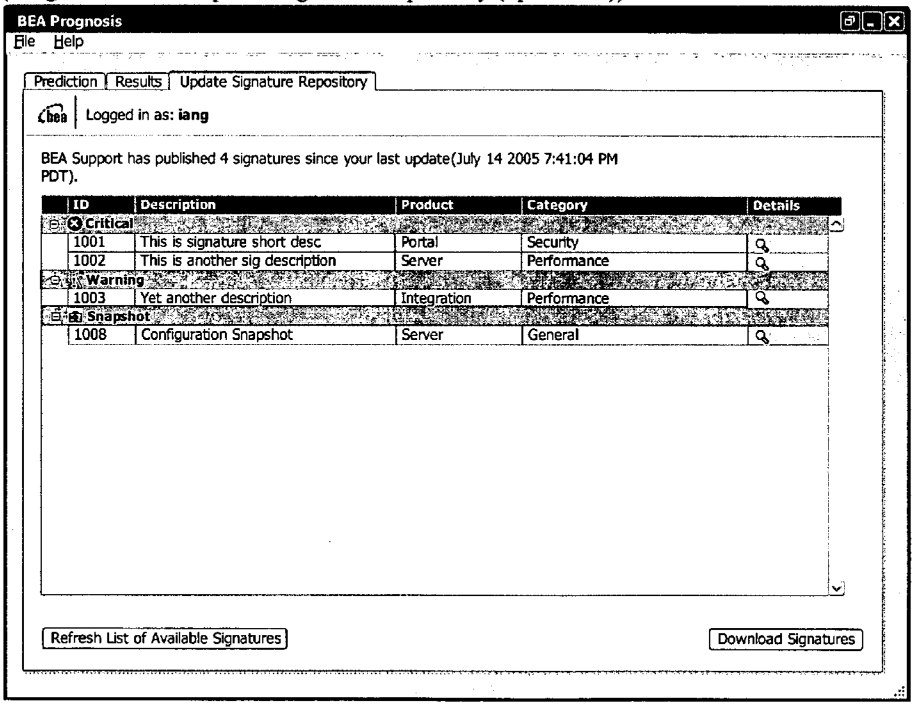

*Diagram 45: Tab: Update Signature Repository*

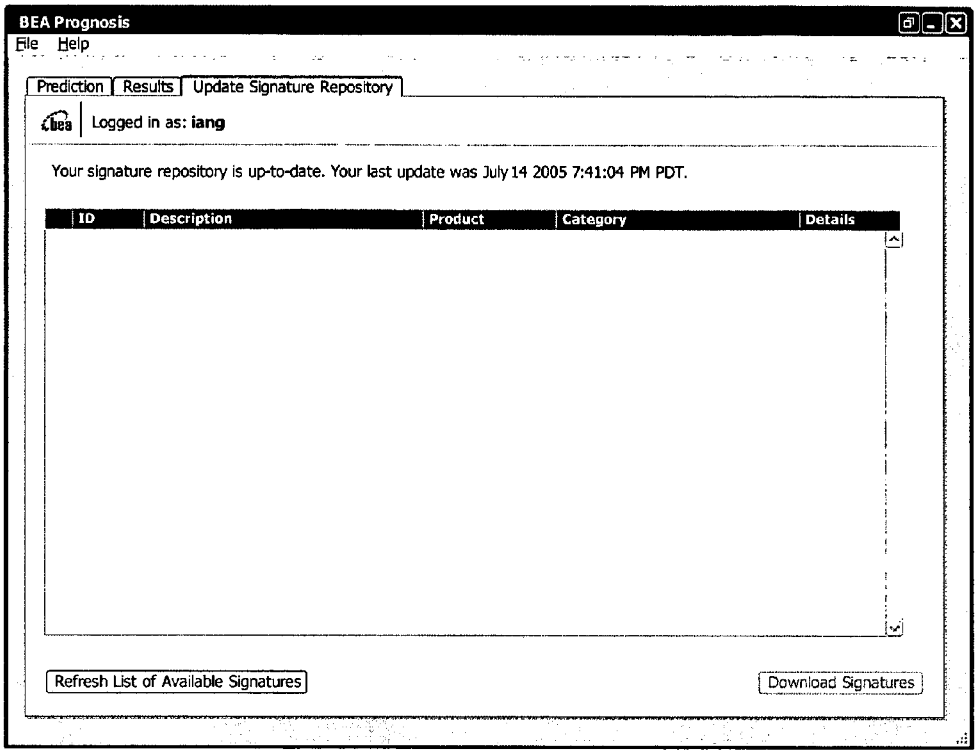

*Diagram 46: Tab: Update Signature Repository (up-to-date)*

Content

- In one embodiment, when this tab is displayed, the user is logged in to eSupport. An icon can be displayed next to the "Logged in as" message with the user's eSupport username.
- "software support has published [n] new signatures since your last update ([timestamp]). The number of new signatures can be based on the list of available signatures returned by the Refresh process. The timestamp can be persisted and only be reset after a signature download operation is completed and acknowledged as successful. After acknowledging successful download, the message can indicate "Your signature repository is up-to-date. Your last update was [timestamp]."
- The available signatures table can include a header row, group headings and data.
    - Columns headings for ID, Description, Product, Category and Details. Column headings can appear even if there are no available signatures.
    - Available signatures can be grouped by severity (Critical, Warning, Informational and one Snapshot group). The group headings can be expandable and collapsible, with plus/minus icons to toggle between expanded and collapsed states; they can default to the expanded state. The group headings can include a small icon representing that severity and the severity name. A group heading can only display when there are signatures/snapshot for that group. No group headings can appear if there are no signatures available.
    - Data

- ID of the signature/snapshot. (We don't really need to display this, but it's nice to have for the advanced to user to be able to correlate a signature they see here with the corresponding files in the repository.)
        - Short description
        - Product[i6]
        - Category[i7]
        - Details icon. This column can appear on a colored background to highlight that it is an action column.
    - Display and enable a vertical scrollbar for the results table if there are more than n rows to display.
- Buttons
    - Refresh List of Available Signatures (enabled)
    - Download Signatures (enabled if there are one or more signatures listed in the available signatures table)

Interactions

- The user may click the Refresh List of Available Signatures button. This opens the Refresh in Progress dialog (see Diagram 44: Progress Dialog: Refresh in Progress).
- The user may click the Details icon on any data row to open a Signature Details dialog (see Diagram 34: Dialog: Detailed Results (Signature, Description pane expanded)) to display more information about that signature.
- The user may click the expand/collapse +/- icon for any group heading to toggle expand/collapse the data display for that group.
- The user may click the Download Signatures button to open the Download in Progress dialog (see Diagram 47: Progress Dialog: Download in Progress) and retrieve these signatures.

Window/Tab Attributes

| | |
|---|---|
| Tab Title | Update Signature Repository |
| Tab resizing | No |
| Close | N/A |
| Minimize | N/A |
| Reposition | N/A |
| Persistence | The tool remembers the date/time of the last successful update operation. |
| Icons | Critical Severity ("x") small and large icon<br>Warning Severity ("!")small and large icon<br>Informational Severity ("i") small and large icon<br>Snapshot<br>Details |
| Menu Interaction | File > Update Signature Repository |

I18n Tokens

| ID | English |
|---|---|
| T3.LOGGED | Logged in as: |
| T3.MESSAGE_SIG | software support has published [count] new signatures since your last update ([dateformat]). |
| T3.MESSAGE_NOSIG | Your signature repository is up-to-date. Your last update was [dateformat]. |
| T3.C1.LABEL | ID |
| T3.C2.LABEL | Description |
| T3.C3.LABEL | Product |
| T3.C4.LABEL | Category |
| T3.C5.LABEL | Details |
| T3.B.REFRESH | Refresh List of Available Signatures |
| T3.B.DOWNLOAD | Download Signatures |

*(D13) Download in Progress (Progress Dialog)*

This progress dialog (Diagram 47: Progress Dialog: Download in Progress) can open when you click the Download Signatures button from the Update Signature Repository tab. In one embodiment, the user must already be logged in to get to this progress dialog.

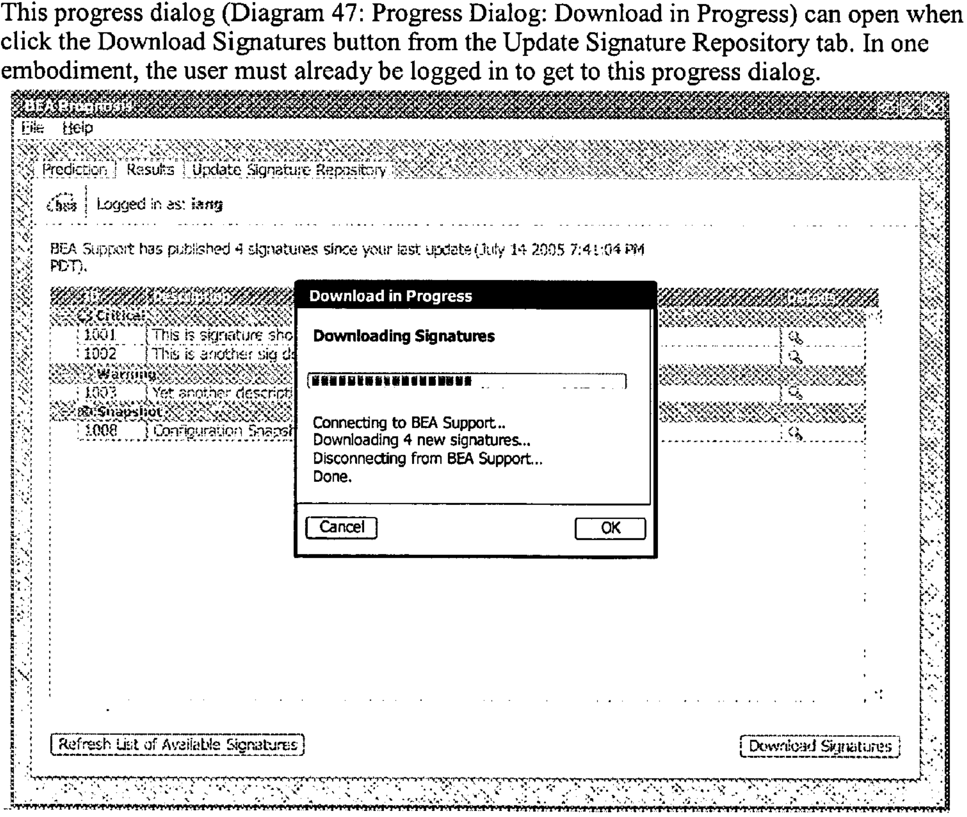

*Diagram 47: Progress Dialog: Download in Progress*

Content

- The dialog subtitle can display the message "Download in Progress."
- The animated progress bar oscillates until the download is complete. (It need not update in proportion to the percentage of the task completed.)
- Four progress messages can appear below the progress bar, each message can appear as the download process completes each of its component processes.
- A Cancel button can appear in the button panel at the bottom of the dialog. It can be enabled by default; it can be disabled when the download process is complete.
- An OK button can appear in the button panel at the bottom of the dialog. It can be disabled by default; it can be enabled when the download process is complete.

Interactions

- Download in Progress
    - "Connecting to software support ..." can appear when the dialog opens. During this step, the tool can attempt to establish a connection to the software support server to check for available signatures.
    - "Downloading n new signatures..." (where n is the number of signatures being downloaded) can appear on the next line. During this step, the list of signatures can displayed in the Update Signature Repository tab can be submitted to Software support, and the server responds by downloading those signatures.
    - "Disconnecting from Software support..." appears on the next line.
    - "Done" can appear on the next line. This can be the signal that the process has completed successfully. The Cancel button can be disabled and the OK button can be enabled.
- The user may interrupt the download process at any time by clicking the Cancel button. Cancellation implies full rollback. In one embodiment, if any signatures were already downloaded, they must be deleted. The dialog closes and the Update Signature Repository tab can display without resetting the "last update" timestamp.
- The user may click the OK button when the process is complete, acknowledging the successful download and resetting the "last update" timestamp.

Dialog Attributes

| | |
|---|---|
| Titlebar | Download in Progress |
| Resize | The dialog cannot be resized or minimized. The depth of the dialog can be fixed to accommodate the content. |
| Close | The dialog can be closed by Cancel or OK. |
| Minimize | No |
| Reposition | Yes |
| Modal | Yes |
| Icons |  Animated (oscillating) progress bar |
| Menu Interaction | N/A |

Errors & Logging

| Action | Activity Type | Data |
|---|---|---|
| Log | Download Complete | • timestamp<br>• list of signature IDs |

| Action | Activity Type | Data |
|---|---|---|
| | | downloaded |
| Log & Open Error Dialog | Error connecting to host | • timestamp<br>• detailed error message |
| Log & Open Error Dialog | Error submitting list of signatures to retrieve | • timestamp<br>• detailed error message |
| Log & Open Error Dialog | Error preparing signatures for download (server-side error) | • timestamp<br>• detailed error message |
| Log & Open Error Dialog | Error downloading signatures | • timestamp<br>• detailed error message |
| Log & Open Error Dialog | Error saving signatures to local signature repository (e.g. file I/O error) | • timestamp<br>• detailed error message |

I18n Tokens

| ID | English |
|---|---|
| D13.TITLE | Download in Progress |
| D13.SUBTITLE | Downloading Signatures |
| D13.PR1.LABEL | Connecting to Software support... |
| D13.PR2.LABEL | Downloading [count] new signatures... |
| D13.PR3.LABEL | Disconnecting from Software support... |
| D13.PR4.LABEL | Done |
| *B.CANCEL* | *Cancel* |
| *B.OK* | *OK* |

*(D14) Signature Properties (Dialog)*

The user may view a signature's properties by selecting the signature from the table of available signatures on the Update Signature Repository tab then clicking the Details icon. This can open the Signature Properties dialog (Diagram 48: Dialog: Signature Properties).

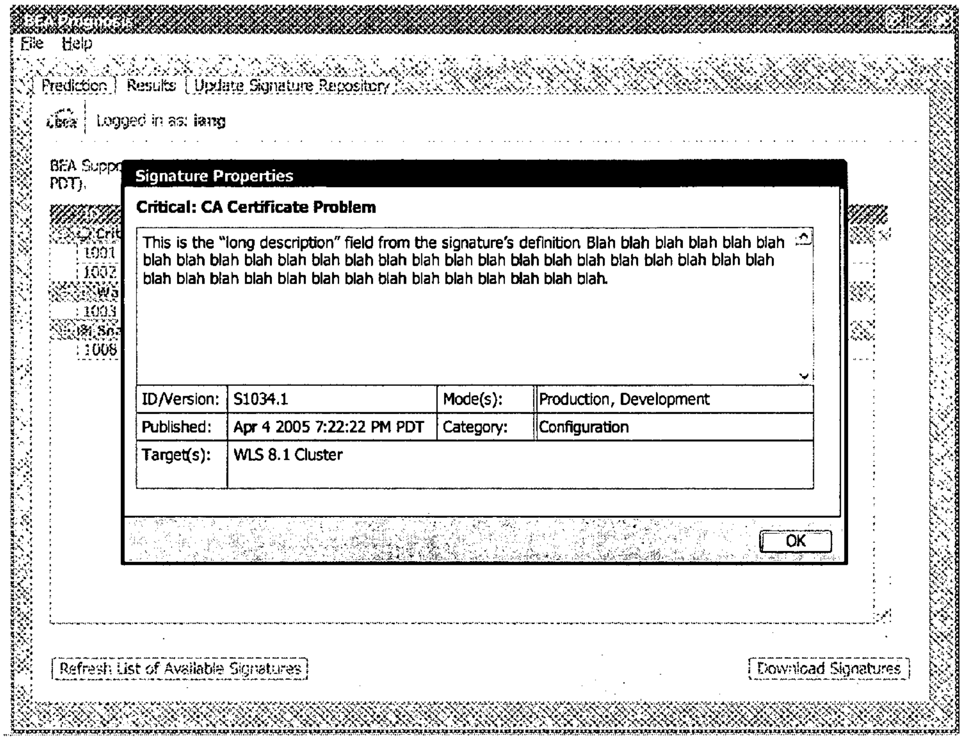

*Diagram 48: Dialog: Signature Properties*

Content

- The dialog subtitle can display the signature severity and name.
- Long description, with vertical/horizontal scrollbars as needed.
- Tabular display of ID, version, mode, date published, category and targets.
- An OK button can appear in the button panel at the bottom of the dialog. It can be enabled and can be the default button (i.e. pressing <Enter> on the keyboard has the same effect as clicking the button).

Interactions

- The user may click OK to close this dialog and return to the Update Signature Repository tab in the main application window.

Dialog Attributes

| | |
|---|---|
| Titlebar | Signature Properties |
| Resize | The dialog cannot be resized or minimized. The depth of the dialog can be fixed to accommodate the content. |
| Close | The dialog can be closed by clicking OK. |
| Minimize | No |
| Reposition | Yes |
| Modal | Yes |

| | |
|---|---|
| Icons | None |
| Menu Interaction | N/A |

I18n Tokens

| ID | English |
|---|---|
| D14.TITLE | Signature Properties |
| D14.F1.LABEL | ID/Version |
| D14.F2.LABEL | Mode(s) |
| D14.F3.LABEL | Published |
| D14.F4.LABEL | Category |
| D14.F5.LABEL | Target(s) |
| *B.OK* | *OK* |

*(D15) eSupport Logout (Confirmation Dialog)*

This flowchart (Diagram 49: Flow: Logout) illustrates the process of logging out from eSupport, in one embodiment.

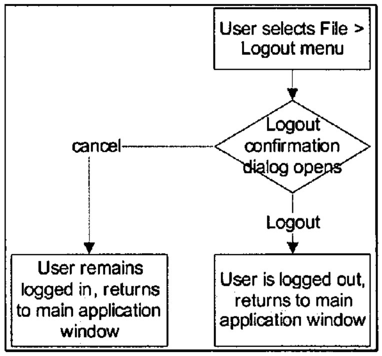

*Diagram 49: Flow: Logout*

This dialog (Diagram 50: Confirmation Dialog: eSupport Logout) can open when the user selects File > Logout from the menu. In one embodiment, this menu item can be only visible and enabled when the user is already logged in. The only real reason to log out would be to allow another user to log in with their eSupport credentials.

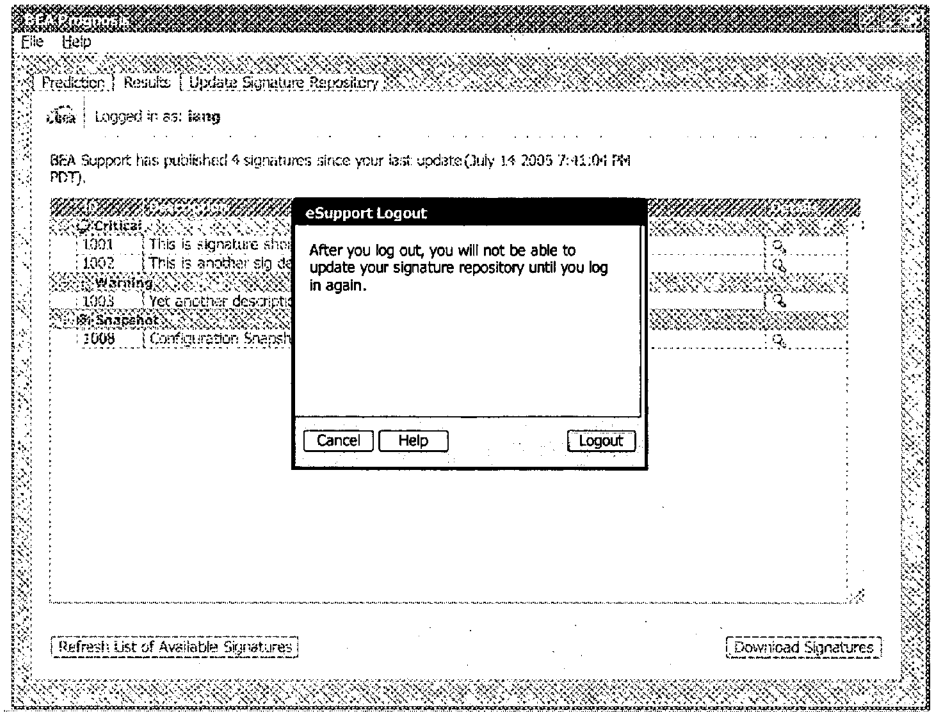

*Diagram 50: Confirmation Dialog: eSupport Logout*

Content

- In-line explanation.
- Cancel button
- Logout button

Interactions

- The user may click the cancel button to return the main application window without logging out.
- The user may click the Logout button to logout and return to the main application window. Once the user is logged out, they can not be able to view the Update Signature Repository tab until they log in again.

Dialog Attributes

| | |
|---|---|
| Titlebar | eSupport Logout |
| Resize | The dialog cannot be resized or minimized. The depth of the dialog can be fixed to accommodate the content. |
| Close | The dialog can be closed by clicking Cancel or Logout. |
| Minimize | No |
| Reposition | Yes |
| Modal | Yes |

| | |
|---|---|
| Icons | None |
| Menu Interaction | File > Logout |

Errors & Logging

| Action | Activity Type | Data |
|---|---|---|
| Log | eSupport Logout Successful | • timestamp<br>• eSupport username |

I18n Tokens

| ID | English |
|---|---|
| D15.TITLE | eSupport Logout |
| D15.MESSAGE | After you log out, you can not be able to update your signature repository until you log in again. |
| D15.B.LOGOUT | Logout |
| *B.CANCEL* | *Cancel* |
| *B.HELP* | *Help* |

Preferences

This flowchart (Diagram 51: Flow: Preferences) illustrates the process for viewing and modifying user preferences, in one embodiment.

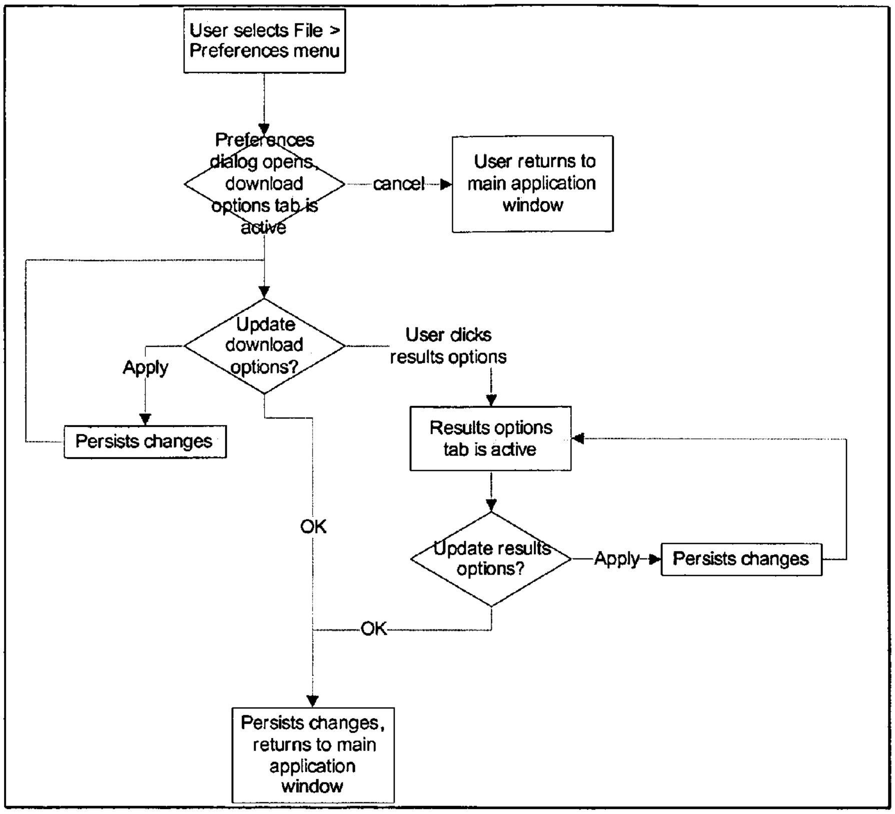

*Diagram 51: Flow: Preferences*

*(D16) Preferences (Configuration Dialog)*

This dialog opens when the user select File > Preferences from the menu. The tabbed pane in the dialog features two tabs: Download Options (Diagram 52: Configuration Dialog: Preferences: (Download Options tab)) and Results Options (Diagram 53: Configuration Dialog: Preferences (Results Options tab)). The Download Options tab can be the default tab.

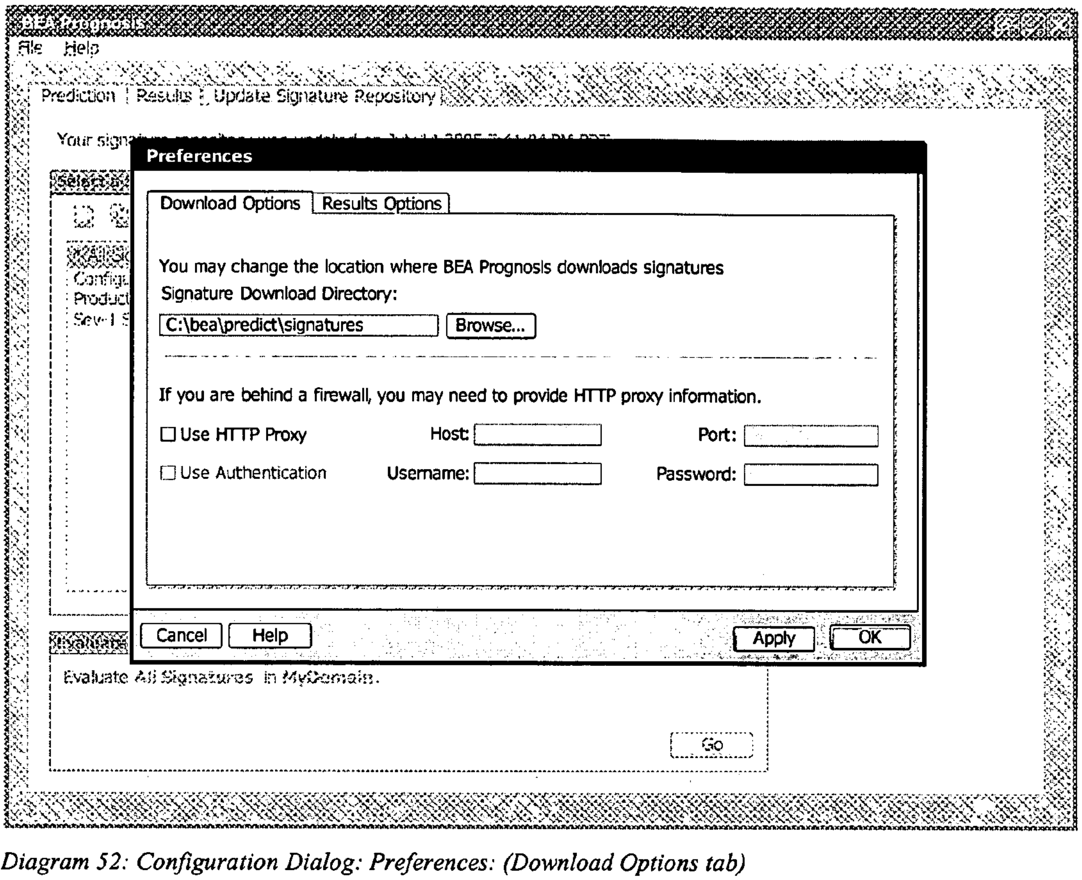
*Diagram 52: Configuration Dialog: Preferences: (Download Options tab)*

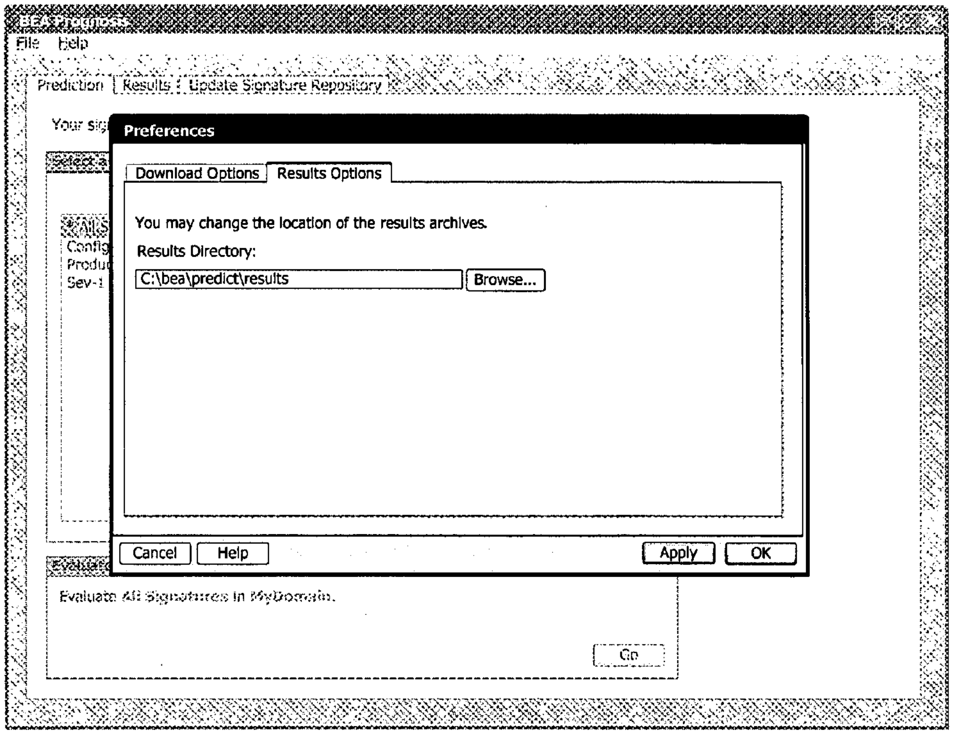

*Diagram 53: Configuration Dialog: Preferences (Results Options tab)*

Content

- Download Options Tab
  - The signature download directory can default to [installation directory]/signatures. The user may edit the path directly or click Browse… and navigate to the desired directory in a standard directory-find dialog box. When they click Select, the selected directory can be entered in the field.
  - Use HTTP Proxy can be unchecked by default. The host/port fields can be disabled by default. The Use Authentication checkbox can be disabled by default. The username and password fields can be disabled by default. If Use HTTP Proxy is checked, the Host and Port fields can be enabled and the Use Authentication checkbox can be enabled. If the Use Authentication checkbox is checked, the username and password fields can be enabled.
- Results Options
  - The results directory can default to [installation directory]/results. The user may edit the path directly or click Browse… and navigate to the desired directory in a standard directory-find dialog box. When they click Select, the selected directory can be entered in the field.

Interactions

- The user may click the Cancel button to close this dialog without persisting any changes they have made. In one embodiment, Cancel can not roll back any changes which the user has already persisted by clicking the Apply button.
- The user may click the OK button to persist their changes (from all tabs in the dialog, not just the active tab) and close the dialog.
- The user may click the Apply button to persist their changes (from all tabs in the dialog, not just the active tab) and leave the dialog open. This can be useful when switching over to the other tab in this dialog.
- If a directory path specfied by the user does not exist, warning/confirmation dialog with Yes/No buttons can be opened asking the user if they want to create that directory now.
- If the user modifies the directory path for the signature repository, information dialog can be opened to inform the user if they have signatures already in the repository, they may want to copy over the contents of the old directory manually.
- If the user modifies the directory path for the results, information dialog can be opened to inform the user if they have results already in the old location, they may want to copy over the contents of the old directory manually.

Dialog Attributes

| | |
|---|---|
| Titlebar | Preferences |
| Resize | The dialog cannot be resized or minimized. The depth of the dialog can be fixed to accommodate the content. |
| Close | The dialog can be closed by clicking OK or Cancel. |
| Minimize | No |
| Reposition | Yes |
| Modal | Yes |
| Icons | None |
| Menu Interaction | File > Preferences |

Errors & Logging

| Action | Activity Type | Data |
|---|---|---|
| Log | Modified signature repository | • timestamp<br>• old and new value |
| Log | Modified results location | • timestamp<br>• old and new value |
| Log & Open Error Dialog | Error saving preferences | • timestamp<br>• detailed error message |

I18n Tokens

| ID | English |
|---|---|
| D16.TITLE | Preferences |
| D16.T1.TITLE | Download Options |
| D16.T1.F1.HELP | You may change the location where Predictive support downloads signaures. |
| D16.T1.F1.LABEL | Signature Download Directory |
| D16.T1.F2.HELP | If you are behind a firewall, you may need to provide HTTP proxy |

| ID | English |
|---|---|
| | information. |
| D16.T1.F3.LABEL | Use HTTP Proxy |
| D16.T1.F4.LABEL | Host |
| D16.T1.F5.LABEL | Port |
| D16.T1.F6.LABEL | Use Authentication |
| D16.T1.F7.LABEL | Username |
| D16.T1.F8.LABEL | Password |
| D16.T2.TITLE | Results Options |
| D16.T2.F1.HELP | You may change the location of the results archives. |
| D16.T2.F1.LABEL | Results Directory |
| *B.BROWSE* | *Browse...* |
| *B.CANCEL* | *Cancel* |
| *B.HELP* | *Help* |
| *B.APPLY* | *Apply* |
| *B.OK* | *OK* |
| D16.T2.W1.MESSAGE | The directory does not exist. Create now? |
| D16.T2.I1.MESSAGE | You are moving your signature repository. If you want to keep your existing signatures, you must move the contents of [old directory location] into [new directory location]. |
| D16.T2.I1.MESSAGE | You are moving the destination of your signature evaluation results. If you want to keep your existing results files, you must move the contents of [old directory location] into [new directory location]. |

Help[i9]

*(D17) About (Dialog)*

This dialog (Diagram 54: Dialog: About) can open when you click About from the Help menu.

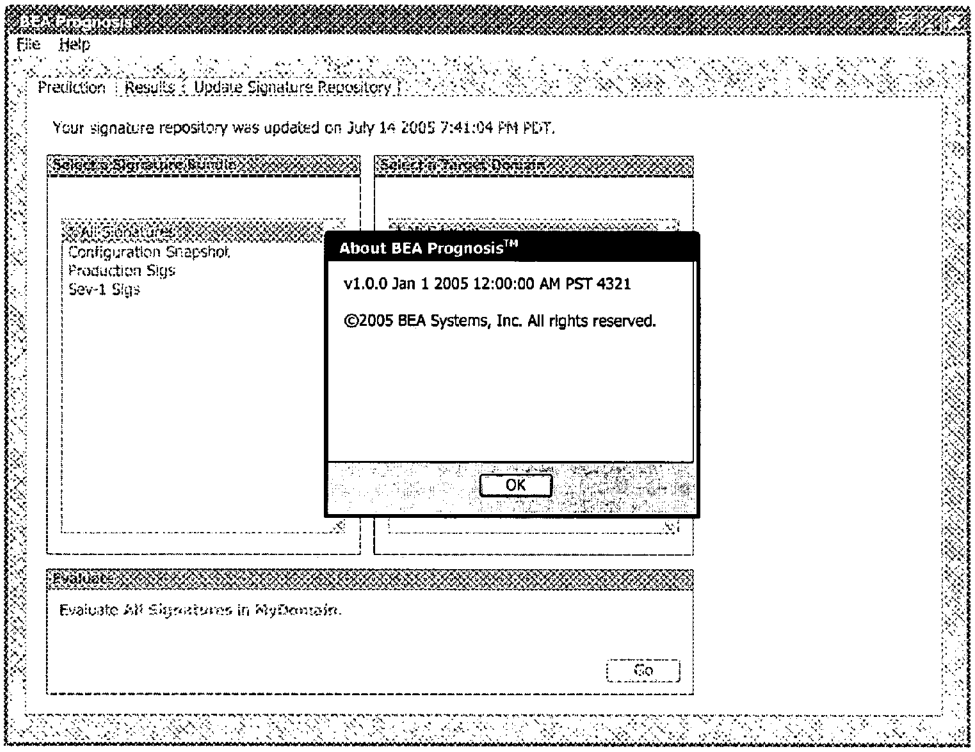

*Diagram 54: Dialog: About*

Content

- Product version number, build date and internal build number.

Interactions

Dialog Attributes

| | |
|---|---|
| Titlebar | About |
| Resize | The dialog cannot be resized or minimized. The depth of the dialog can be fixed to accommodate the content. |
| Close | The dialog can be closed by clicking OK. |
| Minimize | No |
| Reposition | Yes |
| Modal | Yes |
| Icons | None |
| Menu Interaction | Help > About |

I18n Tokens

| ID | English |
|---|---|

| | |
|---|---|
| D17.TITLE | About Predictive support |
| D17.COPYRIGHT | *TBD* |

Command-Line Interface

Provides a Java command-line interface to the key Predictive support tasks.

Assumptions

Platform

It can be assumed that the tool can be supported on all "tier one" platforms and operating systems that we currently support for our installer and our products.

Internet Connectivity

Internet connectivity can be assumed for the Update Signature Repository task.
All other tasks can assume that there is no internet connectivity.

Interaction Model

In a command-line environment, the user can add the Predictive support classes to the CLASSPATH environment variable. User can ensure that the correct JDK binaries can be available in the path.
The command sends output to stdout and returns an exit code of 0 if the command succeeds or 1 if the command fails.

Interface Specification

Evaluate

User invokes the predict.Evaluate command with the desired options.

*Input/Output*

*Diagram 55: Syntax: Evaluate*

```
java predict.Evaluate -domain domain_id [Options]
```

*Table 3: Command Line Options: Evaluate*

| Option | Description | Required? |
|---|---|---|
| -domain domain_id | The unique identifier from the domain registry, specifies which domain to evaluate. If invalid, returns "Invalid domain" error. If omitted, uses the default domain. | No |
| -bundle bundle_id | The unique identifier of the bundle of signatures to evaluate. If invalid, returns "Invalid bundle" error. If unspecified, the default "All Signatures" bundle can be used. | No |
| -password password | Specifies the password of an administrator account for the domain to evaluate. If you omit both the username and password options, attempts to obtain the encrypted username and password values from the application's domain registry. If admin credentials are not persisted, returns error. | No |

| Option | Description | Required? |
| --- | --- | --- |
| -username username | Specifies the username of an administrator account for the domain to evaluate. If you omit both the username and password options, attempts to obtain the encrypted username and password values from the application's domain registry. If admin credentials are not persisted, returns error. | No |
| -verbose | If specified, system writes progress to stdout. | No |

*Diagram 56: Command Line Output: Evaluate (verbose)*

```
> java predict.Evaluate -domain D1001 -verbose
Evaluating All Bundles in MyDomain...
Preparing Data Collection Plan...
Data Collection in progress...
Evaluating 199 signatures...
Done.
Evaluated All Signatures (199 signatures, 1 snapshot) in MyDomain on Mar 1
2005 7:14:01 AM PDT.
3 Signatures Detected, 1 Snapshot Taken
The results are archived in c:\bea\predict\results\MyDomain-D1001\2005-03-01-
07-14-01.
```

*Diagram 57: Command Line Output: Evaluate (not verbose)*

```
> java predict.Evaluate -domain D1001
Evaluated All Signatures (199 signatures, 1 snapshot) in MyDomain on Mar 1
2005 7:14:01 AM PDT.
3 Signatures Detected, 1 Snapshot Taken
The results are archived in c:\bea\predict\results\MyDomain-D1001\2005-03-01-
07-14-02.
```

*Errors & Logging*

| Action | Activity Type | Data |
| --- | --- | --- |
| Log & Report to stdout | Invalid domain ID | • timestamp<br>• domain ID |
| Log | Domain Login: Success | • timestamp<br>• domain ID |
| Log & Report to stdout | Domain Login Error: Authenticaion Failed | • timestamp<br>• domain ID |
| Log & Report to stdout | Domain Login Error: Admin Server Not Responding | • timestamp<br>• domain ID |
| Log | Evaluation: Success | • timestamp<br>• bundle ID<br>• domain ID |
| Log & Report to stdout | Evaluation Error: Error reading a signature | • timestamp<br>• bundle ID<br>• domain ID<br>• signature ID<br>• error details |

| Action | Activity Type | Data |
|---|---|---|
| Log & Report to stdout | Evaluation Error: Error connecting to a data source (e.g. the domain's admin server) | • timestamp<br>• bundle ID<br>• domain ID<br>• connection error details |
| Log & Report to stdout | Evaluation Error: Error collecting data | • timestamp<br>• bundle ID<br>• domain ID<br>• error details |
| Log & Report to stdout | Evaluation Error: Signature Expression Syntax Error | • timestamp<br>• bundle ID<br>• domain ID<br>• signature ID<br>• error details |
| Log & Report to stdout | Evaluation Error: Error writing out results (e.g. no write permission to results directory, out of disk space, etc.) | • timestamp<br>• bundle ID<br>• domain ID<br>• I/O error details |
| Signature Log | Record each signature evaluated in signature.log. | • timestamp<br>• bundle ID<br>• domain ID<br>• signature ID<br>• signature version<br>• detected? |

*I18n Tokens*

| ID | English |
|---|---|
| CL.Evaluate.SUBTITLE | Evaluating [selected signature bundle name] in [selected domain name] |
| CL.Evaluate.PR1.LABEL | Preparing data collection plan… |
| CL.Evaluate.PR2.LABEL | Collecting data… |
| CL.Evaluate.PR3.LABEL | Evaluating [count] signatures… |
| CL.Evaluate.PR4.LABEL | Done |
| CL.Evaluate.RESULTS.MESSAGE | Evaluated [selected signature bundle name] ([count] signature(s), [count] snapshot(s)) in [selected domain name] on [dateformat]. |
| CL.Evaluate.FOOTER | These results are archived in [directory]. |

Domains

In one embodment, if a user wants to run predict.Evaluate, they must provide a domain ID. The user can run this predict.Domains command to determine the domain ID of the domain they want to evaluate.

User can invoke the predict.Domains command.

*Input/Output*

*Diagram 58: Syntax: Evaluate*

```
java predict.Domains
```

*Diagram 59: Command Line Output: Domains*

```
> java predict.Domains
ID     Name
------ ----------------------
D001   MyDomain
D002   SomeOtherDomain
D003   MyProductionDomain
```

*I18n Tokens*

| ID | English |
|---|---|
| CL.Domains.C1.LABEL | ID |
| CL.Domains.C2.LABEL | Name |

Bundles

In one embodiment, if a user wants to run predict.Evaluate, they may provide a bundle ID (or default to the All Signatures bundle). The user can run this predict.Bundles command to determine the bundle ID of the bundle they want to evaluate.
User can invoke the predict.Bundles command.

*Input/Output*

*Diagram 60: Syntax: Evaluate*

```
java predict.Bundles
```

*Diagram 61: Command Line Output: Bundles*

```
> java predict.Bundles
ID     Name
------ ----------------------
B000   All Signatures
B002   Production Sigs
B003   Sev-1 Signatures
```

*I18n Tokens*

| ID | English |
|---|---|
| CL.Bundles.C1.LABEL | ID |
| CL.Bundles.C2.LABEL | Name |

Update Signature Repository

User can invoke the predict.UpdateSignatureRepository command with the desired options.

*Input/Output*

*Diagram 62: Syntax: Evaluate*

```
java predict.UpdateSignatureRepository [Options]
```

*Table 4: Command Line Options: UpdateSignatureRepository*

| Option | Description | Required? |
|---|---|---|
| -password password | Specifies the user's eSupport password. If you omit both the username and password options, looks for "remembered" eSupport username and password from the application. If eSupport credentials are not persisted, returns error. | No |
| -username username | Specifies the user's eSupport username. If you omit both the username and password options, looks for "remembered" eSupport username and password from the application. If eSupport credentials are not persisted, returns error. | No |
| -verbose | If specified, system writes progress to stdout. | No |

*Diagram 63: Command Line Output: UpdateSignatureRepository (verbose)*

```
> java predict.UpdateSignatureRepository -verbose
Connecting to Software support...
Checking for new signatures...
Downloading 4 new signatures...
Disconnecting from Software support...
Done.
4 signatures installed in c:\bea\predict\signatures.
ID/Version Signature
---------- --------------------------
S104.0     A New Signature
S105.4     Some Other New Signature
S106.0     Great New Snapshot
S107.0     Something Else New
```

*Diagram 64: Command Line Output: UpdateSignatureRepository (not verbose)*

```
> java predict.UpdateSignatureRepository
4 signatures installed in c:\bea\predict\signatures.
```

*Errors & Logging*

| Action | Activity Type | Data |
|---|---|---|
| Log | Login Successful | • timestamp<br>• eSupport username |
| Log & Report to stdout | Invalid username/password | • timestamp |
| Log & Report to stdout | Error connecting to host (e.g. server error, no internet connectivity) | • timestamp<br>• detailed error message |
| Log & Report to stdout | Error submitting inventory of installed signatures, domain inventories and usage data | • timestamp<br>• detailed error message |
| Log & Report to stdout | Error preparing list of available signatures (server-side error) | • timestamp<br>• detailed error message |

| Action | Activity Type | Data |
|---|---|---|
| Log | Download Complete | • timestamp·list of signature IDs downloaded |
| Log & Report to stdout | Error preparing signatures for download (server-side error) | • timestamp<br>• detailed error message |
| Log & Report to stdout | Error downloading signatures | • timestamp<br>• detailed error message |
| Log & Report to stdout | Error saving signatures to local signature repository (e.g. file I/O error) | • timestamp·<br>• detailed error message |

*I18n Tokens*

| ID | English |
|---|---|
| CL.UpdateSignatureRepository.C1 | ID |
| CL.UpdateSignatureRepository.C2 | Name |
| CL.UpdateSignatureRepository.PR1.LABEL | Connecting to Software support… |
| CL.UpdateSignatureRepository.PR2.LABEL | Checking for new signatures… |
| CL.UpdateSignatureRepository.PR3.LABEL | Downloading [count] new signatures… |
| CL.UpdateSignatureRepository.PR4.LABEL | Disconnecting from Software support… |
| CL.UpdateSignatureRepository.PR5.LABEL | Done |
| CL.UpdateSignatureRepository.MESSAGE | [count] signatures installed in [signature download directory]. |
| CL.UpdateSignatureRepository.C1.LABEL | ID/Version |
| CL.UpdateSignatureRepository.C2.LABEL | Signature |

Activate Domain

User can invoke the predict.Activate command.

*Input/Output*

*Diagram 65: Syntax: ActivateDomain*

```
java predict.Activate [Options]
```

*Table 5: Command Line Options: Activate*

| Option | Description | Required? |
|---|---|---|
| -adminServerURL adminServerURL | The URL of the Administration Server of the domain, in the format [protocol://]admin-server-listen-address:listen-port. Protocol defaults to t3 if protocol is unspecified, but you may also specify t3s, http, https or iiop. | Yes |
| -password password | Specifies the password of an administrator account for the domain to evaluate. | Yes |
| -username username | Specifies the password of an administrator account for the domain to evaluate. | Yes |
| -verbose | If specified, system writes progress to stdout. | No |

*Diagram 66: Command Line Output: Activate (verbose)*

```
> java predict. Activate -adminServerURL t3://foo:7001 -username weblogic -
password weblogic -verbose
Connecting to admin server...
Installing adminagent...
Deploying adminagent...
Retrieving domain information...
Done
ID     Name
------ ----------------------
D001   MyDomain
```

*Diagram 67: Command Line Output: Activate (not verbose)*

```
> java predict. Activate -adminServerURL t3://foo:7001 -username weblogic -
password weblogic
ID     Name
------ ----------------------
D001   MyDomain
```

*Errors & Logging*

| Action | Activity Type | Data |
|---|---|---|
| Log | Domain Login: Success | • timestamp<br>• adminServerUrl |
| Log & Report to stdout | Domain Login Error: Authenticaion Failed | • timestamp<br>• adminServerUrl |
| Log & Report to stdout | Domain Login Error: Admin Server Not Responding | • timestamp<br>• adminServerUrl |
| Log | Domain Activation: Success | • timestamp<br>• domain ID |
| Log & Report to stdout | Domain Activation Error: Error installing adminagent (must rollback, i.e. uninstall adminagent) | • timestamp<br>• installation error details |
| Log & Report to stdout | Domain Activation Error: Error deploying adminagent (must rollback, i.e. leave adminagent undeployed and uninstalled) | • timestamp<br>• deployment error details |
| Log & Report to stdout | Domain Activation Error: Error retrieving Domain Information (must rollback, i.e. leave adminagent undeployed and uninstalled) | • timestamp<br>• error details |
| Log & Report to stdout | Domain Deactivation Error: Error updating AdminAgent's client list | • timestamp<br>• error details |

*I18n Tokens*

| ID | English |
|---|---|
| CL.Activate.SUBTITLE | Evaluating [selected signature bundle name] in [selected domain |

| | |
|---|---|
| | name] |
| CL.Activate.PR1.LABEL | Connecting to admin server... |
| CL.Activate.PR2.LABEL | Installing adminagent... |
| CL.Activate.PR3.LABEL | Deploying adminagent... |
| CL.Activate.PR4.LABEL | Retrieving domain information... |
| CL.Activate.PR5.LABEL | Done |
| CL.Activate.C1.LABEL | ID |
| CL.Activate.C1.LABEL | Name |

Deactivate Domain

User cab invoke the predict.Deactivate command.

*Input/Output*

*Diagram 68: Syntax: Deactivate*

```
java predict.Deactivate [Options]
```

*Table 6: Command Line Options: Deactivate*

| Option | Description | Required? |
|---|---|---|
| -domain domain_id | The unique identifier from the domain registry, specifies which domain to evaluate. If invalid, returns "Invalid domain" error. | Yes |
| -password password | Specifies the password of an administrator account for the domain to evaluate. If you omit both the username and password options, attempts to obtain the encrypted username and password values from the application's domain registry. If admin credentials are not persisted, returns error. | No |
| -username username | Specifies the username of an administrator account for the domain to evaluate. If you omit both the username and password options, attempts to obtain the encrypted username and password values from the application's domain registry. If admin credentials are not persisted, returns error. | No |
| -verbose | If specified, system writes progress to stdout. | No |

*Diagram 69: Command Line Output: Deactivate (verbose)*

```
> java predict. Deactivate -domain D104
Connecting to admin server...
Undeploying adminagent...
Uninstalling adminagent...
Done
```

*Diagram 70: Command Line Output: Deactivate (not verbose)*

```
> java predict. Deactivate -domain D104
Done
```

*Errors & Logging*

| Action | Activity Type | Data |
|---|---|---|
| Log & | Invalid domain ID | • timestamp |

| Action | Activity Type | Data |
|---|---|---|
| Report to stdout | | • domain ID |
| Log | Domain Login: Success | • timestamp<br>• domain ID |
| Log | Domain Deactivation: Success | • timestamp<br>• domain ID |
| Log & Report to stdout | Domain Deactivation Error: Error undeploying adminagent (must rollback, i.e. leave adminagent deployed) | • timestamp<br>• undeployment error details |
| Log & Report to stdout | Domain Deactivation Error: Error uninstalling adminagent (must rollback, i.e. leave adminagent installed and deployed) | • timestamp<br>• uninstallation error details |
| Log & Report to stdout | Domain Deactivation Error: Error updating domain registry (must rollback, i.e. leave adminagent installed and deployed) | • timestamp<br>• error details |
| Log & Report to stdout | Domain Deactivation Error: Error updating AdminAgent's client list | • timestamp<br>• error details |

*I18n Tokens*

| ID | English |
|---|---|
| CL.Deactivate.SUBTITLE | Evaluating [selected signature bundle name] in [selected domain name] |
| CL.Deactivate.PR1.LABEL | Connecting to admin server... |
| CL.Deactivate.PR2.LABEL | Undeploying adminagent... |
| CL.Deactivate.PR3.LABEL | Uninstalling adminagent... |
| CL.Deactivate.PR4.LABEL | Done |

Ant Tasks

Assumptions

Platform

It can be assumed that the tool can be supported on all "tier one" platforms and operating systems that we currently support for our installer and our products.

Internet Connectivity

Internet connectivity can be assumed for the Update Signature Repository task.
All other tasks assume that there is no internet connectivity.

Interaction Model

In one embodiment, users may include core Predictive support functionality in their build process by using the Ant tasks described here.

Each task definition may be added to your build file with a taskdef pointing to the task's class, located in the Predictive support installation.

```
<taskdef name="[taskname]" classname="[classname]"/>
```

Interface Specification

Evaluate

User can invoke the predict-evaluate Ant task as part of an ant build script. Output can be same as command line output.

*Diagram 71: Ant Example: Evaluate*

```
<target name="predict">
  <predict-evaluate domain="D101" verbose="true"/>
</target>
```

*Table 7: Ant Task Attributes: Evaluate*

| Attribute | Description | Data Type | Required? |
|---|---|---|---|
| domain | The unique identifier from the domain registry, specifies which domain to evaluate. If invalid, returns "Invalid domain" error. If omitted, uses the default domain. (To determine the domain id, see the command line interface predict.Domains (see Domains). | String | No |
| bundle | The unique identifier of the bundle of signatures to evaluate. If invalid, returns "Invalid bundle" error. If unspecified, the default "All Signatures" bundle can be used. (To determine the domain id, see the command line interface predict.Bundles (see Bundles). | String | No |
| password | Specifies the password of an administrator account for the domain to evaluate. If you omit both the username and password attributes, attempts to obtain the encrypted username and password values from the application's domain registry. If admin credentials are not persisted, returns error. | String | No |
| username | Specifies the username of an administrator account for the domain to evaluate. If you omit both the username and password attributes, attempts to obtain the encrypted username and password values from the application's domain registry. If admin credentials are not persisted, returns error. | String | No |
| verbose | If specified, system writes progress to stdout. | boolean | No |

See command line specfication (Evaluate) for output, errors and logging.

Update Signature Repository

User can invoke the predict-updateSignatureRepository Ant task as part of an ant build script. Output can be same as command line output.

*Diagram 72: Ant Example: Update Signature Repository*

```
<target name="new-signatures">
```

```
  <predict-updateSignatureRepository username="iang" password="mypassword"
verbose="true"/>
</target>
```

*Table 8: Ant Task Attributes: Update Signature Repository*

| Attribute | Description | Data Type | Required? |
|---|---|---|---|
| password | Specifies the user's eSupport password. If you omit both the username and password options, looks for "remembered" eSupport username and password from the application. If eSupport credentials are not persisted, returns error. | String | No |
| username | Specifies the user's eSupport username. If you omit both the username and password options, looks for "remembered" eSupport username and password from the application. If eSupport credentials are not persisted, returns error. | String | No |
| verbose | If specified, system writes progress to stdout. | boolean | No |

See command line specification (Update Signature Repository) for output, errors and logging and I18n tokens.

Activate Domain

User can invoke the predict-activate Ant task as part of an ant build script. Output can be same as command line output.

*Diagram 73: Ant Example: Activate Domain*

```
<target name="activate">
  <predict-activate adminServerURL="t3://foobar:7001" username="iang"
password="mypassword" verbose="true"/>
</target>
```

*Table 9: Ant Task Attributes: Activate Domain*

| Attribute | Description | Data Type | Required? |
|---|---|---|---|
| adminServerURL | The URL of the Administration Server of the domain, in the format [protocol://]admin-server-listen-address:listen-port. Protocol defaults to t3 if protocol can be unspecified, but you may also specify t3s, http, https or iiop. | String | Yes |
| password | Specifies the password of an administrator account for the domain to evaluate. | String | Yes |
| username | Specifies the password of an administrator account for the domain to evaluate. | String | Yes |
| verbose | If specified, system writes progress to stdout. | boolean | No |

See command line specification (Activate Domain) for output, errors and logging and I18n tokens.

Deactivate Domain

User can invoke the predict-deactivate Ant task as part of an ant build script. Output can be same as command line output.

*Diagram 74: Ant Example: Deactivate Domain*

```
<target name="deactivate">
  <predict-deactivate domain="D101" username="weblogic" password="weblogic"
verbose="true"/>
</target>
```

*Table 10: Ant Task Attributes: Deactivate Domain*

| Attribute | Description | Data Type | Required? |
|---|---|---|---|
| domain | The unique identifier from the domain registry, specifies which domain to evaluate. If invalid, returns "Invalid domain" error. (To determine the domain id, see the command line specification (Domains).) | String | Yes |
| password | Specifies the password of an administrator account for the domain to evaluate. If you omit both the username and password attributes, attempts to obtain the encrypted username and password values from the application's domain registry. If admin credentials are not persisted, returns error. | String | No |
| username | Specifies the username of an administrator account for the domain to evaluate. If you omit both the username and password attributes, attempts to obtain the encrypted username and password values from the application's domain registry. If admin credentials are not persisted, returns error. | String | No |
| verbose | If specified, system writes progress to stdout. | boolean | No |

See command line specification (Deactivate Domain) for output, errors and logging and I18n tokens.

eSupport Interface

In one embodiment, a new Predictive support link is added to the Tools section of the navigation bar in eSupport. It can be visible to both logged in and not logged in users. When a user clicks this link, they can see information about Predictive support, the product download area and the signature download area.

Logged in users can also see a new Predictive support portlet on the main eSupport page, with links to the Product Download and Signature Download portlets.

Product Download

User can click to download the Predictive support installer. In one embodiment, user must be logged in. A zip of all signatures can be included in the download.

Server-side, each product download event can be logged with username, timestamp, product version and list of signatures downloaded. In one embodiment, this data is accessible to the Predictive support team.

Signature Download

Display "New signatures published [dateformat]". User can click to download a zip of all available signatures.

Server-side, each signature download event must be logged with username, timestamp and the list of signatures downloaded. In one embodiment, this data is accessible to the Predictive support team.

Appendices

Closed Issues

Deferred to Future Release

*Table 12: Deferred to Future Release*

| ID | Description | Owner | Resolution |
|---|---|---|---|
| 1 | Accessibility: Include GUI tool in the general review of Platform fat-client tool accessibility. | | |
| 2 | Accessibility: Sight-challenged: The GUI tool can work with screen readers (for severe impairment) and zoom or contrast enhancement tools (for low vision). See http://www.rene4u.com/scr-e.htm. To be compatible with screen readers, an evaluation can have to be made of such things as tab-precedence, mnemonics, alt-style help tags, etc. All menu commands and GUI buttons or other options and controls can have keyboard mnemonics. | | |
| 3 | Allow users to add/clone/modify/delete signature bundles from the Prediction tab and from a menu. Users may not delete or modify BEA-created bundles, but may clone them and modify the clones. Therefore the "modify" and "delete" icons can be disabled when a bundle is the selected bundle. The Administrator creates, modifies or deletes signature bundles.<br>There are two types of signature bundles:<br>* ManualBundle: like an ordinary iTunes playlist, i.e. create a bundle, add signatures to it and remove signatures from it.<br>* AutoBundle: like an iTunes "smart playlists", i.e. create a bundle, add/remove/modify conditions for any of the signature metadata like product/category/type/severity, etc., e.g. "production signatures published after 1/1/05" or "Portal 8.1 signatures with 'server outage' impact". Need to also be able to group conditions together with and/or logic. And need to be able to delete bundles (which would not delete the signatures, just like deleting an iTunes playlist doesn't delete the songs).<br>The Administrator creates a new bundle by assigning a unique name, indicating whether it can be a manual or automatic bundle, and setting its domain visibility (i.e. which domains it can be visible to, default to all).<br>The Administrator modifies the domain visibility for the signature bundle (i.e. which domains it is visible to, default to all).<br>The Administrator deletes a signature bundle. Note that this does not delete any signatures from the signature repository. | | |
| 4 | Allow user to assign "visibility" of user-defined signature bundles to zero or more domains. This can also require a change to the Prediction tab so that when you select a domain, the list of available bundles for that domain refreshes, and when you select a bundle, the list of available domains for that bundle refreshes, and the ability to "reset" either or both lists to "show all." | | |

| ID | Description | Owner | Resolution |
|---|---|---|---|
| 5 | Enable "batch" domain activation by loading a text file with admin server URL/username/password? | | |
| 6 | Progress bars display percentage complete instead of just animating that work is in progress. | | |
| 7 | Admin Console UI: in addition to installing the adminagent, domain activation can install a console extension which provides an interface for evaluating signatures and creating cases. This can require an additional feature in the tool GUI to synchronize the signature repository with the tool's repository. | | |
| 8 | Results tab: Browse archived results (file browse the configured results archive directory). | | |
| 9 | Results tab: Browse archived results by date using [Next \| Previous] buttons to scroll through the evaluations by date. (So we need to "index" the results by date across domains in addition to within domains.) | | |
| 10 | Results tab: Printer-Friendly View which includes the summary and all details together in one page. | | |
| 11 | Results tab: Save as .pdf file. | | |
| 12 | Results tab: Save summary and details all together in one pdf. | | |
| 13 | Results tab: Email the printer-friendly view to… | | |
| 14 | Detailed Results dialog: integrate with Patch Management tool, enable the "Get Patch" button if the remedy section specifies patch id(s). | | |
| 15 | Create Case dialog: Attachments (Default attachments from signature, user-specified attachments) | | |
| 16 | Create Case dialog: submit from form to create case automatically, needs Clarify web service | | |
| 17 | Create Case automatically upon signature detection? | | |
| 18 | Refresh in Progress: Get domain registry.xml files from all of the registered domains, aggregate them and send them in to target the signatures. | | |
| 19 | Update Signature Repository tab: display checkboxes for each available signature so the user could select which signatures to download. | | |
| 20 | Other "Preferences":<br>- create case automatically if signature detected, by severity or by other signature metadata, or by bundle?<br>- default location for case creation archives<br>- if we're taking an inventory for targeting signatures, configure the default location for those archives<br>- location of patch mgmt tool? | | |
| 21 | Evaluate a bundle across multiple domains. Assume user has persisted all the domain credentials? (Otherwise we'll have to deal with how to pass in credentials for each domain.) | | |
| 22 | Add Preference to update signature repository automatically before running signatures. | | |
| 23 | Detailed Results: Get Patch - launch patch management tool with list | | |

| ID | Description | Owner | Resolution |
|---|---|---|---|
| | of required patch ids and target product home preset. | | |
| 24 | Detailed Results: Fix Now: if a script or java class is specified in the remedy for the signature, fix now button launches a wizard style interface to (a) describe the fix and how the user can modify their build scripts, (b) confirm that user really wants to run it now in this domain, (c) execute it, (d) provide rollback capability. | | |
| 25 | Detailed Results: Fix Now: allow the user to specify their own scripts of java classes as the remedy for a signature? | | |
| 26 | Create a Case: filter attachments using default and/or user-specified regex, e.g. to strip out usernames | | |
| 27 | Publish signature schema and API to let users add their own signatures. (Contribute signatures back to BEA? Share on dev2dev?) | | |
| 28 | Configuration Management, i.e. diff of domain inventories or config snapshots (open source diff tools http://www.manageability.org/blog/stuff/open-source-xml-diff-in-java/view) | | |
| 29 | Distribute tool for users to create/test their own signatures. (Contribute signatures back to BEA? Share on dev2dev?) | | |
| 30 | Publish data access API to let users add their own data sources and develop custom signatures using those data sources. (Contribute new data sources back to BEA? Share on dev2dev?) | | |
| 31 | Log parser as add-on tool? | | |
| 32 | Scheduling and notification | | |
| 33 | "open source" the agent pieces (AdminAgent, ManagedAgent) so customer can see there's nothing intrusive or damaging happening? | | |
| 34 | Follow-up on the progress of a CR which a signature notifies a user of, and let customer "subscribe" to the cr? | | |
| 35 | Off-line mode, i.e. no admin server running? Get what we can from config files, deployment descriptors, log files instead of JMX? | | |
| 36 | Lay foundation for additional modules, e.g. open source java profilers (http://www.manageability.org/blog/stuff/open-source-profilers-for-java/view) or network visualization graphs (http://www.manageability.org/blog/stuff/open-source-graph-network-visualization-in-java/view). | | |
| 37 | Can we come up with a "hosted" interface where nothing is installed or executed locally on the customer side? Then signatures could live server-side, requiring a connection and login to execute them, thereby protecting our IP? | | |
| 38 | the admin server has Configuration Auditing capabilities, i.e. can generate "audit events" and/or log messages when a user changes or invokes management operations on domain resources, so we can leverage that core server capability to deal with triggering evaluation. | | |
| 39 | In the domain properties dialog, think about whether to allow user to modify admin server URL. If so, then updating domain properties would require connecting to the admin server, to make sure that the adminagent is installed, and update the domain inventory (do all the same stuff activating a domain does). | | |

| ID | Description | Owner | Resolution |
|---|---|---|---|
| 40 | Command line tool to activate a whole list of domains at once. | | |
| 41 | Command line tool to export the domain registry including username and encrypted passwords. | | |
| 42 | Command line tool import an exported domain registry. | | |
| 43 | User configure preferences for predictive support.log file location and rotation. | | |
| 44 | Integrate with product installer | | |
| 45 | feature to get user feedback from detailed results page | | |
| 46 | signature segmentation, i.e. only distribute to MCS customers, or some other designation | | |
| 47 | | | |

Impact*[i10]*

The following may be considered for describing the risk or impact of a signature (from Gareth Chapman's work). They can be listed in descending order of severity. We may use them in conjunction with a server mode (i.e. production mode or development mode) to map to a severity in our case management system.

| Impact | Description |
|---|---|
| Server Outage | The problem has caused or could cause the customer's server to fail to respond. |
| Subsystem Outage | The problem has caused or could part of the customer's server to fail to respond or satisfy its purpose. The rest of the server and service is functioning correctly. |
| User Viewable Errors | The problem can manifest itself in such a way that users of the system see errors or unexpected behaviour. |
| Non-User Viewable Errors | Errors occur on the system but these are not viewable by or affecting to users. |
| Administration | The problem has an adverse affect on the Administration of the service. |
| Performance | The problem has caused or could cause the customer's service to be slower that required. |
| Development | The problem can only affect development process. |
| Specification Non-Compliance | The WebLogic product does not comply with a predefined specification however this does not cause any of the above impacts. |

Directory Structure

- [predictive support installation root directory]
    - logs
        - predictive support.log
    - domainInventory
        - [domain_id].inv (0..*)
        - [domain_id].[n] (0..*)
- [user-configured signature repository, defaults to "signatures" under the predictive support installation root directory]
    - bundles
        - [bundle_id].bdl (0..*)
    - [signature_id].[signature_version].sig (0..*)

- [user-configured root results directory, defaults to "results" under the pronosis installation root directory]
  - [domain_id] (0..*)
    - [yyyymmddhhnnsslll] (0..*)
      - results.xml
      - [signature_id].[signature_version].dtl (0..*)

We can encourage customers to set the results directory to some location outside the product installation directory structure. This preserves the implicit contract with the customer that their data can never be removed, including during uninstallation of product.[1]

Predictive Tools "Get Patch Now" Use Case[2]

Primary Actor: Customer's System Administrator
Preconditions:

- Customer has installed and configured the Patch Management tool from WebLogic Server v9.0.1
- Customer is a registered user of Software support's Predictive Tools
- System Administrator has valid eSupport username and password
- Signatures which recommend a patch or patches include the patch ID or list of patch IDs in the signature definition's "remedy" node.

Postconditions:

- Customer has downloaded the patches recommended by Software support's Predictive Tools

*Table 13: Predictive Tools "Get Patch Now" Use Case Basic Flow*

| Primary Actor | System |
|---|---|
| 1. Launch the Predictive Tools UI for a specified WebLogic Platform domain. | |
| 2. Run signature evaluation for a set of Predictive Tools signatures in this domain. | 3. Predictive Tools System evaluates signatures in the context of the specified domain. |
| | 4. Predictive Tools System displays list of signatures which were detected (each item in the list can be a link to a details page for that signature). |
| 5. Follow the link to the details page for a signature which was detected. | 6. Predictive Tools System displays details page for the selected signature. This page includes a "Get Patch Now" button for signatures which specify a patch ID or list of patch IDs. |
| 7. Review Software support's description | |

[1] Excerpt from Platform Engineering's Design Principles - Domains, including Configuration Wizard and Template Processing (http://lcpdev15:7001/PlatformWiki/Wiki.jsp?page=Diamond.Doc.DesignPrin.Domains): Separation of file ownership and Customer file ownership
It is intuitive that "owned" files may be updated and uninstalled routinely by tools. BEA's documentation around best practices clearly establishes this position.
Similarly, it is intuitive that files created by a customer should not be touched by BEA. There are limited exceptions that involve specialized processing where identifies impact to customers' files at a granular level and the customer understands and has agreed to allow this processing.
should encourage practices to promote this separation and avoid practices blurring the separation.

| Primary Actor | System |
| --- | --- |
| of the potential problem and recommendations for resolving it. | |
| 8. Click "Get Patch Now" button. | 9. Predictive Tools System launches the Patch Management GUI, passing in the product installation home directory (e.g. c:\bea\weblogic90) and the list of patch IDs defined by the signature. |
| | 10. Patch Management System displays Login dialog. |
| 11. Enter eSupport username and password. | 12. Patch Management System displays Application Window's Get Patches tab, preselects the Target Installation based on the input from the Predictive Tools, lists the patches specified by the Predictive Tools system in the Get Patches table with their "Add" checkboxes preselected, and activates the "Download" button. |
| 13. Click the "Download" button. | 14. Continue with standard Patch Management System processes for patch validation, download and installation. |

- Steps 5-14 can be repeatable for all detected signatures. Each signature's recommendations can be presented and acted upon discretely – for v1, there is no notion of aggregating the lists of recommended patches across multiple signatures.
- If the user has configured auto-login in the Patch Management tool, skip steps 10-11.

registry.xml

The registry (registry.xml) identifies the products and versions installed on a host. This may be helpful in creating a domain inventory.

*Diagram 75: Sample registry.xml*

```
<?xml version="1.0" encoding="UTF-8"?>
<bea-product-information>
  <host home="C:\bea814p" name="iang-340">
    <product format="1.0" name="WebLogic Platform">
      <release level="8.1"
        ServicePackLevel="4" PatchLevel="0"
        Status="installed" BeaProgramGroup="WebLogic Platform 8.1 (BEAHOME
2)" StartMenu="C:\Documents and Settings\iang\Start Menu\Programs"
        InstallTime="Jan 26, 2005 5:13:15 PM"
        InstallDir="C:\bea814p\weblogic81"
        JavaHome="C:\bea814p\jrockit81sp4_142_05" JavaVersion="1.4.2_05-8140"
JavaVendor="BEA">
        <component name="WebLogic Server" version="8.1.4.0">
          <component name="Server"/>
          <component name="Server Examples"/>
        </component>
        <component name="WebLogic Workshop" version="8.1.4.0">
          <component name="Workshop Runtime Framework"/>
          <component name="WebLogic Workshop Application Developer Edition"/>
          <component name="Workshop Samples"/>
```

```
        </component>
        <component name="WebLogic Integration" version="8.1.4.0">
          <component name="Integration Server"/>
          <component name="WebLogic Workshop Integration Extension"/>
          <component name="Integration Examples"/>
        </component>
        <component name="WebLogic Portal" version="8.1.4.0">
          <component name="Portal Server"/>
          <component name="WebLogic Workshop Portal Extension"/>
          <component name="Portal Examples"/>
        </component>
        <component name="Platform Samples and Utilities" version="8.1.4.0">
          <component name="Platform Tour"/>
        </component>
     </release>
    </product>
    <java-installation Name="jdk142_05" JavaHome="C:\bea814p\jdk142_05"
JavaVersion="1.4.2_05" JavaVendor="Sun" Architecture="32" Platform="win">
        <dependent-product Name="WebLogic Platform" Version="8.1.4.0"/>
    </java-installation>
    <java-installation Name="jrockit81sp4_142_05"
JavaHome="C:\bea814p\jrockit81sp4_142_05" JavaVersion="1.4.2_05-8140"
JavaVendor="BEA" Architecture="32" Platform="win">
        <dependent-product Name="WebLogic Platform" Version="8.1.4.0"/>
    </java-installation>
  </host>
</bea-product-information>
```

Technical Notes

- what if the signature metadata can be included in xml file instead of one per signature, with a separate binary or encrypted file per signature with the signature's expression and remedy?
- the logging subsystem as a data source into signatures
- The registry.xml files can be collected from all the machines that have servers in the domain.
- Dev vs. Production Mode can be determined from domain-level mbean
- activating a domain can assign each domain a unique ID since the name won't necessarily be unique, like if you're activating domains which are located on different machines.
- In one embodiment, deactivating a domain does not remove the record from the application's domain registry altogether, nor does it delete any of the existing domain results files
- No progress dialog can be necessary for domain properties update because we don't need to connect to the admin server in this step – we just need to persist the admin credentials in the local domain registry.
- Server-side, the refresh operation can look like this: Client sends list of signatures already installed, domain inventories, and usage data since last refresh; server persists this data along with eSupport username and timestamp; server returns list of all signatures from the repository which are either not in that list or have newer versions. The input of the signatures can be as simple as a text string like: "1001.0,1002.0,1003.0,1004.0,1005.0" (comma delimited list of signature_id.version). What the server returns can be an xml document which aggregates the xml's public metadata of each of the signatures.

JMX

JMX data can be collected by Predictive support by running WLST with a remote connction to the admin server of the target domain. The signature's "data & mappings" element can specify the MBeans and attributes it needs to collect (as well as how the signature's expression can refer to the data items).

JVM/OS

JVM and OS data can be collected by agents deployed in the target domain's admin server and managed servers.

AdminAgent

When Predictive support processes a domain evaluation request, it can get all the JMX info remotely (we'll use WLST to do this) but in 8.1, we need to be inside the VM of each of the servers for JVM/OS information. The AdminAgent can be an application installed by Predictive support and deployed in a target domain's Admin Server at domain activation time. It provides these services:

- Reports its own version to Predictive support at domain activation if there is already an AdminAgent installed in that admin server.
- Installs a ManagedAgent on each of the managed servers in the domain; each time it is asked to evaluate the domain, makes sure that each of the managed servers has a ManagedAgent installed on it.
- Propagates requests for JVM/OS info out to the ManagedAgent on each of the managed servers in the domain, aggregates their responses and sends results back to Predictive support.
- If a user is activating a domain that already has an AdminAgent installed on it, make sure the version is up-to-date and add the Predictive support client "host name" to the adminagent's client list. (Different users may be running different versions of Predictive support, so we need to be careful about interfaces and compatibility (or just report back to the user of the older version that they need to upgrade).)
- In future releases, the AdminAgent can be extended to process requests for other types of data.
- An instance of the AdminAgent can track the host name of each Predictive support installation which has activated it. In one embodiment, only when the last one deactivates the domain can the AdminAgent be undeployed and uninstalled.

*Pseudo-API*

```
public void install([client's host name])
public String getVersion()
public void addClient([client's host name])
public void removeClient([client's host name])
public [data] collect([data items to collect])
private ManagedServer[] getManagedServers()
private void installManagedAgent([Managed Server])
```

private void deployManagedAgent([Managed Server])
private void uninstallManagedAgent([Managed Server])
private void undeployManagedAgent([Managed Server])
private [data] collect([data items to collect], [ManagedServer])

ManagedAgent

When an AdminAgent processes a request for JVM/OS data, either at domain activation or evaluation, it can make sure that each of the ManagedServers in the domain has a ManagedAgent installed on it.

- Receives requests from an AdminAgent for JVM/OS data. For v1, it just runs java.lang.System.getProperties() and returns the results to the AdminAgent.
- In future releases, the ManagedAgent may be extended to process requests for other types of data.

*Pseudo-API* public [data] collect([data items to collect])
public String getVersion()

Artifacts

Aggregate Domain Inventory

This can be the artifact sent in to Software support during the "Refresh" process. It can collect all the current domain inventory files from the Predictive support installation's Domain Inventory directory (i.e. those with a .inv extension) and aggregates them together as children of a "domains" element. It can be transient.

Wraps this around the set of domain inventories (see Domain Inventory).

```
<domains username="[eSupport username]" timestamp="[date/time inventory was
sent]" predictive support_hostname="[user's machine name]" predictive
support_home="[predictive support root installation directory]">
```

```
</domains>
```

Available Signatures

This data can be persistent only within an application session, i.e. it is not available once the user closes the application. It can be returned by the server-side component after a successful Refresh operation. It can contain the public signature metadata for any available signatures and can be the basis for the contents of the Update Signature Repository tab.

Create a Case

This can be transient, generated from the detailed results when the user clicks the Create a Case button.

```
Case Title: [signature name] (Signature ID [signature id].[version])
Case Type: [category]

Predictive support detected the "[signature name]" signature in my domain
"[selected domain name]" on [dateformat].
```

```
----- DATA COLLECTED BY SIGNATURE ----------
[data]
```

*Diagram 76: Create a Case Format*

```
Case Title: CA Certificate Problem (Signature ID S-1034.1)
Case Type: Security

Predictive support detected the "CA Certificate Problem" signature in my
domain "MyDomain" on Mar 1 2005 7:14:01 AM PDT.

----- DATA COLLECTED BY SIGNATURE ----------
AdminServer:
SSLListenPortEnabled = true
WeblogicVersion = WebLogic Server 8.1 SP4 Mon Nov 29 16:21:29 PST 2004 471647
WebLogic XMLX Module 8.1 SP4 Mon Nov 29 16:21:29 PST 2004 471647

ServerA:
SSLListenPortEnabled = true
WeblogicVersion = WebLogic Server 8.1 SP4 Mon Nov 29 16:21:29 PST 2004 471647
WebLogic XMLX Module 8.1 SP4 Mon Nov 29 16:21:29 PST
```

*Diagram 77: Create a Case Sample Output*

I18n Tokens

| ID | English |
|---|---|
| C1 | Case Title |
| C2 | Signature ID |
| C3 | Case Type |
| C4 | Predictive support detected the "[signature name]" signature in my domain "[selected domain name]" on [dateformat]. |
| C5 | ----- DATA COLLECTED BY SIGNATURE ----- |

Data Collection Plan

Persisted, not user-readable or user-editable.

Detailed Results

Detailed results can be created for each signature which was detected and each snapshot taken. These results can be stored as [signature_id].[signature_version].dtl in the results summary folder under the user-configured results folder.

- the whole signature xml
- timestamp
- bundle id evaluated
- domain id evaluated
- data

Domain Inventory

A domain inventory can be created for each domain when it is activated. A new domain inventory can be taken each time a domain is evaluated. A domain inventory must be user-readable (but not user-editable or user-deletable). Each domain in the registry can have an inventory named [domain_id].inv under the Predictive support installation's "domainInventory" directory. When a new domain inventory is taken, the previous inventory file's extension can be changed to a sequential number (e.g. D101.inv would be renamed to D101.001 and then D101.002, etc.) so the new inventory retains the name [domain_id].inv.

```
<domain id="D101" name="MyDomain" timestamp="[date/time this domain inventory
was taken]" adminServerUrl="t3://localhost:7001">
```

```
</domain>
```

Domain Registry

The domain registry can be created at product installation time and can be updated each time a domain is activated or deactivated. In one embodiment, it does not need to be user-readable; it can not be user-editable or user-deletable. The domain registry stores the following information for each domain:

| Name | Description |
|---|---|
| ID | System generates unique identifier for each domain when it is activated. |
| Name | Domain name retrieved by adminagent at domain activation (weblogic.management.configuration.DomainMBean.getName()). |
| Admin Server URL | The admin server URL the user entered at domain activation time. |
| Username | Admin user, stored only if user selects to remember username and password. |
| Password | Admin password, encrypted, stored only if user selects to remember username and password. |
| Activation Date | Timestamp of domain activation. |
| Active | boolean |

Predictive support Log

Log file created in the Predictive support installation directory's logs folder, tracks all activity.

Results

Results can be generated at the end of each evaluation operation, stored as a user-readable file, results.xml, in a folder named [yyyymmddhhnnsslll] under a folder named [domain_id] under the user-configured results folder.

- bundle id evaluated
- domain id evaluated
- timestamp
- list of each signature id/version evaluated, and if detected (or snapshot taken), the relative location of the detailed results
- data

Signature[i16]

Public Metadata

| Name | Type | Description |
|---|---|---|
| ID | String | Unique ID assigned by system when published |
| Version | Integer | Sequential number assigned by system when published |
| Date Published | Timestamp | Assigned by system when published |
| Name | String | |
| Long Description | String | |
| Evaluator | Boolean | false indicates that this is a snapshot |
| Mode | String/Restricted | Dev, Prod, All |
| Severity | String/Restricted | Critical, Warning, Info, Snapshot (system assigs Snapshot severity when published if Evaluator is set to false |
| Category | String/Restricted/Multiple | map to Clarify case types (administration, coding, configuration, design architecture, documentation, etc.? use Gareth's "impact" designations? allow multiple? |
| Target | String/Restricted/Multiple | product/version/subsystem, jvm, os, driver, etc. |

User-Editable Metadata

| Name | Type | Description |
|---|---|---|
| User Comments | String | |
| User Severity | String/Restricted | |
| Active | Boolean | |

Private Metadata

| Name | Type | Description |
|---|---|---|
| Source | String/Restricted | Case, CR, Support Pattern, ... ? |
| Author | String | user ID |
| ApprovedBy | String | user ID |
| DateCreated | Timestamp | |
| NextReviewDays | Integer | Number of days from DatePublished until this signature can undergo internal review, check whether it's still valid |
| Segment | String/Restricted | MCS? Defer to next release. |

Encrypted or Binary Signature Data

| Name | Description |
|---|---|
| Expression | Logical expression to evaluate, required if Evaluator is true, empty if Evaluator is false |
| Data/Mappings | |
| Fix Now Script to | Defer to next release. |

| | |
|---|---|
| Execute | |
| Patch IDs | List of patch IDs |

Signature Bundle

A signature bundle ([bundle_id].bdl) can define a set of signatures which can be evaluated together. There can be always a default bundle for "All Signatures". In future releases, signature bundles can be user-editable. Some of a bundle's metadata can include:

- user can modify (boolean)
- user can delete (boolean)
- manual bundle or autobundle
- name
- description
- for manual bundle: set of signature ids
- for autobundle: set of conditions based on signature metadata

Signature Inventory

This inventory can be transient: it can be collected for the "Refresh" process and not persisted. It can be based on the contents of the application's designated signature repository directory.

```
<signature-inventory username="[eSupport username]" timestamp="[timestamp]"
repository="[path to user repository]">
  <signature id="S101" version="0"/>
  <signature id="S102" version="0"/>
  <signature id="S103" version="3"/>
  <signature id="S104" version="0"/>
  <signature id="S105" version="1"/>
</signature-inventory>
```

Signature Log

In one embodiment, this doesn't need to be user-readable but must be persistent. It can be submitted to Software support during the Refresh operation and truncated once submitted. Records the following information:

- Signature ID
- Signature version
- Date Evaluated
- Detected (true/false)

Signatures to Download

This can be the list of signature ids/versions submitted when clicking the Download Signatures button. The format can be the same as the Signature Inventory (see Signature Inventory). (In v1, it can always be all the "Available Signatures" but in future releases, users can be able to select which ones they want to download.)

MBeans

WLI 8.1 Mbeans

Examples of Mbeans for which data can be collected and include:

com.bea.wlai.management.deployment

AIConfiguration
AdapterDeployment
AppViewDeployment com.bea.wli.management.configuration

B2BBase
B2BConfig
BPMConfiguration
BusinessCalendarConfiguration
EmailEventGenConfiguration
EmailEventGenerators
FileEventGenConfiguration
FileEventGenerators
GenericEventGenConfiguration
GenericEventGenerators
JMSEventGenConfiguration
JMSEventGenerators
MessageBrokerConfiguration
PasswordStoreConfiguration
ProcessConfiguration
ProcessControl
SampleConfiguration
ServiceBrokerControl
TimerEventGenConfiguration
TimerEventGenerators
UserInfoConfiguration
VersioningConfiguration
WLIConsoleEventGenConfiguration
WorklistConfiguration com.bea.wli.tpm.management.configuration

Authentication
Binding
BulkLoader
Certificate
EBXMLBinding
ExtendedPropertySet
Failure
RosettaNetBinding
RosettaNetServiceDefault Service
ServiceProfile
TPMBase
TradingPartner
TradingPartnerMgmt
Transport
WebServiceBinding

Portal 8.1 MBeans com.bea.campaign.mbeans

CampaignEventListener
CampaignService
MailAction
ScenarioService com.bea.commerce.mbeans

CommercePipelineComponentSupport
PaymentServiceClient
TaxServiceClient com.bea.content.mbeans

ContentManagement
ContentStore com.bea.p13n.management

ServiceConfiguration com.bea.p13n.mbeans

AdContentProvider
AdService
AsynchronousEventService
AtnHierarchy
AtnSecurityProvider
AttributeLoader
BehaviorTracking
Cache
CacheManager
Credential
DocumentConnectionPool
DocumentConnectionPoolNotification
DocumentManager
EventService
JdbcHelper
MailService
RoleSecurityProvider

WLS 8.1 MBeans weblogic.management.configuration

AdminServer
Application
BridgeDestination
BridgeDestinationCommon
COM
Cluster
Component
Configuration
ConnectorComponent
Deployment
Domain
DomainLogFilter
EJBComponent
EJBContainer
ExecuteQueue
ForeignJMSConnectionFactory
ForeignJMSDestination
ForeignJMSServer
IIOP
JDBCConnectionPool
JDBCDataSource
JDBCDataSourceFactory
JDBCMultiPool
JDBCTxDataSource
JMSBridgeDestination
JMSConnectionConsumer
JMSConnectionFactory
JMSDestCommon
JMSDestination
JMSDestinationKey
JMSDistributedDestination
JMSDistributedDestinationMember
JMSDistributedQueue
JMSDistributedQueueMember
JMSDistributedTopic
JMSDistributedTopicMember
JMSFileStore
JMSJDBCStore
JMSQueue
JMSServer
JMSSessionPool
JMSStore
JMSTemplate
JMSTopic
JMSVirtualDestination JTA
Kernel
Log
Machine
MailSession
MessagingBridge
NetworkAccessPoint
NetworkChannel
NodeManager
RMCFactory
SNMPAgent
SNMPAttributeChange
SNMPCounterMonitor
SNMPGaugeMonitor
SNMPJMXMonitor
SNMPLogFilter
SNMPProxy
SNMPStringMonitor
SNMPTrapDestination
SNMPTrapSource
SSL
Security
SecurityConfiguration
Server
ServerStart
ShutdownClass
StartupClass
Target
VirtualDestination
VirtualHost
WLECConnectionPool
WSReliableDeliveryPolicy
WTCExport
WTCImport
WTCLocalTuxDom
WTCPassword
WTCRemoteTuxDom
WTCResources
WTCServer
WTCtBridgeGlobal
WTCtBridgeRedirect
WebAppComponent
WebDeployment
WebServer
WebServiceComponent
XMLEntityCache
XMLEntitySpecRegistryEntry
XMLParserSelectRegistryEntry XMLRegistry
XMLRegistryEntry weblogic.management.security

BaseMBeanImpl
Export
Import
Provider
Realm weblogic.management.security.authentication

AuthenticationProvider
Authenticator
GroupEditor
GroupMemberLister
GroupReader
GroupRemover
IdentityAsserter
MemberGroupLister
UserEditor
UserLockoutManager
UserPasswordEditor
UserReader
UserRemover weblogic.management.security.authorization

Adjudicator
Authorizer
DeployableAuthorizer
DeployableRoleMapper
PolicyEditor
PolicyReader
RoleEditor
RoleMapper
RoleReader weblogic.management.security.credentials

CredentialMapper
DeployableCredentialMapper
UserPasswordCredentialMapEditor
UserPasswordCredentialMapReader weblogic.management.security.pk

KeyStore weblogic.management.utils

LDAPServer
Lister
NameLister weblogic.security.providers.audit

DefaultAuditor weblogic.security.providers

ActiveDirectoryAuthenticator
DefaultAuthenticator
DefaultIdentityAsserter
IPlanetAuthenticator
LDAPAuthenticator
NovellAuthenticator
OpenLDAPAuthenticator weblogic.security.providers.authorization

DefaultAdjudicator
DefaultAuthorizer
DefaultRoleMapper
PredicateEditor
PredicateReader weblogic.security.providers.credentials

DefaultCredentialMapper weblogic.security.providers.pk

DefaultKeyStore weblogic.security.providers.realmadapter

RealmAdapterAdjudicator
RealmAdapterAuditor
RealmAdapterAuthenticator
RealmAdapterAuthorizer

What is claimed is:

1. A system comprising:

a computer, including a computer readable medium and processor operating thereon;

software, executing on the computer, which includes a plurality of configuration values;

a plurality of signatures, wherein each signature is associated with a potential problem with the software and further indicates a remedy to the potential problem, and wherein each signature includes metadata which includes at least one of a signature name, an indication of a severity of the potential problem, and information describing the potential problem;

a signature repository on the computer, wherein the signature repository is adapted to store the plurality of signatures a predictive support component that compares signatures from the signature repository to data obtained from data sources associated with the software, determines any signature matches between the signatures and the data, which each indicate one of the potential problems, and automatically retrieves new signatures and updates the signature repository with the new signatures; and wherein when the predictive support component determines one or more signature match matches, indicating potential problems, the predictive support component determines the remedy indicated by the signature, ranks the potential problems according to the severity indicated by the metadata included with each signature in each signature match;

presents a description of each potential problem to a user based on the metadata included with the signature, and automatically executes instructions included in the remedy to change the configuration values associated with the software.

2. The system of claim 1, wherein the signatures have rules to determine when the data matches the signature.

3. The system of claim 2, wherein the rules are interpreted by a rule engine.

4. The system of claim 1, wherein the signatures indicate the data for the comparison.

5. The system of claim 4, wherein the data includes MBean info.

6. The system of claim 1, wherein the data concerns runtime resources.

7. The system of claim 1, wherein new signatures are obtained from a web site.

8. The system of claim 1, wherein the software is application server software.

9. A computer executable method comprising:

providing a computer, including a computer readable medium and processor operating thereon;

providing software, executing on the computer, which includes a plurality of configuration values;

providing a plurality of signatures, wherein each signature is associated with a potential problem with the software and further indicates a remedy to the potential problem, and wherein each signature includes metadata which includes at least one of a signature name, an indication of a severity of the potential problem, and information describing the potential problem;

providing a signature repository on the computer, wherein the signature repository is adapted to store the plurality of signatures, and wherein the signature repository is automatically managed and updated with new signatures by a remote support system;

providing a predictive support component that compares signatures from the signature repository to data obtained from data sources associated with the software to determine any signature matches indicating one of the potential problems;

comparing signatures with data obtained from data sources, on one or more computer readable storage media, associated with software, the signatures indicating potential problems;

determining one or more signature matches between the signatures and the data, which each indicate potential problems;

determining the remedy indicated by the signature;

ranking the potential problems according to the severity indicated by the metadata included with each signature in each signature match;

presenting a description of each potential problem to a user based on the metadata included with the signature;

automatically executing instructions included in the remedy to change configuration values associated with the software.

10. The computer executable method of claim 9, wherein the signatures have rules to determine when the data matches the signature.

11. The computer executable method of claim 10, wherein the rules are interpreted by a rule engine.

12. The computer executable method of claim 9, wherein the signatures indicate the data for the comparison.

13. The computer executable method of claim 12, wherein the data includes MBean info.

14. The computer executable method of claim 9, wherein the data concerns runtime resources.

15. The computer executable method of claim 9, wherein new signatures are obtained from a web site.

16. The computer executable method of claim 9, wherein the software is application server software.

17. A system comprising:

a computer, including a computer readable medium and processor operating thereon;

software, executing on the computer, wherein the software has a configuration;

a plurality of signatures, wherein each signature is associated with a potential problem with the software and further indicates a remedy to the potential problem, and wherein each signature includes metadata which includes at least one of a signature name, an indication of a severity of the potential problem, and information describing the potential problem;

a signature repository on the computer, wherein the signature repository is adapted to store the plurality of signatures; and a predictive support component that compares signatures from the signature repository to the configuration to determine if any of the potential problems are associated with the configuration, and automatically retrieves new signatures and updates the signature repository with the new signatures; and wherein when the predictive support component determines one or more signature matches between the signatures and the data, which each indicate potential problems associated with the configuration, the predictive support component determines the remedy indicated by the signature, ranks the potential problems according to the severity indicated by the metadata included with each signature in each signature match;

presents a description of each potential problem to a user based on the metadata included with the signature, and automatically executes instructions included in the remedy to change the configuration.

18. The system of claim 17, wherein the signatures have rules to determine when the configuration matches the signature.

19. The system of claim 18, wherein the rules are interpreted by a rule engine.

20. The system of claim 17, wherein the configuration includes MBean info.

21. The system of claim 17, wherein the software is application server software.

22. A computer executable method comprising:

providing a computer, including a computer readable medium and processor operating thereon;

providing software, executing on the computer, which includes a plurality of configuration values;

providing a plurality of signatures, wherein each signature is associated with a potential problem with the software and further indicates a remedy to the potential problem, and wherein each signature includes metadata which includes at least one of a signature name, an indication of a severity of the potential problem, and information describing the potential problem;

providing a signature repository on the computer, wherein the signature repository is adapted to store the plurality of signatures, and wherein the signature repository is automatically managed and updated with new signatures by a remote support system;

providing a predictive support component that is operable to compare signatures from the signature repository to data obtained from data sources associated with the software to determine any signature matches indicating one of the potential problems;

before a potential problem occurs, using the plurality of signatures and the data from the data source associated with the software to determine the potential problem;

determining the remedy indicated by the signature in response to the determination;

ranking the potential problems according to the severity indicated by the metadata included with each signature in each signature match;

presenting a description of the potential problem to a user based on the metadata included with the signature, and automatically executing instructions included in the remedy to change the configuration values associated with the software.

23. The computer executable method of claim 22 wherein the remedy comprises providing a warning to a user.

24. The computer executable method of claim 22, wherein the remedy comprises obtaining repair instructions.

25. The computer executable method of claim 22, wherein the signatures have rules to determine when the data matches the signature.

26. The computer executable method of claim 22, wherein the data includes MBean info.

27. The computer executable method of claim 22, wherein new signatures are obtained from a web site.

28. The computer executable method of claim 22, wherein the software is application server software.

29. A predictive support system, comprising:

a computer, including a computer readable medium and processor operating thereon;

software, executing on the computer, which includes a plurality of configuration values;

a plurality of signatures, wherein each signature is associated with a potential problem with the software and further indicates a remedy to the potential problem, and wherein each signature includes metadata which includes at least one of a signature name, an indication of a severity of the potential problem, and information describing the potential problem;

a signature repository on the computer, wherein the signature repository is adapted to store the plurality of signatures;

a predictive support component that is operable to compare signatures from the signature repository to data obtained from data sources associated with the software, determine any signature matches between the signatures and the data, which each indicate one of the potential problems, and automatically retrieves new signatures and updates the signature repository with the new signatures;

wherein, before potential problems occur, the predictive support component uses the signatures and the data from the data source associated with the software to determine the potential problems;

determines remedies indicated by each signature in response to the determination;

ranks the potential problems according to the severity indicated by the metadata included with each signature in each signature match;

presents a description of each potential problem to a user based on the metadata included with the signature, and automatically executing instructions included in the remedy to change the configuration values associated with the software.

30. The predictive support component of claim 29 wherein the remedy comprises providing a warning to a user.

31. The predictive support component of claim 29, wherein the remedy comprises obtaining repair instructions.

32. The predictive support component of claim 29, wherein the signatures have rules to determine when the data matches the signature.

33. The predictive support component of claim 29, wherein the data includes MBean info.

34. The predictive support component of claim 29, wherein new signatures are obtained from a web site.

35. The predictive support component of claim 29, wherein the software is application server software.

* * * * *